United States Patent
Fein et al.

(10) Patent No.: US 10,665,017 B2
(45) Date of Patent: May 26, 2020

(54) DISPLAYING IN RESPONSE TO DETECTING ONE OR MORE USER BEHAVIORS ONE OR MORE SECOND AUGMENTATIONS THAT ARE BASED ON ONE OR MORE REGISTERED FIRST AUGMENTATIONS

(71) Applicant: Elwha LLC, Bellevue, WA (US)

(72) Inventors: Gene Fein, Westlake, CA (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 106 days.

(21) Appl. No.: 13/770,053

(22) Filed: Feb. 19, 2013

(65) Prior Publication Data

US 2014/0098137 A1 Apr. 10, 2014

Related U.S. Application Data

(63) Continuation of application No. 13/768,048, filed on Feb. 15, 2013, now Pat. No. 10,269,179, which is a
(Continued)

(51) Int. Cl.
*G06T 19/00* (2011.01)
*G06T 11/00* (2006.01)
(Continued)

(52) U.S. Cl.
CPC ............ *G06T 19/006* (2013.01); *G06T 11/00* (2013.01); *G06T 11/60* (2013.01); *G06F 3/011* (2013.01); *G06F 3/013* (2013.01)

(58) Field of Classification Search
None
See application file for complete search history.

(56) References Cited

U.S. PATENT DOCUMENTS 6,026,376 A 2/2000 Kenney
6,091,378 A 7/2000 Richardson et al.
(Continued)

FOREIGN PATENT DOCUMENTS

CN 102436663 A 5/2012
EP 1117074 A2 7/2001
(Continued)

OTHER PUBLICATIONS

Correia, Nuno, et al. "HyperMem: a system to store and replay experiences in mixed reality worlds." 2005 International Conference on Cyberworlds (CW'05). IEEE, 2005.*
(Continued)

*Primary Examiner* — Yu Chen

(57) ABSTRACT

Computationally implemented methods and systems include registering one or more first augmentations that were shown to a user through a first augmented view of a first actual scene, the one or more first augmentations having been shown at least at end of a segment of time, detecting, following the showing of the one or more first augmentations up to the end of the segment of time, one or more user behaviors of the user that when detected as occurring infers user's interest in seeing the one or more first augmentations; and displaying, in response at least in part to said detecting, one or more second augmentations through a second augmented view of the first actual scene or of a second actual scene, the one or more second augmentations to be displayed being based, at least in part, on the registering of the one or more first augmentations. In addition to the foregoing, other aspects are described in the claims, drawings, and text.

37 Claims, 34 Drawing Sheets

Related U.S. Application Data continuation-in-part of application No. 13/731,233, filed on Dec. 31, 2012, now Pat. No. 9,674,047, which is a continuation of application No. 13/729,278, filed on Dec. 28, 2012, now Pat. No. 9,077,647, which is a continuation-in-part of application No. 13/723,610, filed on Dec. 21, 2012, now Pat. No. 9,671,863, which is a continuation of application No. 13/721,340, filed on Dec. 20, 2012, now Pat. No. 10,180,715, which is a continuation-in-part of application No. 13/711,095, filed on Dec. 11, 2012, now Pat. No. 9,111,384, which is a continuation of application No. 13/709,465, filed on Dec. 10, 2012, now Pat. No. 9,111,383, which is a continuation-in-part of application No. 13/690,003, filed on Nov. 30, 2012, now Pat. No. 9,105,126, which is a continuation of application No. 13/689,372, filed on Nov. 29, 2012, which is a continuation-in-part of application No. 13/673,070, filed on Nov. 9, 2012, now Pat. No. 9,448,623, which is a continuation of application No. 13/672,575, filed on Nov. 8, 2012, now Pat. No. 9,141,188, which is a continuation-in-part of application No. 13/648,012, filed on Oct. 9, 2012, now Pat. No. 8,941,689, which is a continuation of application No. 13/646,147, filed on Oct. 5, 2012, now Pat. No. 8,928,695.

(51) Int. Cl.
  *G06T 11/60* (2006.01)
  *G06F 3/01* (2006.01)

(56) References Cited

U.S. PATENT DOCUMENTS

| | | |
|---|---|---|
| 6,326,985 B1 | 12/2001 | Tazoe et al. |
| 6,425,764 B1* | 7/2002 | Lamson ............... A61M 21/00 434/236 |
| 6,503,086 B1 | 1/2003 | Golubov |
| 6,625,299 B1 | 9/2003 | Meisner et al. |
| 6,697,645 B1* | 2/2004 | MacFarlane ........... H04M 1/21 320/150 |
| 6,774,898 B1 | 8/2004 | Katayama et al. |
| 6,853,390 B1 | 2/2005 | Wandersleben et al. |
| 6,891,563 B2 | 5/2005 | Schofield et al. |
| 7,119,829 B2 | 10/2006 | Leonard et al. |
| 7,257,777 B1 | 8/2007 | Kanevsky et al. |
| 7,375,701 B2 | 5/2008 | Covannon et al. |
| 7,690,975 B2 | 4/2010 | Watanabe et al. |
| 7,801,328 B2 | 9/2010 | Au et al. |
| 7,956,869 B1 | 6/2011 | Gilra |
| 8,116,526 B2 | 2/2012 | Sroka et al. |
| 8,184,070 B1 | 5/2012 | Taubman |
| 8,188,880 B1 | 5/2012 | Chi et al. |
| 8,203,605 B1 | 6/2012 | Starner |
| 8,204,073 B1 | 6/2012 | Gailloux et al. |
| 8,402,356 B2 | 3/2013 | Martinez et al. |
| 8,527,943 B1 | 9/2013 | Chiluvuri |
| 8,544,033 B1 | 9/2013 | Acharya et al. |
| 8,633,970 B1 | 1/2014 | Mercay et al. |
| 8,751,948 B2 | 6/2014 | Wetzer et al. |
| 8,756,519 B2 | 6/2014 | Hunt et al. |
| 9,088,823 B1 | 7/2015 | Price |
| 2001/0030654 A1 | 10/2001 | Iki |
| 2001/0044858 A1 | 11/2001 | Rekimoto |
| 2002/0044152 A1 | 4/2002 | Abbott, III et al. |
| 2002/0144259 A1 | 10/2002 | Gutta et al. |
| 2002/0163521 A1 | 11/2002 | Ellenby et al. |
| 2002/0167522 A1 | 11/2002 | Miyazawa |
| 2003/0011639 A1 | 1/2003 | Webb |
| 2003/0037068 A1 | 2/2003 | Thomas et al. |
| 2003/0210832 A1 | 11/2003 | Benton |
| 2003/0229900 A1 | 12/2003 | Reisman |
| 2004/0046711 A1 | 3/2004 | Triebfuerst |
| 2004/0113885 A1 | 6/2004 | Genc et al. |
| 2004/0204247 A1* | 10/2004 | Walker ................ A63F 13/12 463/42 |
| 2004/0268263 A1 | 12/2004 | Van Dok et al. |
| 2005/0206583 A1 | 9/2005 | Lemelson et al. |
| 2006/0066567 A1 | 3/2006 | Scharenbroch et al. |
| 2006/0123353 A1 | 6/2006 | Matthews et al. |
| 2006/0181484 A1 | 8/2006 | Sprague et al. |
| 2006/0218031 A1 | 9/2006 | Weinberg et al. |
| 2006/0224445 A1 | 10/2006 | Axe et al. |
| 2006/0227862 A1 | 10/2006 | Campbell et al. |
| 2006/0262140 A1 | 11/2006 | Kujawa et al. |
| 2007/0162942 A1 | 7/2007 | Hamynen et al. |
| 2007/0265082 A1 | 11/2007 | Shimura et al. |
| 2007/0279521 A1 | 12/2007 | Cohen |
| 2008/0071559 A1 | 3/2008 | Arrasvuori |
| 2008/0125959 A1* | 5/2008 | Doherty ........... G06F 17/30241 701/532 |
| 2008/0253737 A1 | 10/2008 | Kimura et al. |
| 2008/0266323 A1 | 10/2008 | Biocca et al. |
| 2008/0270947 A1 | 10/2008 | Elber et al. |
| 2008/0306999 A1 | 12/2008 | Finger et al. |
| 2009/0049004 A1 | 2/2009 | Nurminen et al. |
| 2009/0117347 A1* | 5/2009 | Bauchot .............. G01D 7/00 428/195.1 |
| 2009/0125849 A1 | 5/2009 | Bouvin et al. |
| 2009/0158203 A1 | 6/2009 | Kerr et al. |
| 2009/0167787 A1 | 7/2009 | Bathiche et al. |
| 2009/0182499 A1 | 7/2009 | Bravo |
| 2009/0237328 A1 | 9/2009 | Gyorfi et al. |
| 2009/0262206 A1 | 10/2009 | Park |
| 2009/0265105 A1 | 10/2009 | Davis et al. |
| 2009/0300535 A1 | 12/2009 | Skourup et al. |
| 2009/0322671 A1 | 12/2009 | Scott et al. |
| 2010/0088023 A1* | 4/2010 | Werner .............. A63B 24/0021 701/467 |
| 2010/0104185 A1 | 4/2010 | Johnson et al. |
| 2010/0161409 A1 | 6/2010 | Ryu et al. |
| 2010/0164990 A1 | 7/2010 | Van Doorn |
| 2010/0208033 A1 | 8/2010 | Edge et al. |
| 2010/0214284 A1 | 8/2010 | Rieffel et al. |
| 2010/0226535 A1* | 9/2010 | Kimchi .................. G06F 3/013 382/103 |
| 2010/0238161 A1 | 9/2010 | Varga et al. |
| 2010/0253764 A1 | 10/2010 | Sim et al. |
| 2010/0295921 A1 | 11/2010 | Guthrie et al. |
| 2010/0328344 A1 | 12/2010 | Manila et al. |
| 2010/0333215 A1 | 12/2010 | Kamar et al. |
| 2010/0332993 A1 | 12/2010 | Bousseton et al. |
| 2011/0004072 A1* | 1/2011 | Fletcher .............. A61B 5/0002 600/300 |
| 2011/0045905 A1 | 2/2011 | Radek |
| 2011/0055049 A1 | 3/2011 | Harper et al. |
| 2011/0074658 A1 | 3/2011 | Sato |
| 2011/0075257 A1 | 3/2011 | Hua et al. |
| 2011/0082755 A1 | 4/2011 | Itzhak |
| 2011/0098056 A1 | 4/2011 | Rhoads et al. |
| 2011/0112915 A1 | 5/2011 | Geer, III et al. |
| 2011/0128223 A1 | 6/2011 | Lashina et al. |
| 2011/0134108 A1 | 6/2011 | Hertenstein |
| 2011/0138317 A1 | 6/2011 | Kang et al. |
| 2011/0141254 A1 | 6/2011 | Roebke et al. |
| 2011/0164163 A1 | 7/2011 | Bilbrey et al. |
| 2011/0202878 A1 | 8/2011 | Park et al. |
| 2011/0209201 A1 | 8/2011 | Chollat |
| 2011/0214082 A1 | 9/2011 | Osterhout et al. |
| 2011/0216060 A1 | 9/2011 | Weising et al. |
| 2011/0227820 A1 | 9/2011 | Haddick et al. |
| 2011/0231781 A1 | 9/2011 | Betzler et al. |
| 2011/0238751 A1 | 9/2011 | Belimpasakis et al. |
| 2011/0242134 A1 | 10/2011 | Miller et al. |
| 2011/0258049 A1* | 10/2011 | Ramer ............ G06F 17/30867 705/14.66 |
| 2011/0292220 A1 | 12/2011 | Georgis et al. |
| 2011/0310087 A1 | 12/2011 | Wright, Jr. et al. |
| 2012/0025975 A1 | 2/2012 | Richey et al. |
| 2012/0038669 A1 | 2/2012 | Lee et al. |

(56) References Cited

U.S. PATENT DOCUMENTS

| | | |
|---|---|---|
| 2012/0062596 A1 | 3/2012 | Bedi et al. |
| 2012/0098977 A1 | 4/2012 | Striemer et al. |
| 2012/0099800 A1 | 4/2012 | Llano et al. |
| 2012/0102439 A1 | 4/2012 | Mitchell et al. |
| 2012/0105473 A1 | 5/2012 | Bar-Zeev et al. |
| 2012/0105475 A1 | 5/2012 | Tseng |
| 2012/0113092 A1 | 5/2012 | Bar-Zeev et al. |
| 2012/0113140 A1 | 5/2012 | Hilliges et al. |
| 2012/0113274 A1 | 5/2012 | Adhikari et al. |
| 2012/0116920 A1 | 5/2012 | Adhikari et al. |
| 2012/0120101 A1 | 5/2012 | Adhikari et al. |
| 2012/0120113 A1 | 5/2012 | Hueso |
| 2012/0133650 A1 | 5/2012 | Lee |
| 2012/0147328 A1 | 6/2012 | Yahav |
| 2012/0154638 A1 | 6/2012 | Chou |
| 2012/0166435 A1* | 6/2012 | Graham et al. ............... 707/728 |
| 2012/0176410 A1 | 7/2012 | Meier et al. |
| 2012/0194549 A1 | 8/2012 | Osterhout et al. |
| 2012/0198339 A1 | 8/2012 | Williams et al. |
| 2012/0206323 A1 | 8/2012 | Osterhout et al. |
| 2012/0218296 A1 | 8/2012 | Belimpasakis et al. |
| 2012/0223966 A1 | 9/2012 | Lim |
| 2012/0233033 A1* | 9/2012 | Calman .............. G06Q 20/3227 705/27.1 |
| 2012/0243732 A1* | 9/2012 | Swaminathan ....... G06T 7/2033 382/103 |
| 2012/0244907 A1 | 9/2012 | Athsani et al. |
| 2012/0246027 A1 | 9/2012 | Martin |
| 2012/0249416 A1 | 10/2012 | Maciocci et al. |
| 2012/0249588 A1* | 10/2012 | Tison .................... G06F 1/1696 345/633 |
| 2012/0249591 A1 | 10/2012 | Maciocci et al. |
| 2012/0249741 A1 | 10/2012 | Maciocci et al. |
| 2012/0249797 A1 | 10/2012 | Haddick et al. |
| 2012/0268491 A1 | 10/2012 | Sugden et al. |
| 2012/0269494 A1 | 10/2012 | Satyanarayana et al. |
| 2012/0293548 A1 | 11/2012 | Perez et al. |
| 2012/0299962 A1* | 11/2012 | White ................... G02B 27/017 345/633 |
| 2012/0304111 A1 | 11/2012 | Queru |
| 2012/0306920 A1 | 12/2012 | Bathiche et al. |
| 2012/0308209 A1 | 12/2012 | Zaletel |
| 2012/0317484 A1 | 12/2012 | Gomez et al. |
| 2012/0324494 A1 | 12/2012 | Burger et al. |
| 2012/0327119 A1 | 12/2012 | Woo et al. |
| 2012/0329432 A1* | 12/2012 | Gupta .................... G06Q 30/02 455/414.1 |
| 2013/0021373 A1 | 1/2013 | Vaught et al. |
| 2013/0027572 A1 | 1/2013 | Petrou |
| 2013/0032634 A1 | 2/2013 | McKirdy |
| 2013/0044128 A1 | 2/2013 | Liu et al. |
| 2013/0044129 A1 | 2/2013 | Latta et al. |
| 2013/0050258 A1 | 2/2013 | Liu et al. |
| 2013/0050432 A1 | 2/2013 | Perez et al. |
| 2013/0054622 A1 | 2/2013 | Karmarkar et al. |
| 2013/0057577 A1 | 3/2013 | Jeong |
| 2013/0076788 A1 | 3/2013 | Ben Zvi |
| 2013/0083003 A1 | 4/2013 | Perez et al. |
| 2013/0083007 A1* | 4/2013 | Geisner ................. G06T 19/006 345/419 |
| 2013/0083009 A1 | 4/2013 | Geisner et al. |
| 2013/0085345 A1 | 4/2013 | Geisner et al. |
| 2013/0093788 A1 | 4/2013 | Liu et al. |
| 2013/0125027 A1 | 5/2013 | Abovitz |
| 2013/0128050 A1 | 5/2013 | Aghdasi et al. |
| 2013/0128364 A1 | 5/2013 | Wheeler |
| 2013/0141453 A1 | 6/2013 | Devara et al. |
| 2013/0147836 A1 | 6/2013 | Small et al. |
| 2013/0162632 A1 | 6/2013 | Varga et al. |
| 2013/0170697 A1* | 7/2013 | Zises .................... G06T 11/00 382/103 |
| 2013/0188032 A1 | 7/2013 | Vertegaal |
| 2013/0194164 A1 | 8/2013 | Sugden et al. |
| 2013/0218721 A1 | 8/2013 | Borhan et al. |
| 2013/0234826 A1 | 9/2013 | Sekiguchi et al. |
| 2013/0278631 A1 | 10/2013 | Border et al. |
| 2013/0290233 A1* | 10/2013 | Ferren .................. G06K 9/3266 706/46 |
| 2013/0326583 A1 | 12/2013 | Freihold et al. |
| 2013/0335573 A1 | 12/2013 | Forutanpour et al. |
| 2013/0342571 A1 | 12/2013 | Kinnebrew et al. |
| 2014/0002357 A1 | 1/2014 | Pombo et al. |
| 2014/0063055 A1 | 3/2014 | Osterhout et al. |
| 2014/0092130 A1 | 4/2014 | Anderson et al. |
| 2014/0100997 A1 | 4/2014 | Mayerle et al. |
| 2014/0108309 A1* | 4/2014 | Frank ................... G06N 99/005 706/12 |
| 2014/0129342 A1* | 5/2014 | Sanghavi ........... G06Q 30/0277 705/14.66 |
| 2014/0225898 A1 | 8/2014 | Fyke et al. |
| 2014/0237366 A1 | 8/2014 | Poulos et al. |

FOREIGN PATENT DOCUMENTS

| | | |
|---|---|---|
| EP | 1 271 293 A2 | 1/2003 |
| EP | 2 418 563 A2 | 2/2012 |
| EP | 2 442 539 A1 | 4/2012 |
| EP | 2 426 460 B1 | 3/2016 |
| KR | 10-2012-00665 A2 | 6/2012 |
| WO | WO 2012/108721 A2 | 8/2012 |

OTHER PUBLICATIONS

PCT International Search Report; International App. No. PCT/US2014/025579; Jul. 29, 2014; pp. 1-4.

Doobybrain; "GE's Augmented Reality Demo"; YouTube; uploaded Feb. 4, 2009; pp. 1-2; located at: http://www.youtube.com/watch?v=00FGtH5nkxM.

Inbar, Ori; "Top 10 Augmented Reality Demos That Will Revolutionize Video Games"; Games Alfresco; posted on Mar. 3, 2008, printed on Sep. 27, 2012; pp. 1-19; located at: http://gamesalfresco.ccom/2008/03/03/top-10-augmented-reality-demos-that-will-revolutionize-video-games/.

"Qualcomm Augmented Reality Sample Apps"; Qualcomm; bearing a date of May 18, 2011, printed on Sep. 27, 2012; pp. 1-2; Qualcomm Incorporated; located at: http://www.qualcomm.com/media/videos/qualcomm-augmented-reality-sample-apps?search=augmented%20reality&channel=11.

Shinymedia; "DEMO: World's First Augmented Reality Glasses-Vuzix Wrap 920 AR"; YouTube; uploaded Oct. 27, 2010; pp. 1-2; located at: http://www.youtube.com/watch?v=xfiZQW0k2Ro.

Taoistflyer; "Google Glasses (How It Works)"; YouTube; uploaded Apr. 7, 2012; pp. 1-2; located at: http://www.youtube.com/watch?v=Nc4ox89bofk&feature=related.

Total Immersion Home Page; bearing a date of 2012, printed on Sep. 27, 2012; pp. 1-2; Total Immersion; located at: http://www.t-immersion.com/.

Toucharcade; "Augmented Reality Demo"; YouTube; uploaded Mar. 26, 2009; pp. 1-2; located at: http://www.youtubc.com/watch?v=QoZRHLmUKtM.

Vuzix-View the Future Today Home Page; bearing a date of Sep. 18, 2012, printed on Sep. 27, 2012; p. 1; Vuzix; located at: http://www.vuzix.com/home/.

PCT International Search Report; International App. No. PCT/US2014/016022; dated Jun. 6, 2014; pp. 1-3.

Broll et al.; "An Infrastructure for Realizing Custom-Tailored Augmented Reality User Interfaces"; IEEE Transactions on Visualization and Computer Graphics; Nov./Dec. 2005; pp. 722-733; vol. 11, No. 6; IEEE Computer Society.

Irawati et al.; "VARU Framework: Enabling Rapid Prototyping of VR, AR and Ubiquitous Applications"; IEEE Virtual Reality Conference, Reno, NV; Mar. 8-12, 2008; pp. 201-208.

PCT International Search Report; International App. No. PCT/US2014/025639; Jul. 17, 2014; pp. 1-4.

PCT International Search Report; International App. No. PCT/US2014/025604; dated Jul. 11, 2014; pp. 1-3.

PCT International Search Report; International App. No. PCT/US2014/025669; dated Jul. 9, 2014; pp. 1-3.

(56) References Cited

OTHER PUBLICATIONS

Bonsor, Kevin; "How Augmented Reality Works"; bearing a date of Dec. 20, 2010; located at http://computer.howstuffworks.com/augmented-reality.htm; pp. 1-3.

Butz, et al.; "Enveloping Users and Computers in a Collaborative 3D Augmented Reality"; bearing a date of Oct. 20-21, 1999; pp. 35-44; Augmented Reality IEEE.

European Patent Office, Extended European Search Report, Pursuant to Rule 62 EPC; App. No. EP 14 76 7447; dated Sep. 21, 2016 (received by our agent on Oct. 6, 2016); pp. 1-7.

European Patent Office, Extended European Search Report, Pursuant to Rule 62 EPC; App. No. EP 14 76 9243.8; dated Oct. 12, 2016 (received by our agent on Oct. 17, 2016); pp. 1-10.

European Patent Office, Extended European Search Report, Pursuant to Rule 62 EPC; App. No. EP 14 77 0781.4; dated Oct. 12, 2016 (received by our agent on Oct. 13, 2016); pp. 1-10.

European Patent Office, Extended European Search Report, Pursuant to Rule 62 EPC; App. No. EP 14 77 0115.5; dated Oct. 12, 2016 (received by our agent on Oct. 13, 2016); pp. 1-10.

Rekimoto, et al.; "Augment-able Reality: Situated Communication through Physical and Digital Spaces"; bearing a date of Oct. 19-20, 1998; pp. 68-75; Wearable Computers.

Rekimoto, et al.; "CyberCode: Designing Augmented Reality Environments with Visual Tags"; bearing a date of Apr. 1, 2000; pp. 1-10; ACM.

Takacs, Gabriel et al.; "Outdoors Augmented Reality on Mobile Phone using Loxel-Based Visual Feature Organization"; Multimedia Information Retrieval 2008; bearing a date of Oct. 30-31, 2008; pp. 427-434; ACM.

European Patent Office, Supplementary European Search Report, Pursuant to Rule 62 EPC; App. No. EP 14751531.6; dated Sep. 9, 2016 (received by our Agent dated Sep. 9, 2016); pp. 1-11.

Chinese State Intellectual Property Office, First Office Action, App. No. 201480028245.3 (Based on PCT Patent Application No. PCT/2014/025579); dated Feb. 14, 2018; (machine translation provided herewith, 13 pages total).

European Patent Office, Communication pursuant to Article 94(3) EPC; App. No. EP 14767447.7; dated Nov. 21, 2019 (received by our Agent on Nov. 25, 2019); pp. 1-6.

\* cited by examiner

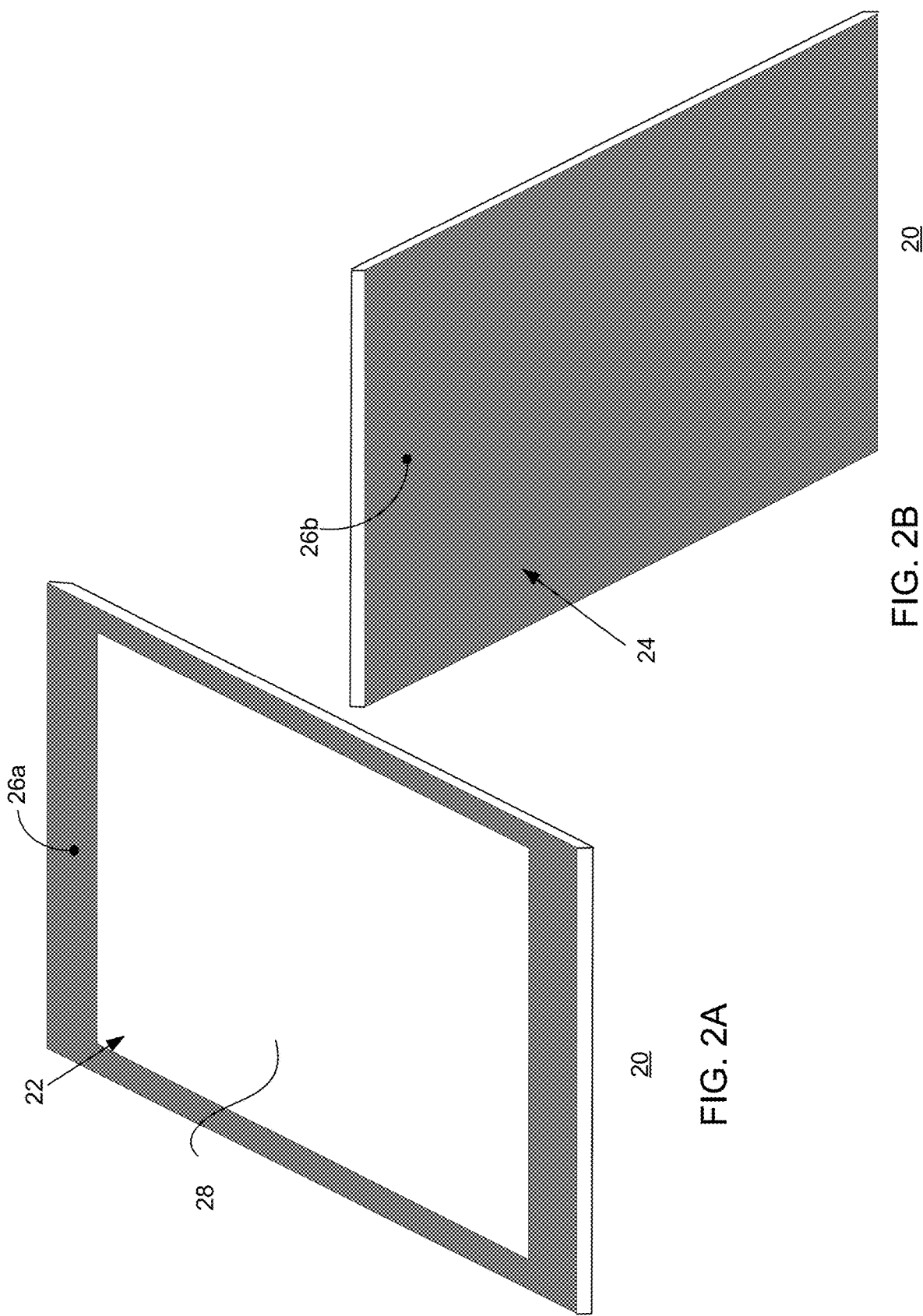

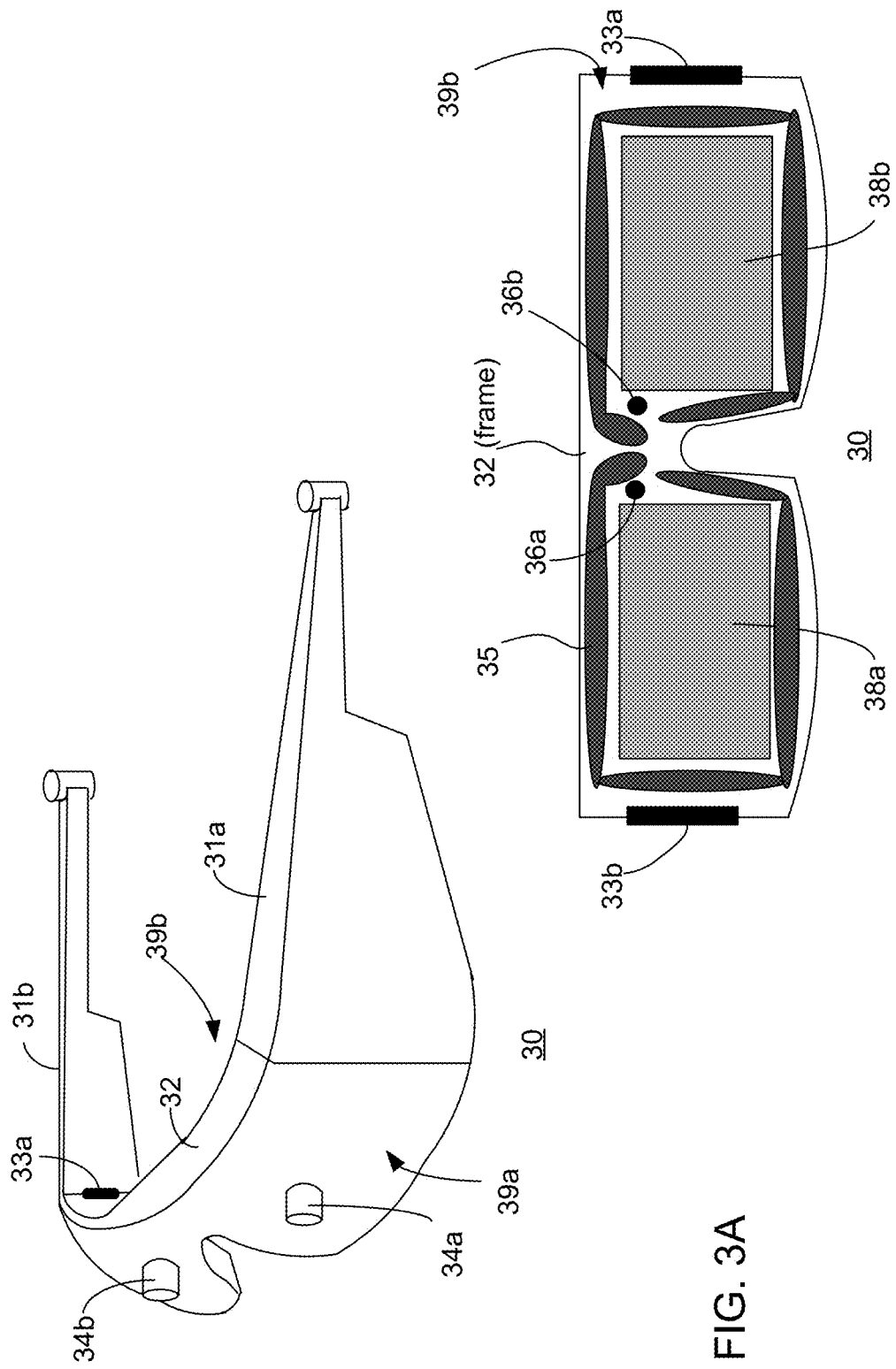

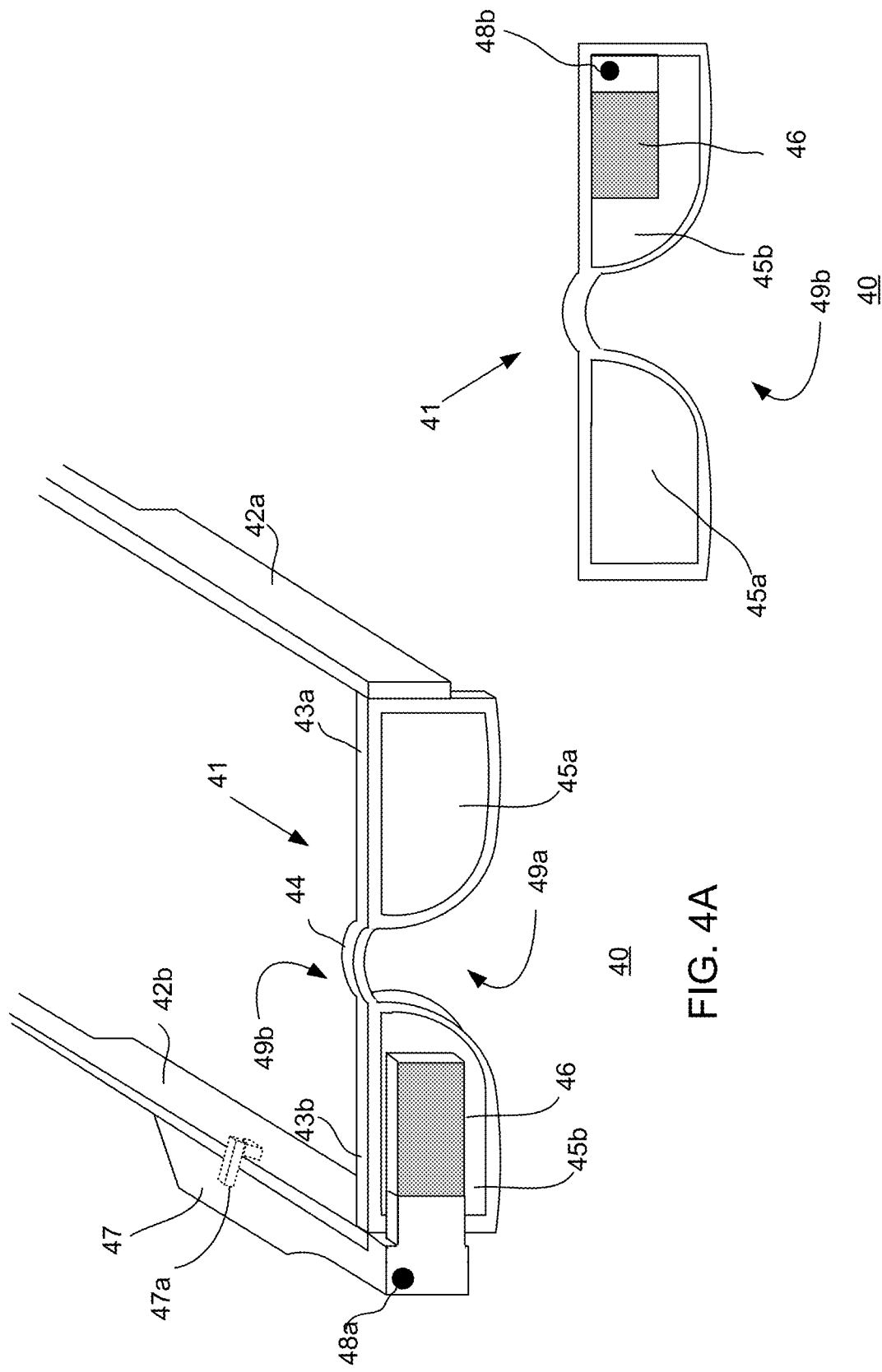

View 50g

View 50h

View 50i

View 50j

View 50k

View 50m

View 50n

View 50p

View 50q

View 50r

View 50s

View 50t

View 50u

View 50x

View 50y

View 50z

**102\*  Augmentation Recording Module**

802  Augmentation Aspect Recording Module

804  Visual Format Recording Module

806  Location Recording Module

808  Content Recording Module

810  Non-Augmentation Aspect Recording Module

812  Visual Form Recording Module

814  View Location Recording Module

816  Identity Recording Module

818  Dynamic Augmentation Recording Module

820  Rotating Augmentation Recording Module

822  Rotating Message Augmentation Recording Module

FIG. 8A

**104\*  User Behavior Ascertaining Module**

824  User Movement Ascertaining Module

826  Location Relative User Movement Ascertaining Module

828  Ocular Characteristic Ascertaining Module

830  Dwell Path Ascertaining Module

832  Focus Point Ascertaining Module

834  Actual Scene Ascertaining Module

FIG. 8B

**106\*  Augmentation Presenting Module**

836  Modified First Augmentation Presenting Module

837  First Augmentation With Modified Visual Format Presenting Module

838  First Augmentation With Modified Content Presenting Module

843  Selectively Located Modified First Augmentation Presenting Module

839  User Behavior Based Modified First Augmentation Presenting Module

840  Movement Based Modified First Augmentation Presenting Module

841  Ocular Characteristic Based Modified First Augmentation Presenting Module

842  User Directing Augmentation Presenting Module

FIG. 8C

110 User Interface
- 852 Display[s]
- 854 Visual Capturing Device[s]
- 856 Audio Speaker[s]
- 858 Audio Input Devic[s]
- 860 Keyboard/keypad[s]

FIG. 8D

120 Sensor[s]
- 870 Camera[s]
- 872 Audio Sensor[s]
- 874 Location Sensor[s]
  - 875 GPS
- 876 Orientation/Movement Sensor[s]
  - 877 Accelerometer[s]
  - 878 Gyroscope[s]
  - 879 Inertia Sensor[s]
  - 880 Pedometer[s]
- 882 User Physiological Sensor[s]
  - 883 Blood Pressure Sensor[s]
  - 884 Pulse/Heart Rate Sensor[s]
  - 885 Blood Sugar Sensor[s]
- 886 External Environmental Sensor[s]
  - 887 Atmospheric Condition Sensor[s]

FIG. 8E

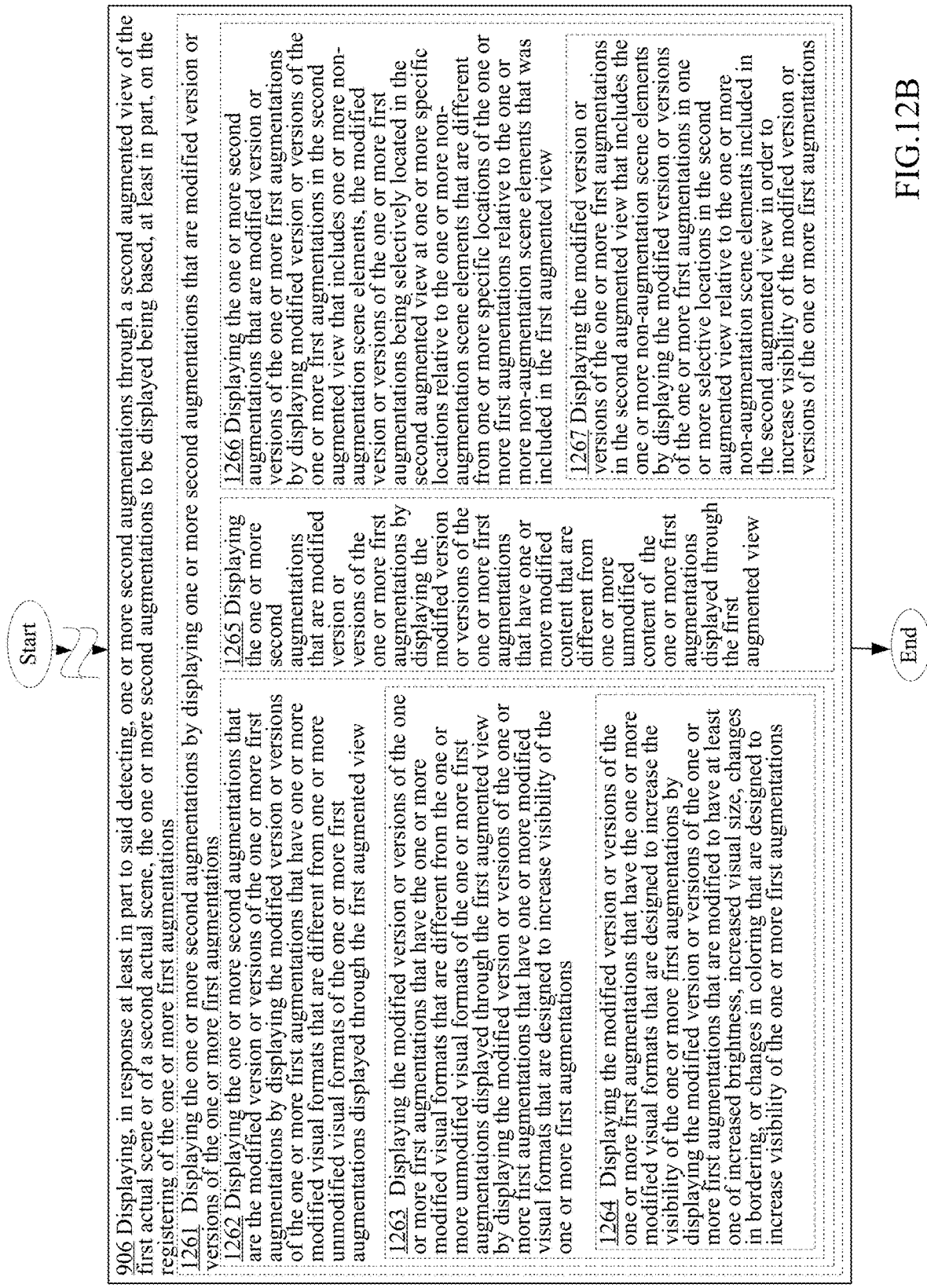

DISPLAYING IN RESPONSE TO DETECTING ONE OR MORE USER BEHAVIORS ONE OR MORE SECOND AUGMENTATIONS THAT ARE BASED ON ONE OR MORE REGISTERED FIRST AUGMENTATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 13/768,048, entitled DISPLAYING IN RESPONSE TO DETECTING ONE OR MORE USER BEHAVIORS ONE OR MORE SECOND AUGMENTATIONS THAT ARE BASED ON ONE OR MORE REGISTERED FIRST AUGMENTATIONS, naming Gene Fein; Royce A. Levien; Richard T. Lord; Robert W. Lord; Mark A. Malamud; John D. Rinaldo, Jr.; Clarence T. Tegreene as inventors, filed 15, Feb. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/731,233, entitled CORRELATING USER REACTIONS WITH AUGMENTATIONS DISPLAYED THROUGH AUGMENTED VIEWS, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 31, Dec. 2012, which is currently co-pending or is an application of which a currently co-pending application is entitled to the benefit of the filing date, and which is a continuation of U.S. patent application Ser. No. 13/729,278, entitled CORRELATING USER REACTIONS WITH AUGMENTATIONS DISPLAYED THROUGH AUGMENTED VIEWS, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 28, Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/723,610, entitled CORRELATING USER REACTION WITH AT LEAST AN ASPECT ASSOCIATED WITH AN AUGMENTATION OF AN AUGMENTED VIEW, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 21, Dec. 2012, which is currently co-pending or is an application of which a currently co-pending application is entitled to the benefit of the filing date, and which is a continuation of U.S. patent application Ser. No. 13/721,340, entitled CORRELATING USER REACTION WITH AT LEAST AN ASPECT ASSOCIATED WITH AN AUGMENTATION OF AN AUGMENTED VIEW, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 20, Dec. 2012.

For purposes of the USPTO extra-statutory requirements, the present application constitutes a continuation-in-part of U.S. patent application Ser. No. 13/711,095, entitled SYSTEMS AND METHODS FOR OBTAINING AND USING AUGMENTATION DATA AND FOR SHARING USAGE DATA, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 11, Dec. 2012, which is currently co-pending or is an application of which a currently co-pending application is entitled to the benefit of the filing date, and which is a continuation of U.S. patent application Ser. No. 13/709,465, entitled SYSTEMS AND METHODS FOR OBTAINING AND USING AUGMENTATION DATA AND FOR SHARING USAGE DATA, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 10, Dec. 2012.

For purposes of the USPTO extra-statutory requirements, the present application constitutes a continuation-in-part of U.S. patent application Ser. No. 13/690,003, entitled SYSTEMS AND METHODS FOR SHARING AUGMENTATION DATA, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 30, Nov. 2012, which is currently co-pending or is an application of which a currently co-pending application is entitled to the benefit of the filing date, and which is a continuation of U.S. patent application Ser. No. 13/689,372, entitled SYSTEMS AND METHODS FOR SHARING AUGMENTATION DATA, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 29, Nov. 2012.

For purposes of the USPTO extra-statutory requirements, the present application constitutes a continuation-in-part of U.S. patent application Ser. No. 13/673,070, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 9, Nov. 2012, which is currently co-pending or is an application of which a currently co-pending application is entitled to the benefit of the filing date, and which is a continuation of U.S. patent application Ser. No. 13/672, 575, entitled PRESENTING AN AUGMENTED VIEW IN RESPONSE TO ACQUISITION OF DATA INFERRING USER ACTIVITY, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 8, Nov. 2012.

For purposes of the USPTO extra-statutory requirements, the present application constitutes a continuation-in-part of U.S. patent application Ser. No. 13/648,012, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 9, Oct. 2012, which is currently co-pending or is an application of which a currently co-pending application is entitled to the benefit of the filing date, and which is a continuation of U.S. patent application Ser. No. 13/646,147, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, J R.; CLARENCE T. TEGREENE as inventors, filed 5, Oct. 2012.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s). If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes but is not limited to registering one or more first augmentations that were shown to a user through a first augmented view of a first actual scene, the one or more first augmentations having been shown at least at end of a segment of time, detecting, following the showing of the one or more first augmentations up to the end of the segment of time, one or more user behaviors of the user that when detected as occurring infers user's interest in seeing the one or more first augmentations; and displaying, in response at least in part to said detecting, one or more second augmentations through a second augmented view of the first actual scene or of a second actual scene, the one or more second augmentations to be displayed being based, at least in part, on the registering of the one or more first augmentations. In some implementations, at least one of the registering, detecting, or displaying being performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for registering one or more first augmentations that were shown to a user through a first augmented view of a first actual scene, the one or more first augmentations having been shown at least at end of a segment of time, means for detecting, following the showing of the one or more first augmentations up to the end of the segment of time, one or more user behaviors of the user that when detected as occurring infers user's interest in seeing the one or more first augmentations, and means for displaying, in response at least in part to said detecting, one or more second augmentations through a second augmented view of the first actual scene or of a second actual scene, the one or more second augmentations to be displayed being based, at least in part, on the registering of the one or more first augmentations. In addition to the foregoing, other system aspects are described in the claims, drawings, and text forming a part of the disclosure set forth herein.

In one or more various aspects, a system includes, but is not limited to, circuitry for registering one or more first augmentations that were shown to a user through a first augmented view of a first actual scene, the one or more first augmentations having been shown at least at end of a segment of time, circuitry for detecting, following the showing of the one or more first augmentations up to the end of the segment of time, one or more user behaviors of the user that when detected as occurring infers user's interest in seeing the one or more first augmentations, and circuitry for displaying, in response at least in part to said detecting, one or more second augmentations through a second augmented view of the first actual scene or of a second actual scene, the one or more second augmentations to be displayed being based, at least in part, on the registering of the one or more first augmentations. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, registering one or more first augmentations that were shown to a user through a first augmented view of a first actual scene, the one or more first augmentations having been shown at least at end of a segment of time, detecting, following the showing of the one or more first augmentations up to the end of the segment of time, one or more user behaviors of the user that when detected as occurring infers user's interest in seeing the one or more first augmentations, and displaying, in response at least in part to said detecting, one or more second augmentations through a second augmented view of the first actual scene or of a second actual scene, the one or more second augmentations to be displayed being based, at least in part, on the registering of the one or more first augmentations. In addition to the foregoing, other computer program product aspects are described in the claims, drawings, and text forming a part of the disclosure set forth herein.

In one or more various aspects, a system includes, but is not limited to an augmentation recording module configured to record one or more first augmentations that were shown to a user through a first augmented view of a first actual scene, the one or more first augmentations having been shown for a segment of time; a user behavior ascertaining module configured to ascertain one or more user behaviors of the user following the showing of the one or more first augmentations that when ascertained as occurring infers user's interest in seeing the one or more first augmentations; and an augmentation presenting module configured to present, prior to presenting in response to said ascertaining one or more second augmentations through a second augmented view of the first actual scene or of a second actual scene, one or more third augmentations that directs the user to execute one or more acts in order to view the one or more second augmentations, the one or more second augmentations having been based, at least in part, on the registered one or more first augmentations, wherein at least one of the augmentation recording module, the user behavior ascertaining module, or the augmentation presenting module is implemented using hardware.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIGS. 2A and 2B show the front and back views of an augmented reality (AR) device that is in the form of a tablet computer 20.

FIGS. 3A and 3B show different views of an augmented reality (AR) device that is in the form of a goggle 30.

FIGS. 4A and 4B show different views of an augmented reality (AR) device that is in the form of a goggle 40.

FIG. 8A shows another perspective of the augmentation recording module 102* of FIGS. 7A and 7B (e.g., the 106 augmentation recording module 102' of FIG. 7A or the 106 augmentation recording module 102" of FIG. 7B) in accordance with various implementations.

FIG. 8B shows the user behavior ascertaining module 104* of FIGS. 7A and 7B (e.g., the user behavior ascertaining module 104' of FIG. 7A or the user behavior ascertaining module 104" of FIG. 7B) in accordance with various implementations.

FIG. 8C shows the augmentation presenting module 106* of FIGS. 7A and 7B (e.g., the augmentation presenting module 106' of FIG. 7A or the augmentation presenting module 106" of FIG. 7B) in accordance with various implementations.

FIG. 8D shows another perspective of the user interface 110 of FIGS. 7A and 7B.

FIG. 8E shows another perspective of the one or more sensors 120 of FIGS. 7A and 7B.

FIG. 12B is a high-level logic flowchart of a process depicting alternate implementations of the augmentation displaying operation 906 of FIG. 9.

FIG. 12C is a high-level logic flowchart of a process depicting alternate implementations of the augmentation displaying operation 906 of FIG. 9.

DETAILED DESCRIPTION

Figure 1A:
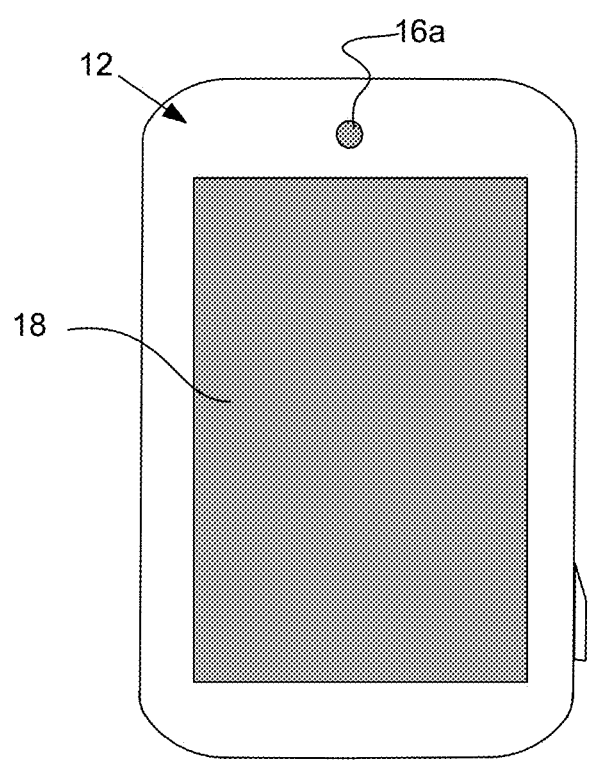
FIGS. 1A and 1B show the front and back views of an augmented reality (AR) device that is in the form of a smartphone 10.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

The evolution of personal computing technology over the past 40 years has been simply breathtaking, evolving from clunky large personal desktop computing devices with poor resolution television monitors and limited functionality to today's sleek and powerful mobile computing devices such as tablet computers and smartphones. As the personal computing technology continues to evolve a number of promising and exciting new technologies have emerged that are rapidly being developed for widespread personal use. One of the most promising new technologies is Augmented Reality (or simply "AR").

Wikipedia™ defines Augmented Reality as "a live, direct or indirect, view of a physical, real-world environment whose elements are augmented by computer-generated sensory input such as sound, video, graphics or GPS data." In order to facilitate understanding of the various concepts, processes, and systems to be discussed herein, certain basic terms and phrases will now be introduced and elucidated. For example, in the following the terms "augmentation," "augmented view," "actual view," "scene from a real environment," or variations thereof, are repeatedly recited. For purposes of the following, the phrase "scene from a real environment" will be in reference to an actual or true (visual) scene from an actual physical environment (as opposed to, for example, a virtual environment) in the proximate vicinity of an AR system and/or the user of the AR system (herein "AR device user"). For purposes of the following description, the phrase "actual view" is in reference to a true or unmodified (or substantially true or unmodified) view of a scene from the real environment. The phrase "augmented view," in contrast, is in reference to a view of an actual scene from the real environment that has been augmented (e.g., modified) and that may be presented (e.g., displayed or transmitted) through an AR system. An "augmentation" is any modification, revision, or addition that may be included in an augmented view of a scene from the real environment and that may not be present in the actual view of the scene from the real environment. Note that in the following the phrase "AR system" and the phrase "AR device" will be used interchangeably, and are therefore, synonymous for purposes of the following description.

There are at least two types of computing devices that can be used to implement AR technology: "specifically-designed" AR systems and "nonspecifically-designed" AR systems. Nonspecifically-designed AR systems are general purpose computing systems or devices that can be configured to implement AR functionalities by executing, for example, AR software applications. Examples of such devices include, for example, personal mobile computing/communication devices such as tablet computers and smartphones. In contrast, specifically-designed AR systems are systems or devices that have been specifically designed to implement AR functionalities. Specifically-designed AR systems may come in a variety of forms but are most commonly in the form of a head-mounted display (HMD) such as in the form of eyeglasses, goggles, helmet, and so forth. These devices are sometimes referred to as "wearable computing devices." Typically these wearable computing devices will include one or more features that allows the user to wear the device on his/or her head (e.g., a coupling device for coupling the AR device to a user's head). Such features include, for example, a strap, a pair of earpieces or temple pieces (e.g., the parts of goggles or glasses that are attached to the frame of, for example, a glasses and that extend out to the ears of the user holding the eyeglasses frame to the face of the user—see example 42a or 42b of FIG. 4A, or in the case of a helmet the helmet structure itself). Alternatively, a wearable computing device may be made wearable by having a feature (e.g., one or more clips or hooks) that allows it to be attached or clipped onto the frame of a pair glasses or goggles thus allowing the AR device to be coupled to the user's head. An example of such a feature may be found in the form of a clip 47a is illustrated in FIG. 4A.

All of these devices (e.g., specifically-designed AR systems and nonspecifically-designed AR systems) will usually have certain common components including one or more cameras (e.g., digital, web, and/or HD cameras), one or more displays (e.g., touchscreen, LCD displays, and/or see-through displays), and logic for processing data generated by the one or more cameras and/or for generating and merging computer generated data or images with actual views or images of scenes from real world environment to generate augmented views of the scenes of the real world environment. Although most if not all current AR systems will contain these same basic components (e.g., camera, display, etc.), they can, however, take on a wide range of form factors as briefly described above (e.g., tablet computer, goggles, glasses, helmets, and so forth).

Figure 1B:
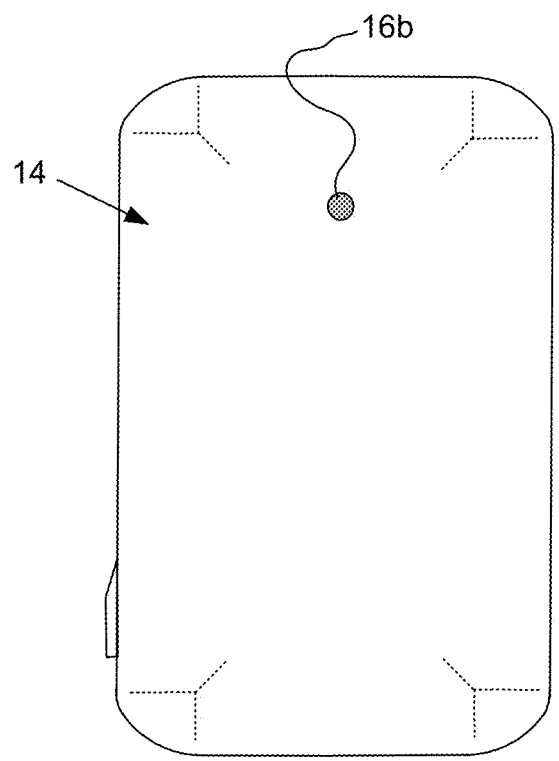

FIGS. 1A and 1B, 2A and 2B, 3A and 3B, and 4A and 4B illustrate some of the form factors that current AR devices can take on. For example, FIG. 1A depicts the front-side 12 (e.g., the side of a personal computing/communication device that a display is located or disposed on), respectively, of a nonspecifically-designed AR system that is in the form of a smartphone 10 and that can be configured or designed to implement one or more AR functionalities. FIG. 1B shows the backside 14 (e.g., the side of a personal computing/communication device that is opposite of the front-side 12 personal computing/communication device) of the exemplary smartphone 10 of FIG. 1A. The exemplary smartphone 10 may include a display 18, such as a touchscreen or liquid crystal display (LCD), on the front-side 12 of the smartphone 10. The smartphone 10 of FIGS. 1A and 1B is also depicted as having lens 16a for an inward-facing camera on the front-side 12 and lens 16b for a forward-facing camera on the back-side 14 of the smartphone 10. When employed to provide one or more augmented views of one or more scenes of real world environments, the display 18 may be used in order to display the augmented views. In some cases, the inward-facing camera associated with lens 16a may be used in order to track the gaze, focus, dwell path, and/or dwell time of one or more eyes of a user. The forward-facing camera that is associated with lens 16b, on the other hand, may be used to capture (e.g., sense and/or record) actual scenes of real world environments in order to generate augmented views of those actual scenes. The generated augmented views may then be displayed through display 18.

FIGS. 2A and 2B illustrates the front-side 22 (e.g., the side of a personal computing/communication device that a display is located or disposed on) and the backside 24 (e.g., the side of the computing/communication device that is opposite of the front-side of the computing/communication device), respectively, of a nonspecifically-designed AR system that is in the form of a tablet computer 20 and that can be configured or designed to implement one or more AR functionalities. In FIGS. 2A and 2B, the tablet computer 20 is depicted as having a display 28, such as a touchscreen, on the front-side 22 of the tablet computer 20. The tablet computer 20 is also depicted as having lens 26a for an inward-facing camera on the front-side 22 and lens 26b for a forward-facing camera on the back-side 24 of the tablet computer 20.

In some cases, the inward-facing camera associated with lens 26a may be used in order to track the gaze, focus, dwell path, and/or dwell time of one or more eyes of a user. The forward-facing camera associated with lens 26b on the back-side 24 of the tablet computer 20 may be used to capture (e.g., sense and/or record) actual scenes of real world environments in order to generate augmented views of those actual scenes. Note that in some cases, a single camera may be coupled to both lens 26a and lens 26b, thus the single camera can act as both a forward-facing and rear-facing camera. The generated augmented views may then be displayed through display 28. References to "real environment" or "real world environment" herein may be in reference to true or actual physical environments rather than to a virtual environment or virtual world.

FIGS. 3A and 3B illustrate a specifically-designed AR system in the form of video goggles 30 that can implement one or more AR functionalities. In particular, FIG. 3A illustrates a perspective view of the video goggle 30, which includes, among other things, a frame piece 32, a left temple 31a, and a right temple 31b. Disposed on the front-side 39a of the frame piece 32 are two forwarding looking lenses 34a and 34b for a pair of corresponding forward-looking cameras for capturing (e.g., recording, scanning, sensing, etc.) actual scenes of real world environments in order to generate augmented views of those actual scenes. FIG. 3B illustrates a view of the backside 39b of the frame piece 32 of the exemplary video goggles 30 of FIG. 3A. The backside 39b of the frame piece 32 is depicted as including a left display 38a and a right display 38b, a rim 35 surrounding the left display 38a and the right display 38b, a left lens 36a for a left inward-facing camera and a right lens 36b for a right inward-facing camera, and a left hinge 33b and a right hinge 33a. The rim 35 that may surround the left display 38a and the right display 38b may be a soft, semi-soft, or hard rim that in some cases may act as a cushion, as well as a barrier to prevent excess light from entering a user's field of view (thus allowing the user to better view the left and right displays 38a and 38b).

The forward-looking cameras associated with the forward-looking lens 34a and 34b may be used to capture (e.g., sense and/or record) actual scenes of real world environments in order to generate augmented views of those actual scenes. These augmented views that are generated may then be displayed through displays 38a and 38b. Note that in alternative implementations, the video goggle 30 may only employ a single forward-looking lens for a single forward-looking camera rather than employing two forward-looking lenses 34a and 34b for two forward-looking cameras as illustrated in FIG. 3A. In such implementations, the single forward-looking lens may be disposed at the mid-point or bridge part of the frame piece 32 above where a user's nose would be positioned. The output associated with the corresponding single forward-looking camera would then be displayed through both displays 38a and 38b.

The video goggles 30 may also include inward-looking lenses 36a and 36b as depicted in FIG. 3B for two inward-looking cameras (not shown) on the backside 39b of the frame piece 32 and disposed between the displays 38a and 38b and rim 35. The inward-looking cameras may be employed in order to track the movements as well as the gaze, focus, dwell path, and/or dwell time of one or more eyes of a user. Note that alternatively, the video goggles 30 may include fewer or more inward-looking cameras and inward-looking lenses. Further, there is no requirement that a corresponding camera is needed for each inward-looking lens as it may be possible to employ, for example, a single camera for viewing through multiple lenses.

The frame piece 32, the left temple 31a, and the right temple 31b may house various electronics that are designed for, for example, processing data provided by the various cameras (e.g., forward-looking as well as backward looking cameras), and for generating augmented views of scenes from real world environment that may be displayed through displays 38a and 38b. The types of electronics that may be included with the video goggles 30 may include, for example, the same or similar types of electronics (e.g., microprocessors, controllers, network interface card, memory, etc.) that are often found in mobile computing/communication devices such as the smartphone 10 or the tablet computer 20 described earlier. The left temple 31a and the right temple 31b are features that allow the AR system to be worn on a user's head.

Turning now to FIGS. 4A and 4B, which illustrate a specifically-designed AR system that is in the form of electronic glasses 40 that can implement one or more AR functionalities. In particular, FIG. 4A illustrates a perspective view of the electronic glasses 40, which includes, among other things, a frame piece 41 (which further includes a left rim piece 43a, a right rim piece 43b, and a bridge 44), a left temple 42a, a right temple 42b, a left lens 45a, a right lens 45b, a see-through display 46, and electronics housing 47 (note that in some cases, the electronics housing 47 may include an optional clip 47a for coupling the electronics housing 47 to the right temple 42b. The frame piece 41 having a front-side 49a and a backside 49b opposite of the front-side 49a. Disposed at the end of the electronics housing 47 is a forward-looking lens 48a for a corresponding forward-looking camera for capturing (e.g., recording, scanning, sensing, etc.) actual scenes of real world environments in order to generate augmented views of those actual scenes. In some alternative implementations, the forward-looking lens 48a may be alternatively located at bridge 44 of the frame piece 41 or at some other location. Note that the left lens 45a and the right lens 45b are optional and are not necessary for implementing AR functionalities.

In FIG. 4A, the see-through display 46 is depicted as covering only a portion of the right lens 45b and being depicted as being attached to the end of the electronics housing 47. Thus, the see-through display 46 may be used to display and overlay computer generated data and/or images onto portions of views of actual scenes of the real world environment that a user might see through right lens 45b. Note again that since the see-through display 46 covers only a portion of the right lens 45b, only a portion of the view that a user may see through the right lens 45b may be augmented (e.g., modified). In some other alternative implementations, the see-through display 46 may alternatively cover the entire right lens 45b so that the entire view of the user through the right lens 45b may be augmented if needed. Although the electronic glasses 40 in FIGS. 4A and 4B is depicted as having only one see-through display 46 over the right lens 45b, in alternative implementations, a second see-through display may be disposed over the left lens 45a. The left temple 42a and the right temple 42b are features that allow the AR system to be worn on a user's head.

FIG. 4B depicts a view of the backside 49b of the frame piece 41 of the electronic glasses 40 depicted in FIG. 4A. In FIG. 4B, the see-through display 46 can be seen through the clear right lens 45b. Further illustrated in FIG. 4B is an inward-looking lens 48b that can be seen through the clear right lens 45b and which is for a corresponding inward-looking camera. As illustrated the inward-looking lens 48b is disposed on the electronics housing 47 near the see-through display 46. The inward-looking cameras may be employed in order to track the movements as well as the gaze, focus, dwell path, and/or dwell time of the right eye of a user. The placement of the inward-looking lens 48b is a design choice and may be located elsewhere so long as it has a view to the right eye of a user. In alternative implementations, a second inward-looking lens for a second inward-looking camera may be included in order to track and monitor the movements as well as the gaze, focus, dwell path, and/or dwell time s of the left eye of the user. In the exemplary electronic glasses 40 illustrated in FIG. 4A, all of the major components are depicted as being located on the right-side of the electronic glasses 40. Alternatively, these components (e.g., electronic housing 47, see-through display 46, and so forth) may be alternatively or additionally located on the left-side of the electronic glasses 40.

The electronics housing 47 may house various electronics including electronics that are designed for, for example, processing data provided by the various cameras (e.g., forward-looking as well as inward looking cameras), and for generating augmented views of scenes from real world environment that may be displayed through see-through display 46. The types of electronics that may be included with the electronic glasses 40 may include, for example, the types of electronics (e.g., microprocessors, controllers, network interface card, memory, camera, battery, etc.) that are often found in mobile computing/communication devices such as the smartphone 10 or the tablet computer 20 described earlier.

In some cases, the electronic housing 47 (and its contents including one or more cameras) and the see-through display 46 may be a separate unit that can be clipped onto a prescription or non-prescription eyeglasses. In such an embodiment, the electronic housing 47 may include one or more features (e.g. one or more clips, magnets, straps, and so forth) that allows the housing to be worn by a user by allowing the electronic housing 47 to be attached to a pair of eye-glasses or goggles. Note that although not depicted herein, AR devices may come in other types of forms other than those illustrated in FIGS. 1A, 1B, 2A, 2B, 3A, 3B, 4A, and 4B including, for example, a helmet, a mask, and so forth.

Each of the form factors of AR devices illustrated in FIGS. 1A, 1B, 2A, 2B, 3A, 3B, 4A, and 4B support the ability to detect and monitor various user eye characteristics (e.g., eye movements, pupil characteristics, focus, dwell path, and so forth) of users by employing one or more inward-looking cameras. In addition, some form factors (e.g., the smartphone 10 or the tablet computer 20 illustrated in FIGS. 1A, 1B, 2A, and 2B) also supports systems with inward-facing cameras that can detect and monitor facial expressions of users (e.g., inward-facing camera that can be positioned to capture visual images of all or most of a user's facial features). In some cases, AR devices may also include and/or support other types of sensors (other than cameras) that can detect and monitor other types of user characteristics (e.g., physiological characteristics such as pulse, galvanic skin characteristics, and so forth) when users are using such devices to view, for example, augmented views (as well as actual views).

There are many types of augmentations that can be provided through AR systems including, for example, augmentations in the form of text, augmentations in the form of two or three-dimensional visual items (e.g., animation objects that may or may not move), and/or augmentations that simply modify, emphasize, delete, or de-emphasize existing real world items (e.g., intensity of light, color of a car, removal of undesirable elements in the corresponding real field of view such as rubbish on the ground, etc.) in an augmented view.

A variety of augmentations may be provided by AR systems including dynamic augmentations that evolve or change over time (e.g., that visually change over passage of time). For example, some augmentations that may be provided by AR systems may be images of animated objects (e.g., an animated clock, an animated cartoon character, etc.) that move over passage of time. Other types of dynamic augmentations that can be provided by AR systems include augmentations that provide changing textual information such as an ad rotator augmentation. Such an ad rotator augmentation may be displayed through an AR system as the AR system user, for example, walks through a mall (e.g., the selection of which ads to be displayed may be random or sequential, or may be based on other factors such as the location and/or orientation of the AR system, visual cues, wireless alerts or signals, and so forth). Still other augmentations that may be provided by AR systems may be augmentations that dynamically change based on to a user's physiological characteristics (e.g., augmentations that provide current physiological characteristics of the user) or change based on external environmental factors (e.g., augmentations that provide latest weather information, stock market information, etc.).

The various types of augmentations that may be provided by various AR systems can also be categorized by the basis in which such augmentations are included into a view of an actual scene from the real environment. For example, one type of augmentations that many currently available AR systems are designed to be able to include into an augmented view of an actual scene of the real environment are vision-based augmentations that depend, for their existence in the augmented view, on the presence of a visual cue (e.g., an "anchor" visual item) in the actual view of a scene from the real environment. That is, in many currently available AR systems, an augmentation will only be included into a view (e.g., an augmented view) of an actual scene from the real environment only when a visual cue is detected in the actual view of the scene. In some cases, the visual cue (i.e., anchor visual item) that may be the basis for the inclusion of the augmentation in the augmented view may be a visual marker (e.g., a recognizable symbol or pattern such as the face of a dollar bill) that may have been purposefully placed in an actual scene of the real environment in order to prompt an AR system to insert a particular augmentation into the augmented view of the actual scene of the real environment. In other cases, the visual cue may be a recognizable or identifiable visual pattern (e.g., a human face) that may be recognized using image feature analysis (e.g., image tracking such as Parallel Tracking). Of course, once such visual cues are no longer detected or found in the actual scenes of the real environment, the associated augmentation or augmentations will be deleted or removed from the views of the actual scenes.

There are, of course, other types of augmentations that currently available systems can provide or have been proposed that depend, for their existence in the views of actual scenes, on factors other than visual cues in the actual scenes of the real environment. For example, some current AR systems are designed to insert one or more augmentations into an augmented view based on the location of the AR system and/or which direction is the AR system "facing" (e.g., east, west, north, up, down, etc.). Of course, just like augmentations that depend on visual cues for their existence, these augmentations that depend on the AR system being at specific locations and/or orientation for their existence in augmented views will be deleted or removed once such conditions (e.g., the AR system being at the particular location or locations and/or being oriented in particular way or ways) no longer exists.

Thus, and as briefly described above, many of the augmentations that can be provided by current AR systems are dynamic augmentations that change or evolve, at least form- or content-wise, over time. These augmentations will also often have finite display life (e.g., the augmentations will be displayed for a finite amount of time after which they will, at least temporarily, ceased to be displayed in response to, for example, the anchor visual cue that cause the augmentations to be displayed being no longer detected or the AR system being relocated and/or being no longer having the same orientation as it had when it was displaying the augmentations). It is contemplated that there may be many situations where AR system users (or simply "users") may wish to refresh (e.g., to see or display again) previously displayed augmentations that are no longer being displayed or to refresh at least the last forms/states of augmentations that the augmentations were in before the augmentations were ceased from being displayed.

In accordance with various embodiments, computationally implemented methods, systems, circuitry, articles of manufacture, and computer program products are described herein that are designed to present, in response at least in part to ascertaining one or more behaviors of a user that when detected as occurring infers that the user is interested in seeing again one or more previously presented one or more first augmentations, one or more second augmentations that are based, at least in part, on the previously presented one or more first augmentations. In some embodiments, the one or more second augmentations may be the modified or unmodified version or versions of the one or more first augmentations. In various embodiments, the computationally implemented methods, systems, circuitry, articles of manufacture, and computer program products may be implemented on an AR device having any one of a variety of form factors (see, for example, the various form factors illustrated in FIGS. 1A, 1B, 2A, 2B, 3A, 3B, 4A, and 4B).

In some implementations, the computationally implemented methods, systems, circuitry, articles of manufacture, and computer program products may be designed to, among other things, registering one or more first augmentations that were shown to a user through a first augmented view of a first actual scene, the one or more first augmentations having been shown at least at end of a segment of time, detecting, following the showing of the one or more first augmentations up to the end of the segment of time, one or more user behaviors of the user that when detected as occurring infers user's interest in seeing the one or more first augmentations; and displaying, in response at least in part to said detecting, one or more second augmentations through a second augmented view of the first actual scene or of a second actual scene, the one or more second augmentations to be displayed being based, at least in part, on the registering of the one or more first augmentations.

Figure 7A:
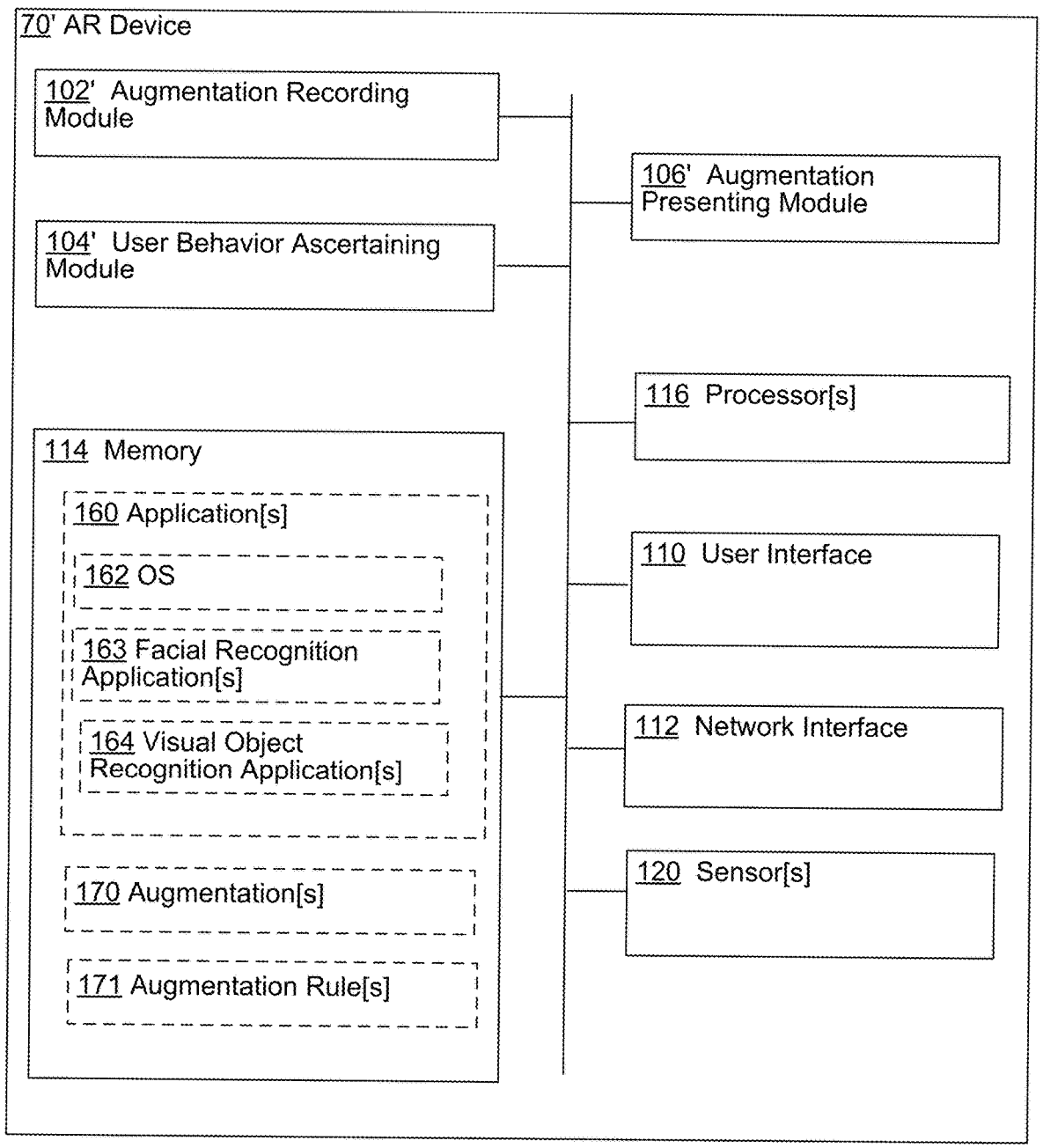
FIG. 7A shows a block diagram of particular implementation of an augmented reality (AR) device 70'.
Figure 7B:
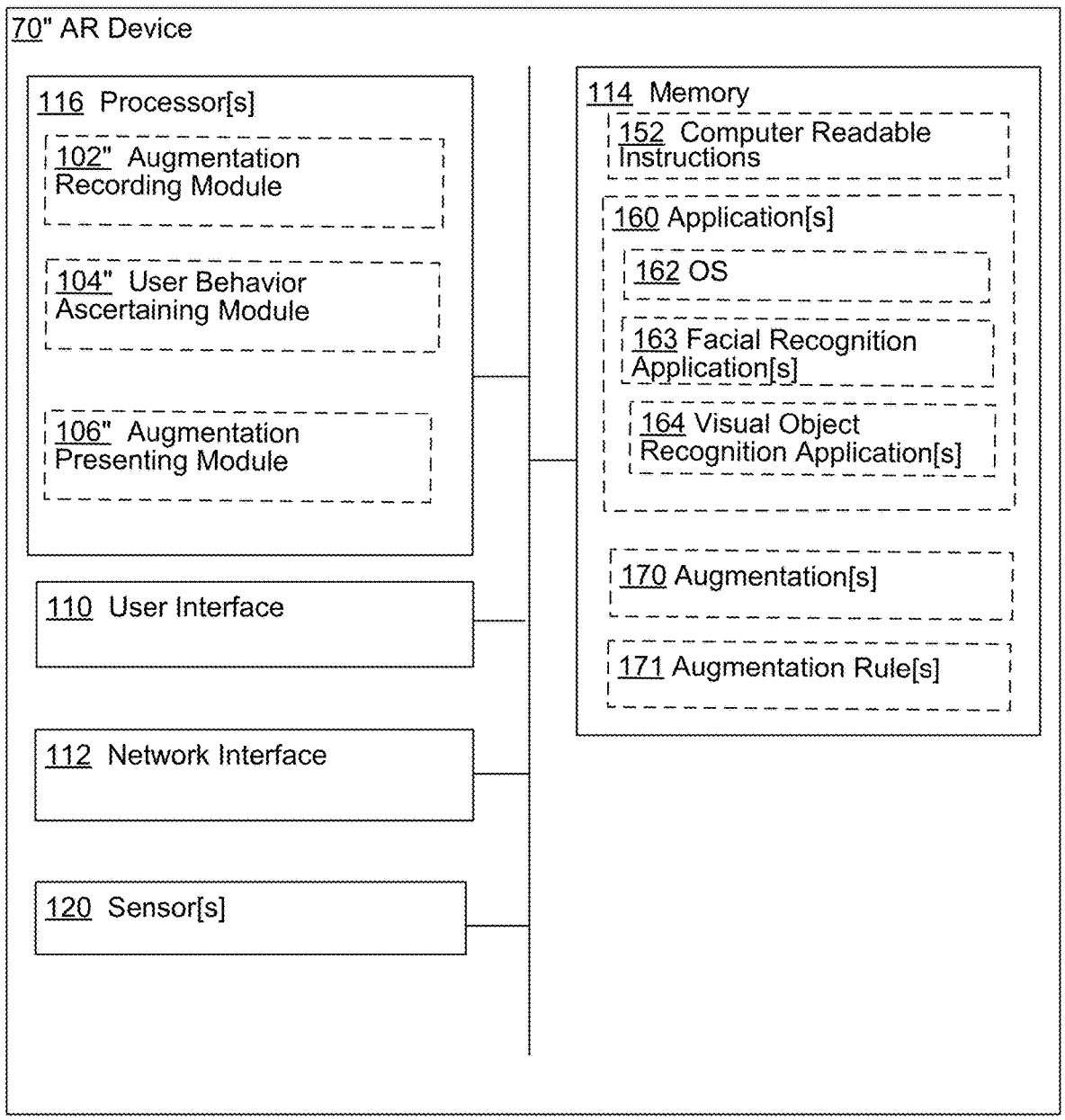
FIG. 7B shows a block diagram of another implementation of an augmented reality (AR) device 70".

In various embodiments, the methods, systems, circuitry, articles of manufacture, and computer program products in accordance with various embodiments may be implemented by, for example, the AR device 70* of FIG. 7A or 7B. Note that for purposes of the following, "*" represents a wildcard. Thus, references in the following to the AR device 70* of FIG. 7A or 7B may be in reference to the AR device 70' of FIG. 7A or to the AR device 70" of FIG. 7B. Note further that the AR device 70* of FIG. 7A or 7B may be a network device such as a network server, or a plurality of network devices (e.g., network servers) that are in communicatively interconnected with each other (e.g., cloud computing colloquially known as "the cloud").

Turning now to FIGS. 5A, 5B, 5C, 5D, 5E, 5F, 5G, 5H, 5I, 5J, 5K, 5M, 5N, 5P, 5Q, 5R, 5S, 5T, 5U, 5V, 5W, 5X, 5Y, and 5Z illustrating exemplary views (e.g., actual or augmented views) of various scenes from the real environment that may be displayed by, for example, the AR device 70* of FIG. 7A or 7B. In particular, the augmented and actual views illustrated in FIGS. 5A, 5B, 5C, 5D, 5E, 5F, 5G, 5H, 5I, 5J, 5K, 5M, 5N, 5P, 5Q, 5R, 5S, 5T, 5U, 5V, 5W, 5X, 5Y, and 5Z may be viewed by, for example, a user 62 depicted in the various exemplary scenarios illustrated in FIGS. 6A, 6B, 6C, 6D, and 6E. In particular, FIGS. 6A, 6B, 6C, 6D, and 6E illustrates some exemplary behaviors of a user 62 that may result, in the display by, for example, the AR device 70* of FIG. 7A or 7B, of the views 50b, 50c, 50d, 50e, and/or 50f of FIGS. 5B, 5C, 5D, 5E, and/or 5F. Note that for purposes of the following, "*" represents a wildcard. Thus, references in the following to the AR device 70* of FIG. 7A or 7B may be in reference to the AR device 70' of FIG. 7A or to the AR device 70" of FIG. 7B.

Note that the exemplary views that are illustrated in FIGS. 5A, 5B, 5C, 5D, 5E, 5F, 5G, 5H, 5I, 5J, 5K, 5M, 5N, 5P, 5Q, 5R, 5S, 5T, 5U, 5V, 5W, 5X, 5Y, and 5Z in combination with the exemplary user behavior scenarios illustrated in FIGS. 6A, 6B, 6C, 6D, and 6E will be referenced in subsequent discussions in order to facilitate understanding of the various processes/operations illustrated in FIGS. 9, 10A, 10B, 10C, 10D, 10E, 11A, 11B, 11C, 12A, 12B, 12C, 12D, and 12E. Note further that the various objects and items depicted in the various views illustrated in 5A, 5B, 5C, 5D, 5E, 5F, 5G, 5H, 5I, 5J, 5K, 5M, 5N, 5P, 5Q, 5R, 5S, 5T, 5U, 5V, 5W, 5X, 5Y, and 5Z as well as the various user behavior scenarios illustrated in FIGS. 6A, 6B, 6C, 6D, and 6E are not drawn to scale and are merely depicted in such a manner for ease of illustration and explanation.

Figure 5A:
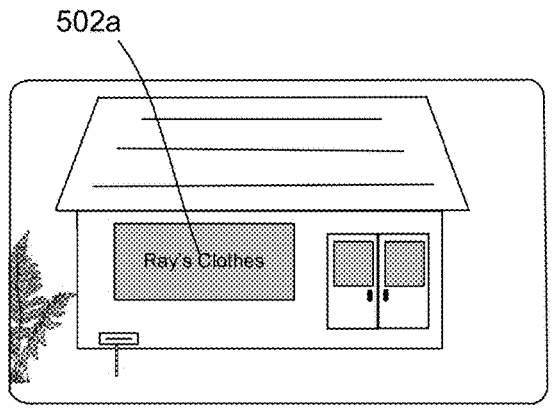
FIGS. 5A, 5B, 5C, 5D, 5E, 5F, 5G, 5H, 5I, 5J, 5K, 5M, 5N, 5P, 5Q, 5R, 5S, 5T, 5U, 5V, 5W, 5X, 5Y, and 5Z show exemplary actual or augmented views of various scenes from the real environment that may be provided by the augmented reality (AR) device 70' of FIG. 7A or the AR device 70' of FIG. 7B.

Referring particularly now to FIG. 5A, which illustrates an actual view 50a (herein "view 50a") of a scene from the real environment that may be captured and/or displayed by the AR device 70* of FIG. 7A or 7B when, for example, an exemplary user 62 (see FIG. 6A) using the AR device 70* strolls near a retail business (e.g., a clothing retailer). The view 50a shows the storefront of the retail business including a non-augmentation scene element 502a, which is a picture window with the name of the retail business written across the window. Referring now to FIGS. 5B, 5C, 5D, 5E, and 5F, which illustrates various augmented and non-augmented views of actual scenes at or near the retail business as the exemplary user 62 continues to look at the retail business and strolls past the retail business. In particular, views 50b, 50c, 50d, 50e, and 50f are exemplary views that may be displayed by the AR device 70* in response to one or more behaviors (e.g., ocular or body movements) of the user 62 as illustrated in, for example, in FIGS. 6A, 6B, 6C, 6D, and/or 6E.

Figure 5B:
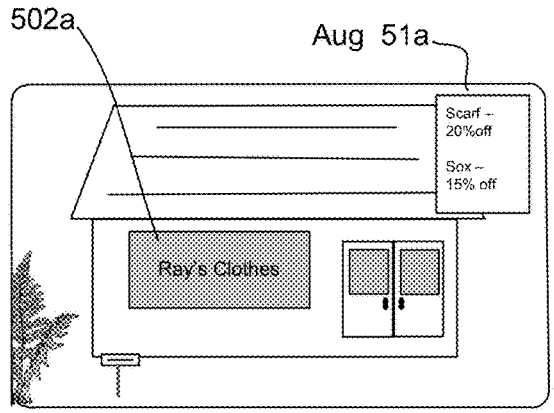

Turning now to FIG. 5B, which is another view 50b that may be displayed by the AR device 70* and that is an augmented view of the actual scene (e.g., view 50a) of FIG. 5A. The view 50b includes augmentation 51a, which may have been automatically inserted into view 50b by the AR device 70* in response to on one or more factors including in response to the location and/or orientation of the AR device 70*, in response to detecting an anchor visual cue such as detection of the non-augmentation scene element 502a (e.g., a picture window with the name of the retail store) in the actual scene (e.g., view 50a), and/or in response to one or more other factors. As illustrated, augmentation 51a includes text that provides retail or sales information. In some cases, the view 50b illustrated in FIG. 5B may represent the view displayed by the AR device 70* of FIG. 7A or 7B at a first point or increment in time.

Figure 5C:
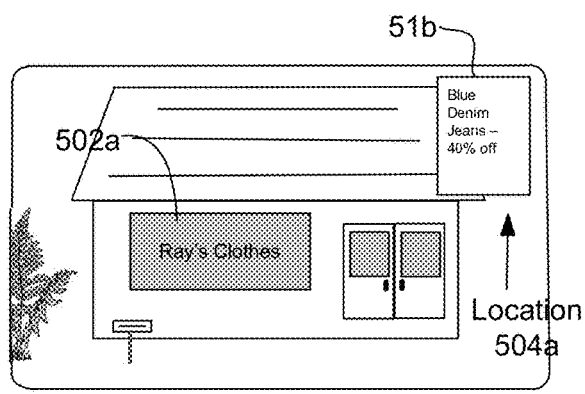

Referring now to FIG. 5C, which illustrates another view 50c (e.g., another augmented view) of the retail business of FIGS. 5A and 5B at a second point or increment in time. The view 50c includes augmentation 51b that is located at location 504a of view 50c and that includes retail or sales information similar to the augmentation 51a. Note, however, that the retail information included in augmentation 51b is different from the retail information included in augmentation 51a. Thus, augmentations 51a and 51b represents the same dynamic augmentation (e.g., an ad rotator) at two different points or segments in time. As will be further described herein, in various embodiments, the AR device 70* of FIG. 7A or 7B may be designed to register or record augmentation 51b (or at least its final form and/or content) before augmentation 51b is deleted from views provided by the AR device 70* and as illustrated in for example, FIG. 5D.

Figure 5D:
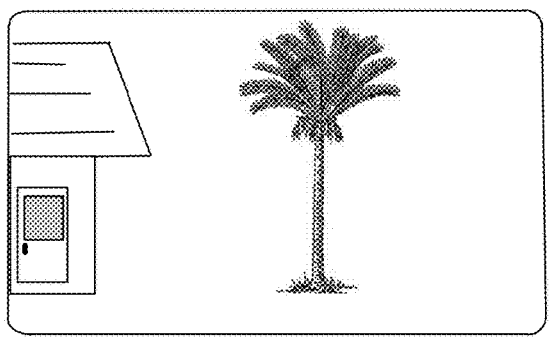

In particular, FIG. 5D is a view 50d, as captured/displayed by the AR device 70* of FIG. 7A or 7B of a second actual scene near the first actual scene (as captured by view 50a) of FIG. 5A. In particular, view 50d may have been captured/displayed by AR device 70* at a third point or segment in time as the exemplary user 62 moves away from the first actual scene (as embodied in view 50a of FIG. 5A) and which no longer displays augmentation 51b (e.g., augmentation 51b may no longer be displayed because an anchor visual cue such as the name on the window is no longer visible and/or because the location or orientation of the AR device 70* has changed).

Figure 5E:
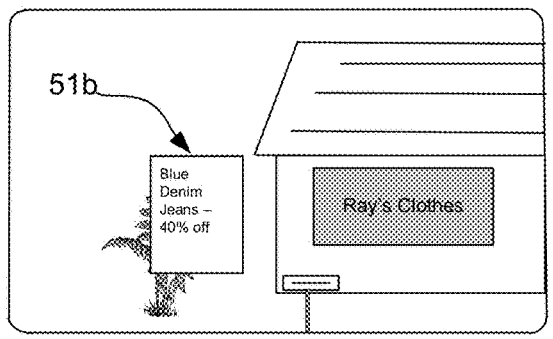
Figure 5F:
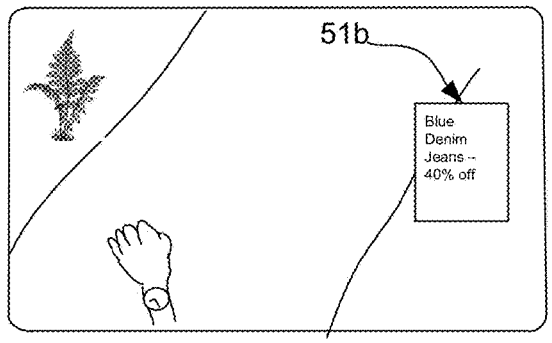
Figure 6A:
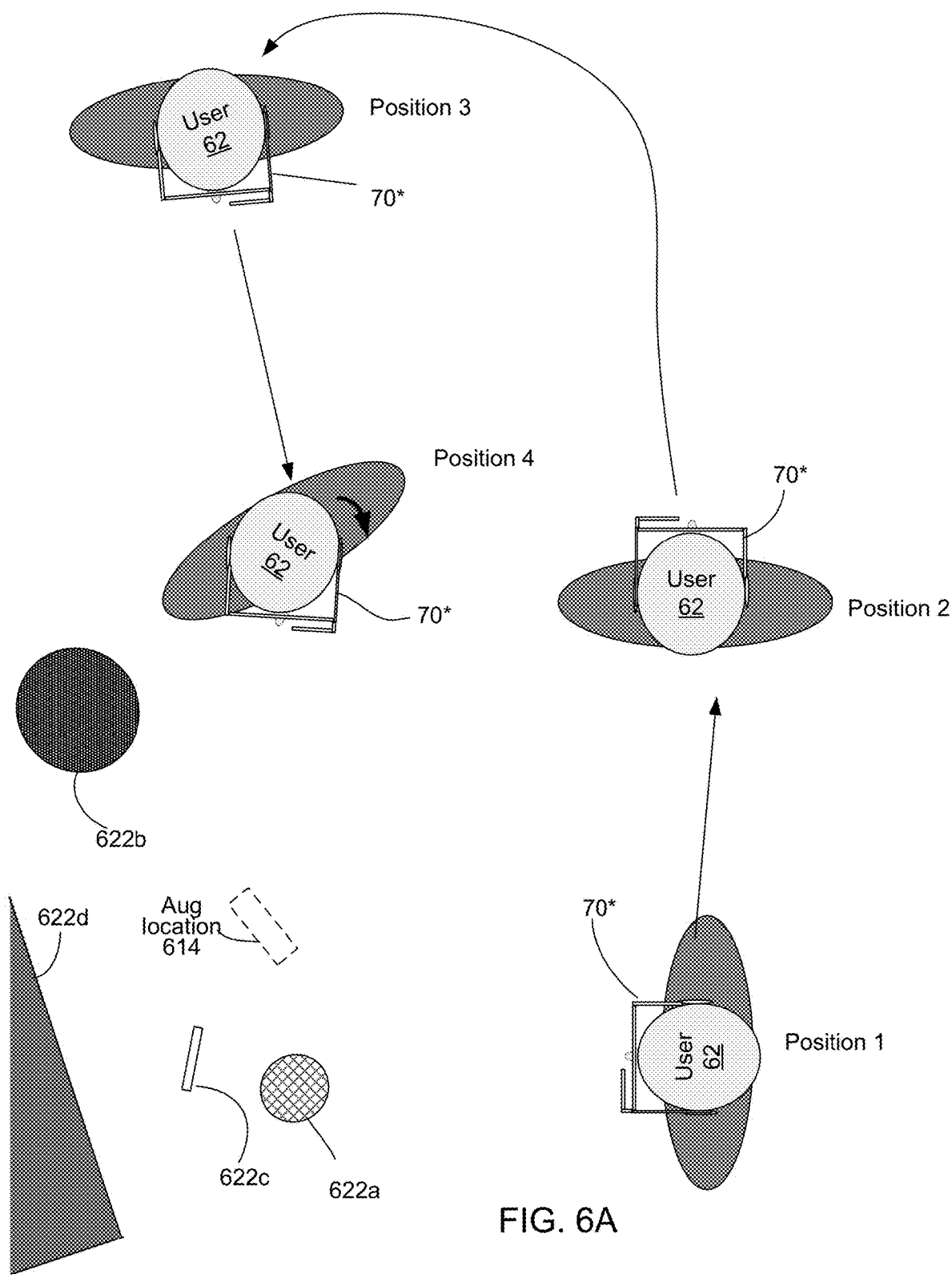
FIG. 6A shows a top-down view of a user 62 movements following display of an augmentation.

The movements of the exemplary user 62, when the AR device 70* is capturing and/or displaying the various views illustrated in FIGS. 5A, 5B, 5C, 5D, 5E, and 5F, are generally illustrated in FIG. 6A. In particular, FIG. 6A illustrates a top-down view of the exemplary user 62 initially viewing the retail business shown in the actual view 50a (as well as views 50b and 50c) of FIG. 5A before moving away from the retail business, and subsequently turning around to return to near the original location of the user 62 in order to see again the augmentation (e.g., augmentation 51b of FIG. 5C) that the AR device 70* that was presented when the user 62 was initially viewing the retail business. In FIG. 6A, the turning around and returning movements of the user 62 are represented by positions 3 and 4, which may also be associated with a fourth point or increment in time and a fifth point or increment in time, respectively.

FIG. 6A shows the various positions of the exemplary user 62 as the user 62 moves away from the proximate vicinity of the retail business before subsequently returning to the vicinity of the retail business. From the initial position (e.g., position 1) of the user 62, the user 62 may observe through an augmented view (e.g., augmented view 50b or 50c of FIG. 5B or 5C) of the retail business various non-augmentation scene element including a non-augmentation scene element 622a (e.g., a small bush that is also visible on the left side of views 50a, 50b, and 50c of FIGS. 5A, 5B, and 5C), a non-augmentation scene element 622b (e.g., a tree that is also visible on the right-side of view 50d of FIG. 5D), a non-augmentation scene element 622c (e.g., a sign that is also visible in views 50a, 50b, and 50c of FIGS. 5A, 5B, and 5C), and a non-augmentation scene element 622d (e.g., the top view of the retail business shown in views 50a, 50b, and 50c of FIGS. 5A, 5B, and 5C). The augmented view (e.g., augmented view 50b or 50c of FIG. 5B or 5C) that user 62 may see from position 1 may include an augmentation (e.g., augmentation 51a or 51b of FIG. 5B or 5C) that is inserted in the augmented view (e.g., augmented view 50b or 50c of FIG. 5B or 5C) equivalent to the augmentation location 614 illustrated in FIG. 6A.

As the user 62 moves away from the retail business, the user 62 moves to position 2. Sometime after the user 62 begins to move away from the retail business, the user 62 may decide that he wants to again see the augmentation (or at least see again the last form and/or content of the augmentation 51*b* of FIG. 5C that he last saw before the augmentation 51*b* was removed from view) that he last saw when he was looking at the retail business from position 1. As a result, the user 62 in an attempt to see again the previously displayed augmentation 51*b* may behave in a certain way such as stopping, turning, and moving towards near where he last saw the augmentation 51*b* as illustrated by positions 3 and 4. Based on one or more detected behaviors of the user 62, which when detected may infer the user 62's interest in seeing again a previously displayed augmentation (e.g., augmentation 51*b*), the AR device 70* may be prompted to display (as illustrated in FIG. 5E) the same augmentation 51*b* (or a modified version of augmentation 51*b*) that was previously displayed in the view 50*c* of FIG. 5C. Examples of the one or more detected behaviors of the user 62 that may cause the AR device 70* to, for example, restore a previously displayed augmentation 51*b* (or a modified version of the previously displayed augmentation 51*b*) includes for example, the geographic movements of the user 62 (as illustrated for example, in FIG. 6A), the head movements of the user 62 (see user 62 turning his head in position 4 of FIG. 6A), the ocular movements or characteristics of the user 62 (as illustrated in, for example, FIGS. 6B and 6C), and so forth. A more detailed discussion related to the detected user behaviors will be provided herein in subsequent discussions related to the various processes and operations of FIGS. 9, 10A, 10B, 10C, 10D, 10E, 11A, 11B, 11C, 12A, 12B, 12C, 12D, and 12E.

In any event, in response to the one or more detected behaviors (e.g., stopping and turning around) of the user 62, the AR device 70* may display a view 50*e* of FIG. 5E that includes augmentation 51*b*. Note that the actual scene corresponding to the view 50*e* is not the same as the actual scene corresponding to view 50*c* of FIG. 5*c*, which is the view in which augmentation 51*b* was last displayed. That is because the redisplay of augmentation 51*b* does not necessarily rely, for its existence in the augmented view 50*e*, on the same anchor visual cue or location/orientation of the AR device 70* that cause the augmentation 51*b* to be originally included in view 50*c* of FIG. 5C. Instead, the re-display of augmentation 51*b* (or at least a modified version as will be discussed herein) will be based, at least in part, on the detected one or more behaviors of the user 62. The view 50*e* illustrated in FIG. 5E depicts an augmented view that is displayed to the user 62 when the user 62 is, for example, in position 4.

In alternative implementations, however, the previously displayed augmentation 51*b* (or at least a modified version of augmentation 51*b*) may be re-displayed to user 62 at an earlier point in the example scenario depicted in FIG. 6A. That is, in alternative implementations, the user 62 may not need to return to the proximate vicinity of the retail business before he can again see the previously displayed augmentation 51*b* (or at least a modified version of augmentation 51*b*) as described above. Instead, the AR device 70* may be designed to re-display of the augmentation 51*b* (or a modified version of augmentation 51*b*) while the user 62 is still far away (e.g., when the user 62 is at position 62) from the original augmentation location 614 of the previously displayed augmentation 51*b* and when the retail business was not even in the sight of the user 62. In these implementations, the re-display of the augmentation 51*b* (or a modified version of it) may be primarily in response to the detected behavior of the user 62 (e.g., the user suddenly stopping and turning around towards the direction where he last saw the augmentation or the user 62 looking or scanning in the direction where he last saw the augmentation 51*b*) rather than in response to, for example, the same visual cue or the same location/orientation of the AR device 70* that cause the original augmentation 51*b* to be included into the view of the retail business.

As will be described in greater detail herein, in some implementations the AR device 70* may be designed to display a modified version of a previously displayed augmentation 51*b* rather than re-displaying the same version of the previously displayed augmentation 51*b*. For example, in some cases, in response to changes to the environment or to make the originally displayed augmentation 51*b* more visible or noticeable or for any other reasons a modified version of the augmentation 51*b* may be re-displayed instead of re-displaying the exact version of the originally displayed augmentation 51*b*.

Figure 5G:
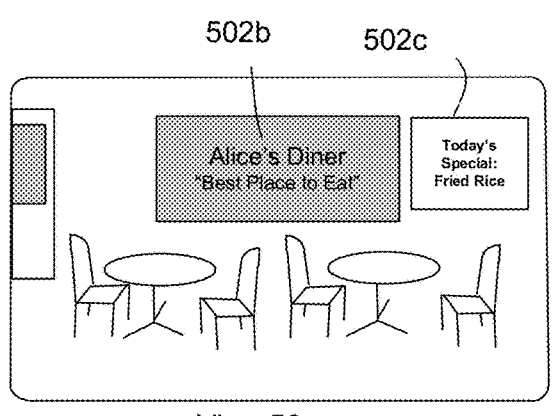

Referring now to FIGS. 5G, 5H, 5I, and 5J showing various exemplary non-augmented and augmented views (e.g., views 50*g*, 50*h*, 50*i*, and 50*j*) of an interior of a restaurant. The various exemplary non-augmented and augmented views (e.g., views 50*g*, 50*h*, 50*i*, and 50*j*) may be captured and/or displayed by the AR device 70* of FIG. 7A or 7B and displayed to a user such as user 62 of FIGS. 6A, 6B, 6C, 6D, and 6E who may be in the restaurant looking around the interior of the restaurant through the AR device 70*. Turning particularly to FIG. 5G, which illustrates a view 50*g* that may be captured and/or provided by the AR device 70* and that is an actual view of a scene from the interior of the restaurant. As illustrated, the view 50*g* includes a number of non-augmentation scene elements including a non-augmentation scene element 502*b* (e.g., a picture window with name of the restaurant written across it), a non-augmentation scene element 502*c* (e.g., a wall sign indicating the daily special), and other non-augmentation scene elements (e.g., chairs, tables, etc.).

Figure 5H:
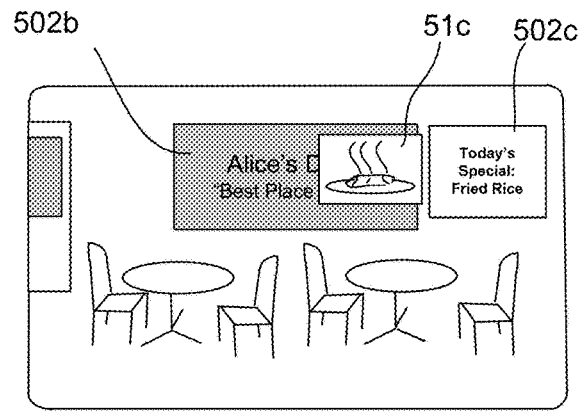

Referring now to FIG. 5H, which illustrates a view 50*h* that is the augmented view of an actual scene in the restaurant that was also captured by view 50*g* of FIG. 5G. In particular, view 50*h* includes an augmentation 51*c* that comprises an image of a meal corresponding to the daily special meal advertised on the wall sign (i.e., the non-augmentation scene element 502*c*) located to the right of the augmentation 51*c*. In various implementations, the augmentation 51*c* may have been automatically displayed in view 50*h* by the AR device 70* based on one or more detected anchor visual cues (e.g., non-augmentation scene element 502*b* and/or 502*c*), based on the detected location of the AR device 70*, and/or based on other factors.

In some implementations, augmentation 51*c* may be dynamic and may change or evolve over passage of time based on one or more factors. For example, in some cases, images of different meals may be sequentially shown automatically through augmentation 51*c* similar to an ad rotator while in other cases, images of different meals may be selectively shown through augmentation 51*c* in response to visually detecting visual markers posted throughout the restaurant. In still other cases, the images of different meals may be selectively shown based on other factors.

Thus, the display of augmentation 51*c* (or at least one form of the augmentation 51*c*) may be fleeting or at least time limited. FIG. 5OI shows a view 50*i* of the restaurant after the user 62 turns his body, head, and/or eyes in order look at another portion of the restaurant. In view 50*i*, the augmentation 51*c* has been removed from the user's view of the restaurant in response to one or more factors (e.g., passage of time, the orientation and/or movements of user 62's body, head, and/or eyes, etc.). Note, however that the AR device 70* may have, prior to removing or deleting the augmentation 51c from the view of the user 62, memorialize (e.g., record or register) at least the last form and/or content of the augmentation 51c that was displayed just before it was removed from view. By doing so, at least the form and/or content of the augmentation 51c that was last displayed may be quickly restored once a determination is made that the user 62 is interested in seeing again the previously displayed augmentation 51c (or to see at least a modified version of the previously displayed augmentation 51c).

Figure 5I:
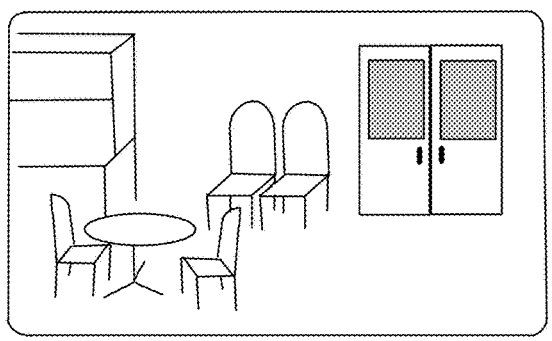
Figure 5J:
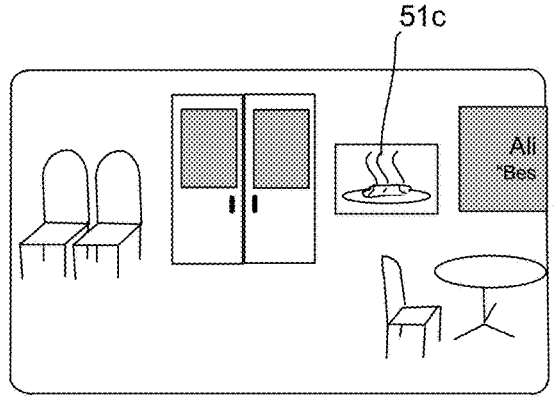

FIG. 5J illustrates a view 50j that is an augmented view of the same actual scene captured by view 50i of FIG. 5I. In particular, augmented view 50j includes an augmentation 51c that is the same as augmentation 51c in the augmented view 50h of FIG. 5H. The display of the augmentation 51c in view 50j may be in response to one or more detected behaviors (e.g., body or ocular movements) of the user 62 that when detected infers that the user 62 is interested in seeing again the previously displayed augmentation 51c. Note that the location of augmentation 51c in view 50j of FIG. 5j is different from the location of augmentation 51c in view 50h of FIG. 5H. That is, the location of augmentation 51c in view 5j is different from the location of augmentation 51c in view 50h relative to the common non-augmentation scene elements 502b and 502c (e.g., the picture window and the wall sign) included in both of the views 50h and 50j.

Thus, in some implementations, the AR device 70* may be design to, when re-displaying or restoring a previously displayed augmentation 51c (or modified version of the previously displayed augmentation 51c), place the restored augmentation 51c in a location that is different from the original location of the previously displayed augmentation 51c as was the case in the example scenario related to the views illustrated in FIGS. 5G, 5H, 5I, and 5H. In alternative implementations, however, the AR device 70* may be designed to place a restored previously displayed augmentation 51c in the same or proximate to the location that the previously displayed augmentation 51c was originally located at. Such a strategy may, in some cases, help a user 62 to more quickly find the restored augmentation 51c in his view since a user 62 will normally try to look for the previously displayed augmentation 51c at the same location where he last saw it.

Referring now to FIGS. 5K, 5M, 5N, and 5P showing various exemplary non-augmented and augmented views (e.g., views 50k, 50m, 50n, and 50p) of beach scene. The various exemplary non-augmented and augmented views (e.g., views 50k, 50m, 50n, and 50p) may be captured and/or displayed by the AR device 70* of FIG. 7A or 7B and displayed to a user such as user 62 of FIGS. 6A, 6B, 6C, 6D, and 6E who may be at the beach looking around.

Figure 5K:
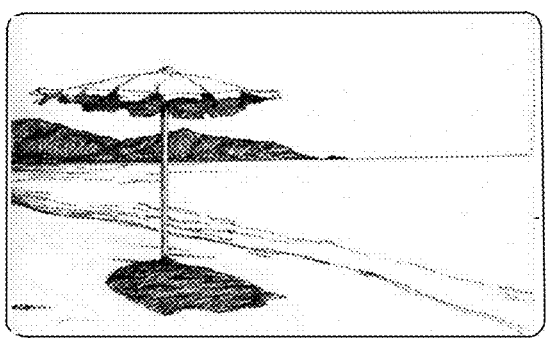
Figure 5M:
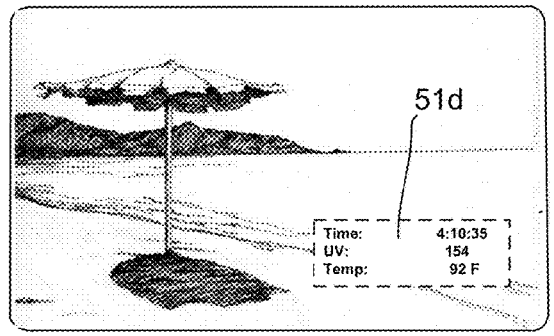
Figure 5N:
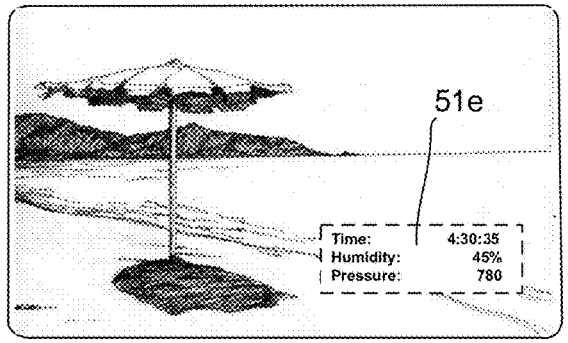
Figure 5P:
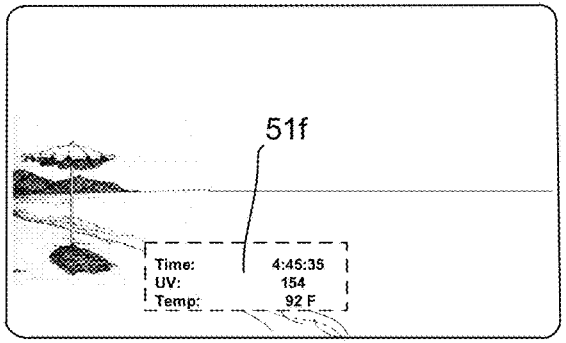

In particular, FIG. 5K illustrates a non-augmented view 50k of an actual scene from the beach. In contrast, FIGS. 5M, 5N, and 5P illustrate views 50m, 50n, and 50p that are augmented views of two actual scenes from the beach. In particular, views 50m and 50n are augmented views of the same actual beach scenes at two different points or increments in time. View 50m of FIG. 5M includes augmentation 51d while view 50n of FIG. 5N includes augmentation 51e. Note that augmentation 51d and augmentation 51e both provide current environmental information and are, in essence, the same dynamic augmentation providing different and evolving environmental information.

Sometime after view 50n of FIG. 5N was displayed, the user 62 walks away from the location where views 50n and 50m were displayed. Further, while walking away from that location, the user 62 may decides that he wants to see again augmentation 50n which causes the user to turn around and walk back towards his original location. Based on the detected behavior of the user 62, the AR device 70 displays view 50p of FIG. 5P, which is the augmented view of another actual scene from the beach. View 50p of FIG. 5P includes augmentation 51f, which is a modified version of augmentation 51e of FIG. 5N. In particular, augmentation 51f is very similar to augmentation 51e except that augmentation 51f having updated environmental information. Thus, the three views 50m, 50n, and 50p of FIGS. 5M, 5N, and 5P represents three views of the beach at three different points or increments in time (e.g., the view 50m being a first augmented view of an actual scene from the beach at a first point or increment in time, the view 50m being a second augmented view of the same actual scene from the beach at a second point or increment in time, and the view 50p being a third augmented view of another actual scene from the beach at a third point or increment in time). A more detailed discussion related to FIGS. 5K, 5M, 5N, and 5P will be provided in the following with respect to the various operations and processes to be discussed herein.

Figure 5Q:
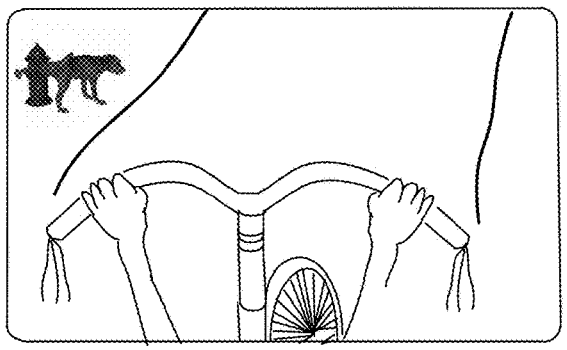
Figure 5R:
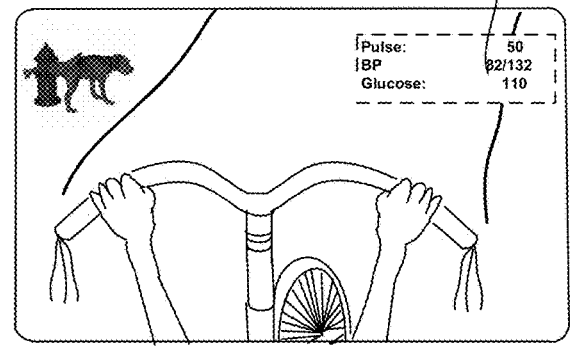

Referring now to FIGS. 5Q, 5R, 5S, 5T, and 5U showing various exemplary non-augmented and augmented views (e.g., views 50q, 50r, 50s, 50t, and 50u) that are captured and/or displayed by an AR device 70* of a user 62 who is riding a bicycle. In particular, view 50q of FIG. 5Q is a non-augmented view of an actual scene that may be captured by the AR device 70* while the user 62 is riding his bicycle. Meanwhile, view 50r of FIG. 5R is an augmented view of the same actual scene that includes an augmentation 51g that is a dynamic augmentation providing the most current user physiological information (e.g., physiological information that is being continuously updated). In some cases, the augmentation 51g may have been displayed by the AR device 70* as a result of the AR device 70* determining that the user 70* is riding the bicycle for exercise purposes rather than, for example, for leisure purposes (e.g., the AR device 70* may have detected elevated speed of the bicycle or detected that the user 2 is riding the bicycle on a bike trail that the user 62 has used in the past for exercise purposes). In some embodiments, an augmentation may include one or more persistent augmentations in the second one or more formats in response, at least in part, to user physiological data that infers one or more particular user activities (e.g., increased heart rate of the AR device user suggesting strenuous physical activities such as riding a bicycle, elevated blood sugar level suggesting dining activities, and so forth).

Figure 5S:
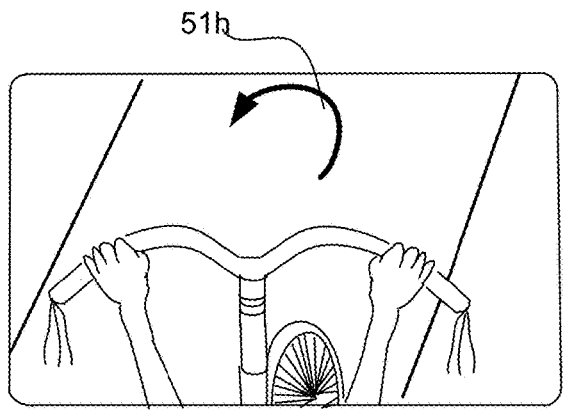
Figure 5T:
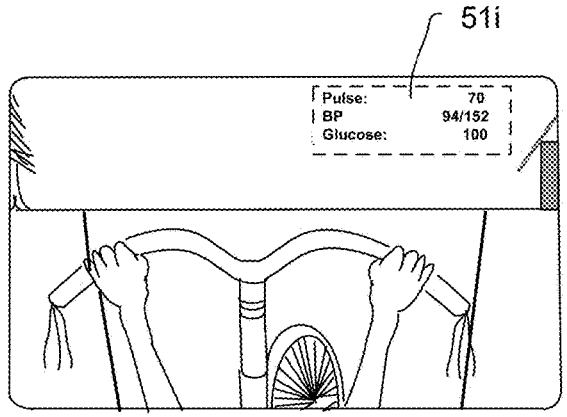
Figure 5U:
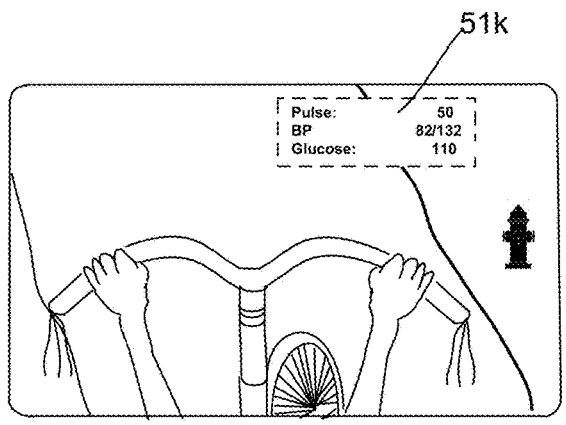

In contrast to view 50r of FIG. 5R, views 50s, 50t, and 50u of FIGS. 5S, 5T, and 5U are augmented views that may be provided by the AR device 70* after the originally displayed augmentation 51g has been removed from the view of the user 62 and after the user 62 has exhibited one or more detected behaviors that infers the user 62's interest in seeing the augmentation 51g again. In some cases, if the original augmentation 51g of FIG. 5R was displayed by the AR device 70* in response to the location of the user 62 (e.g., a location based augmentation) than AR device 70* may be designed to display view 50s that includes augmentation 51h that is an augmentation (e.g., an arrow) that directs the user 62 to turn around and return back to the proximate location where the AR device 70* last displayed augmentation 51g. Once the user 62 returns to the vicinity of where the user 62 last saw augmentation 51g, the AR device 70* may display view 50u of FIG. 5U, which includes augmentation 51k that mirrors augmentation 51g of FIG. 5R.

Alternatively, rather than directing the user 62 (and the AR device 70*) to return to the proximate location where the AR device 70* last displayed augmentation 51g in order see the augmentation 51g again, the AR device 70* may redisplay the augmentation 51g or at least a modified updated version of augmentation 51g based solely on one or more detected behaviors of the user 62 that indicates or infers that the user 62 is interested in seeing again the augmentation 51g. FIG. 5T illustrates view 50t that includes augmentation 51i (an updated version of augmentation 51g) and that is displayed by the AR device 70* based on a determination (a determination based on one or more detected user behaviors) that user 62 is interested in seeing again augmentation 51g. The augmentation 51i that may be displayed by AR device 70* may be displayed even though the user 62 and the AR device 70* are not in the vicinity of the location where the user 62 last saw augmentation 51g. A more detailed discussion related to FIGS. 5Q, 5R, 5S, 5T, and 5U will be provided below with respect to the processes and operations to be described herein.

Figure 5V:
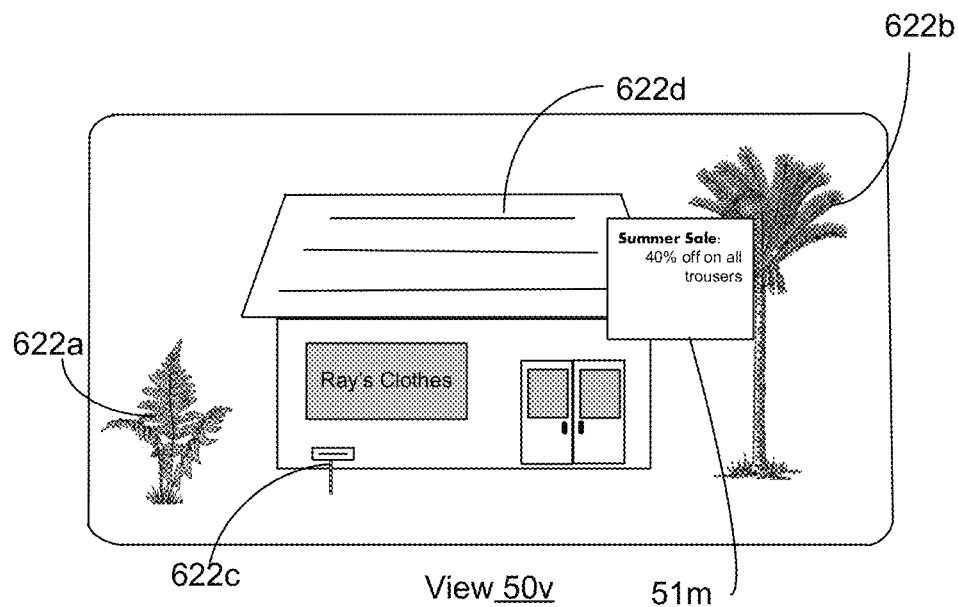
Figure 5W:
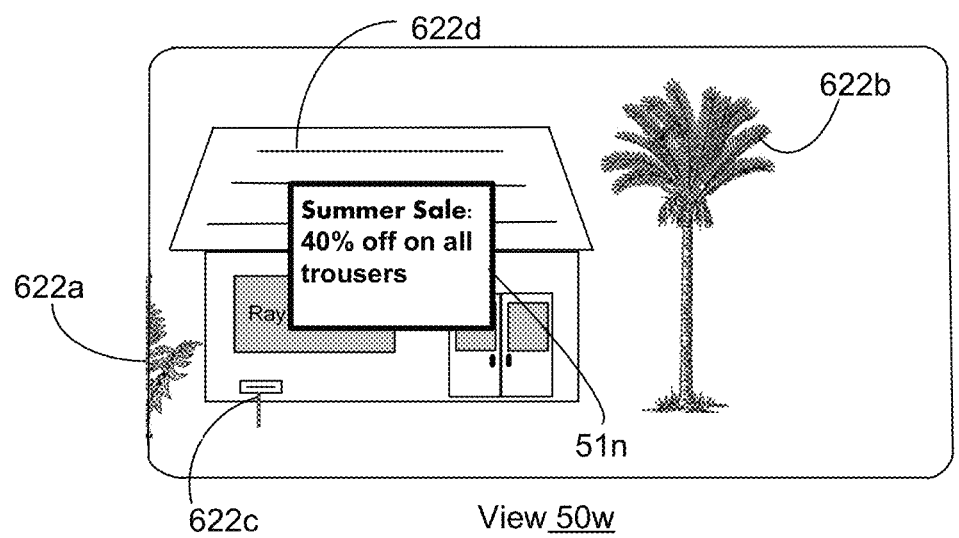

Referring now to FIGS. 5V and 5W, which are two exemplary views 50v and 50w that may be displayed by the AR device 70* of FIG. 7 or 7B in accordance with various implementations. In particular, views 50v and 50w are augmented views of the proximate vicinity of the retail business illustrated in FIGS. 5A, 5B, 5C, 5D, and 5E. In some implementations, view 50v of FIG. 5V and view 50w of FIG. 5W may be two augmented views of the retail business at two different points or increments in time. For example, view 50v of FIG. 5V having been displayed at a first point or increment of time while view 50w of FIG. 5W having been displayed at a second point or increment of time.

In various implementations, view 50v of FIG. 5V includes augmentation 51m, which provides sales information related to the retail business, while view 50w of FIG. 5W includes augmentation 51n, which is a modified version (e.g., modified to make it more noticeable such as being more centered in the screen, larger size, bolded, etc.) of augmentation 51m of FIG. 5V. For these embodiments, view 50w including augmentation 51n may have been displayed by the AR device 70* after augmentation 51m was no longer being displayed and after the AR device 70* detected one or more behaviors exhibited by the user 62 that indicates or infers that the user 62 was interested in seeing again augmentation 51m. A more detailed discussion related to views 50v and 50w of FIGS. 5V and 5W will be provided below with respect to the processes and operations to be described herein.

In some implementations, the AR device 70* of FIG. 7A or 7B may be designed to provide one or more directions (e.g., instructions) for a user to execute in order to see again a previously displayed augmentation (or a modified version of the previously displayed augmentations. For example, if the AR device 70* detects certain user behavior (e.g., user 62 suddenly stopping and looking towards where the user 62 last saw a previously displayed augmentation) that when detected infers user's interest in seeing again a previously displayed augmentation, than rather showing then immediately showing the previously displayed augmentation, directing the user 62 to execute one or more actions (e.g., walking or moving to a particular location or visually focusing on a particular location) in order to see the previously displayed augmentation. That is, in many cases, it may be desirable to have the user 62 see the previously displayed augmentation in its original setting (e.g., for example, if an augmentation contains information related to a non-augmentation scene element such as a parked car, than it may be preferred that the augmentation be displayed with the associated non-augmentation scene element) since many augmentations may only be relevant in the context (e.g., visual environment) in which such augmentations are being presented.

Figure 5X:
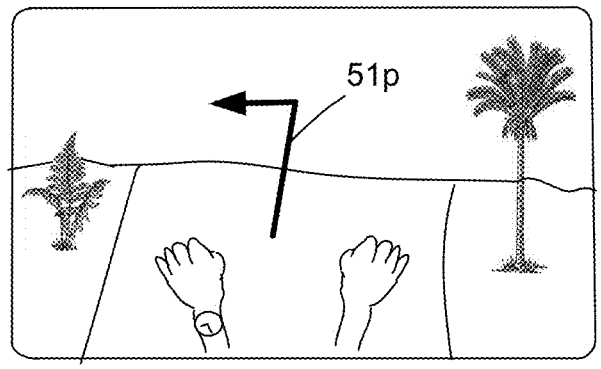
Figure 5Y:
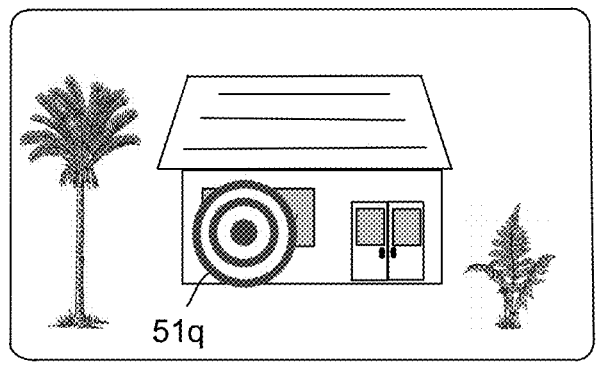
Figure 5Z:
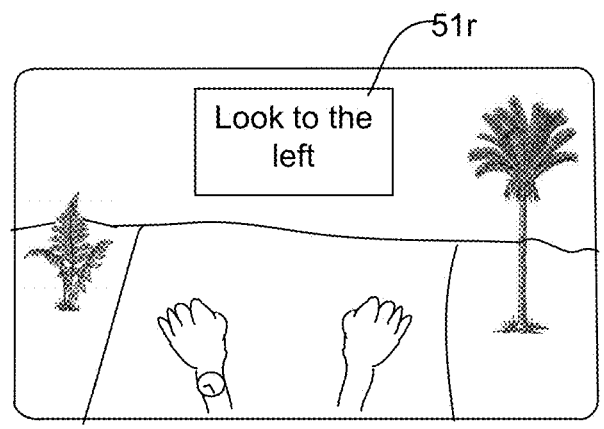

Thus, in various implementations, the AR device 70* may be designed to provide to a user 62 one or more augmentations (e.g., textual and/or symbolic augmentations) that instructs or directs the user 62 as to how he can see again a previously displayed augmentation. FIGS. 5X, 5Y, and 5Z illustrates various exemplary views 50x, 50y, and 50z that includes different example augmentations for directing a user 62 to execute one or more acts in order to see again a previously displayed augmentation. For example, FIG. 5X illustrates an arrow augmentation 51p that directs a user 62 to move (e.g., walk, peddle, or drive) in a particular direction. In contrast, FIG. 5Y illustrates a bull's eye augmentation 51q (note that in alternative implementations, augmentation 51q may be opaque or semi-transparent) that directs a user 62 to visually focus and/or to move to a particular location. FIG. 5Z illustrates yet another type of instructional augmentation, a textual augmentation 51r, that provides textual instructions on how the user 62 can see the previously displayed augmentation (or a modified version of the previously displayed augmentation).

Figure 6B:
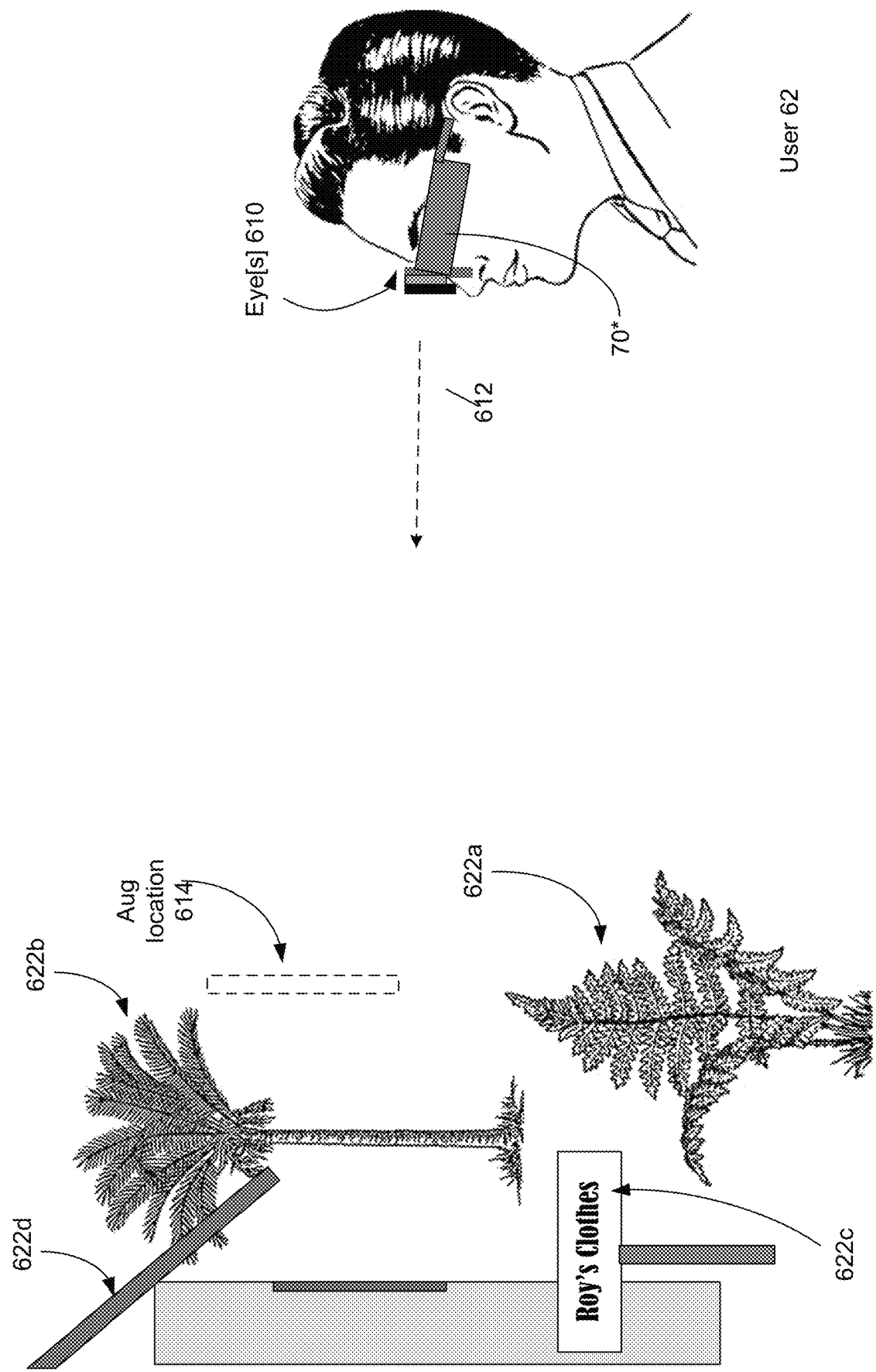
FIG. 6B shows a side view of the user 62 viewing the actual location of an actual scene where an augmentation was depicted in an augmented view as being present.
Figure 6C:
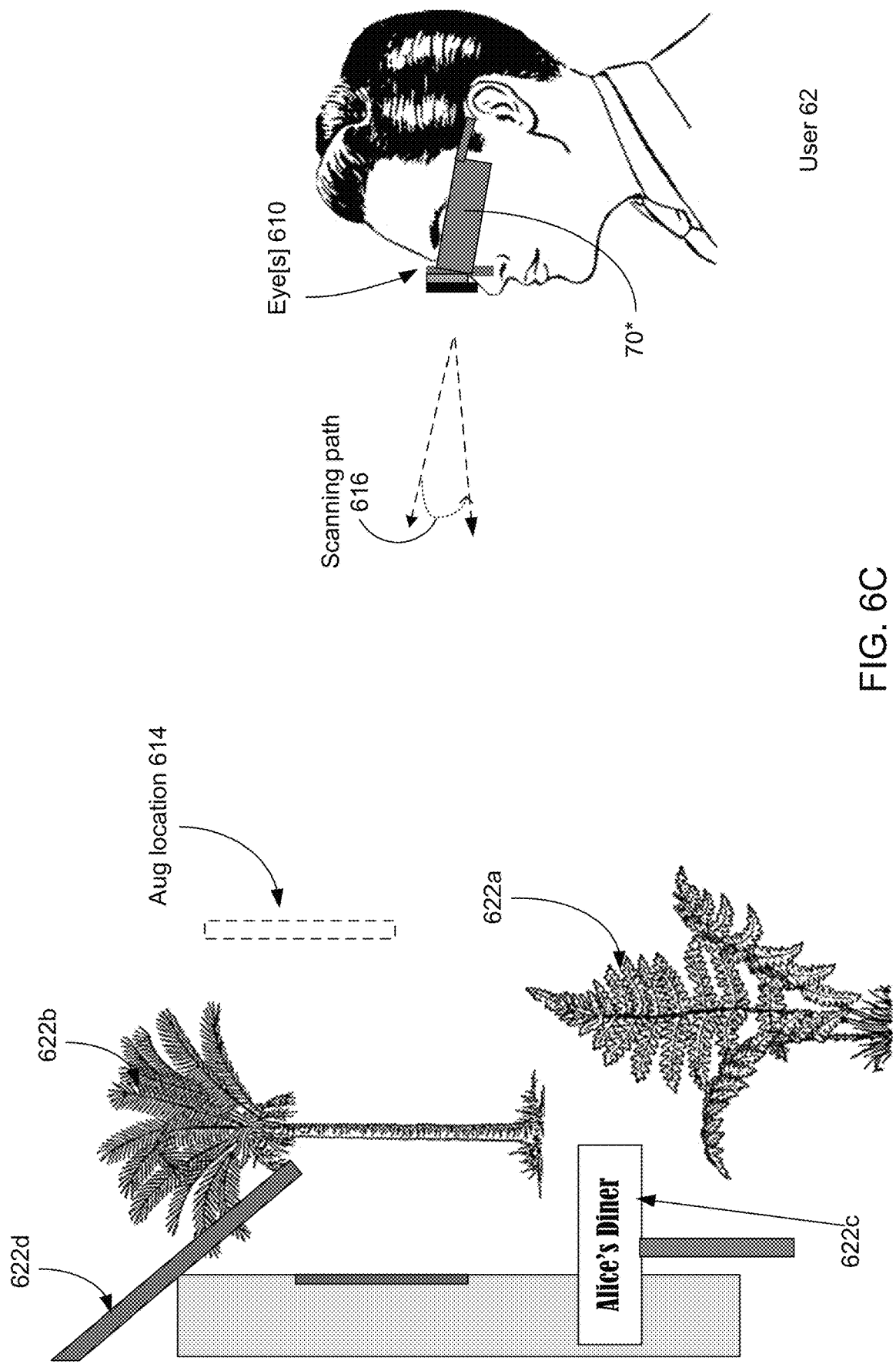
FIG. 6C shows a side view of the user 62 scanning the proximate area of the actual location of an actual scene where an augmentation was depicted in an augmented view as being present.

Referring now to FIGS. 6A, 6B, and 6C, which illustrate some exemplary characteristics (e.g., user behaviors) of a user 62 that may be sensed/detected by the AR device 70* of FIG. 7A or 7B. In various embodiments, the detection of certain user characteristics (e.g., certain user behaviors) may infer that the user 62 is interested in seeing again a previously displayed augmentation (or a modified version of the previously displayed augmentation). FIGS. 6A, 6B, and 6C introduce various concepts that may be helpful in order to understand the types of user behaviors that may detected by the AR device 70*. Note that the example scenario (e.g., an AR system user walking in the vicinity of a retail business) associated with the example views of FIGS. 5A, 5B, 5C, 5D, 5E, and 5F form the basis for the exemplary situations illustrated in FIGS. 6A, 6B, and 6C.

As previously discussed, and in brief, FIG. 6A illustrates an example top-down view of certain body movements (e.g., physical behaviors) of a user 62 that may be exhibited by the user 62 when the user 62 acts (e.g., executes certain actions) in order to see again a previously displayed augmentation (e.g., after walking away from where he saw an augmentation, the user 62 turning around and returning towards where he last saw the augmentation). In particular, FIG. 6A shows the user 62 first walking away from a visual scene where he saw an augmentation (e.g., augmentation 51b of FIG. 5C) at augmentation location 614 before returning to near where he last saw the augmentation. The illustrated visual scene includes various non-augmentation scene elements including a non-augmentation scene element 622a (e.g., a bush), a non-augmentation scene element 622b (e.g., a tree), a non-augmentation scene element 622c (e.g., a sign) and a non-augmentation scene element 622d (e.g., a top-down view of a retail business). Note that these non-augmentation scene elements are not drawn to scale nor are they accurate depictions of what they represent, but instead, are presented in this manner merely for ease of illustration.

In contrast, FIGS. 6B and 6C illustrate ocular behaviors of a user 62 with respect to the store front scene of the retail business illustrated in FIG. 6A as well as FIGS. 5A, 5B, 5C, 5D, and 5E. In particular, FIGS. 6B and 6C illustrate some exemplary ocular characteristics of a user 62 that may be detected in order to, for example, determine or infer that the user 62 is interested in seeing again a previously displayed augmentation. That is, when a user 62 is seeking to find a previously displayed augmentation that is no longer be visible, the one or more eyes 610 of the user 62 may exhibit certain behaviors or characteristics that when detected as occurring infers that the user 62 may be interested in seeing again the previously displayed augmentation. FIG. 6B illustrates the ocular focus (e.g., eye focus) of the user 62 with respect to the store front scene from FIGS. 5A, 5B, 5C, 5D, and/or 5E that may be detected or sensed by the AR device 70*. FIG. 6C, on the other hand, illustrates an example scanning behavior (that can be characterized in the form of a dwell or scanning path 616) of the user 62 that may be exhibited by the user 62 when the user 62 is visually searching for a previously displayed augmentation. A more detailed discussion related to the various scenarios illustrated in FIGS. 6A, 6B, and 6C will be provided below with respect to the processes and operations to be described herein.

Figure 6D:
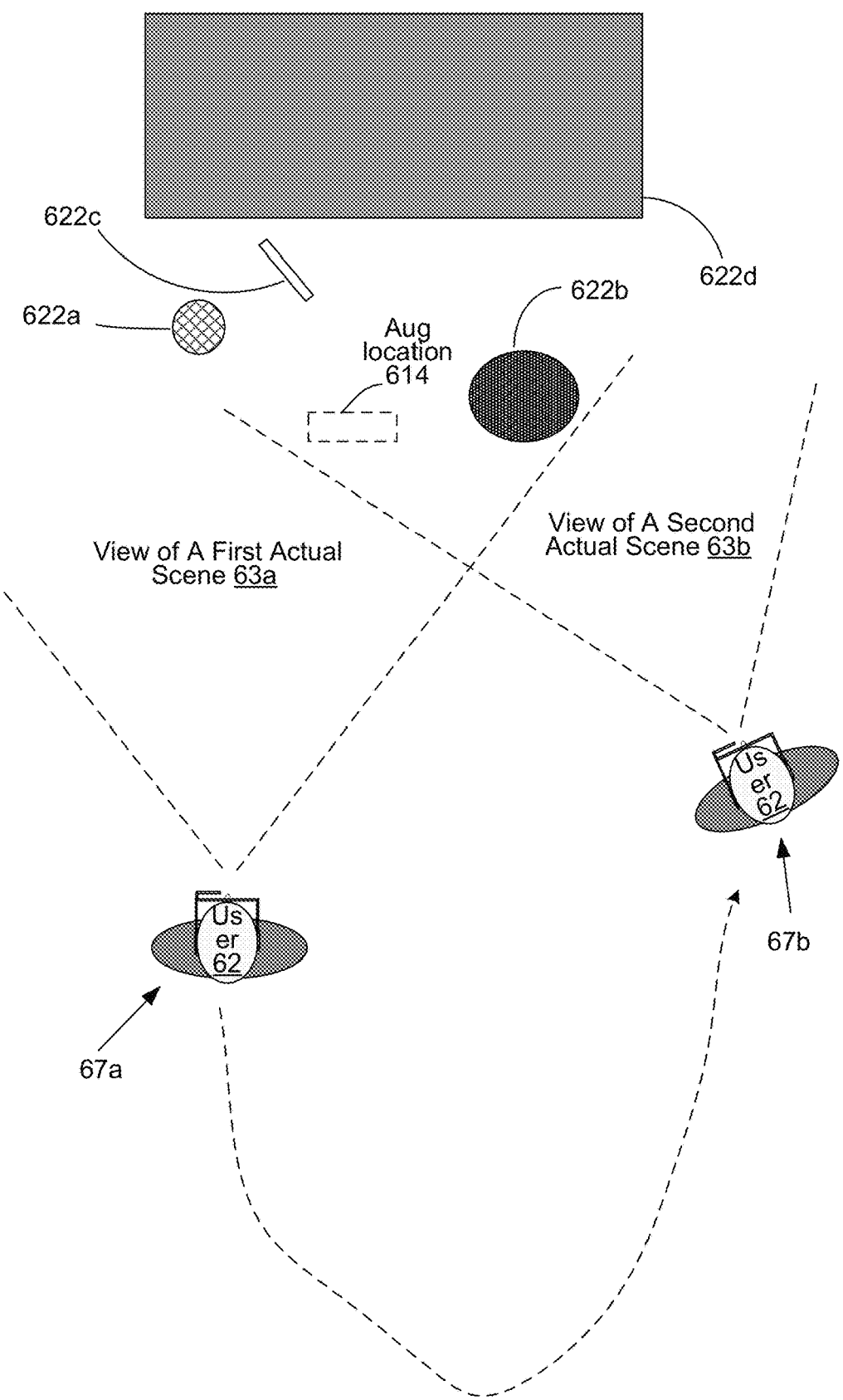
FIG. 6D shows an exemplary top-down view of a user 62 viewing an actual scene from different perspectives.
Figure 6E:
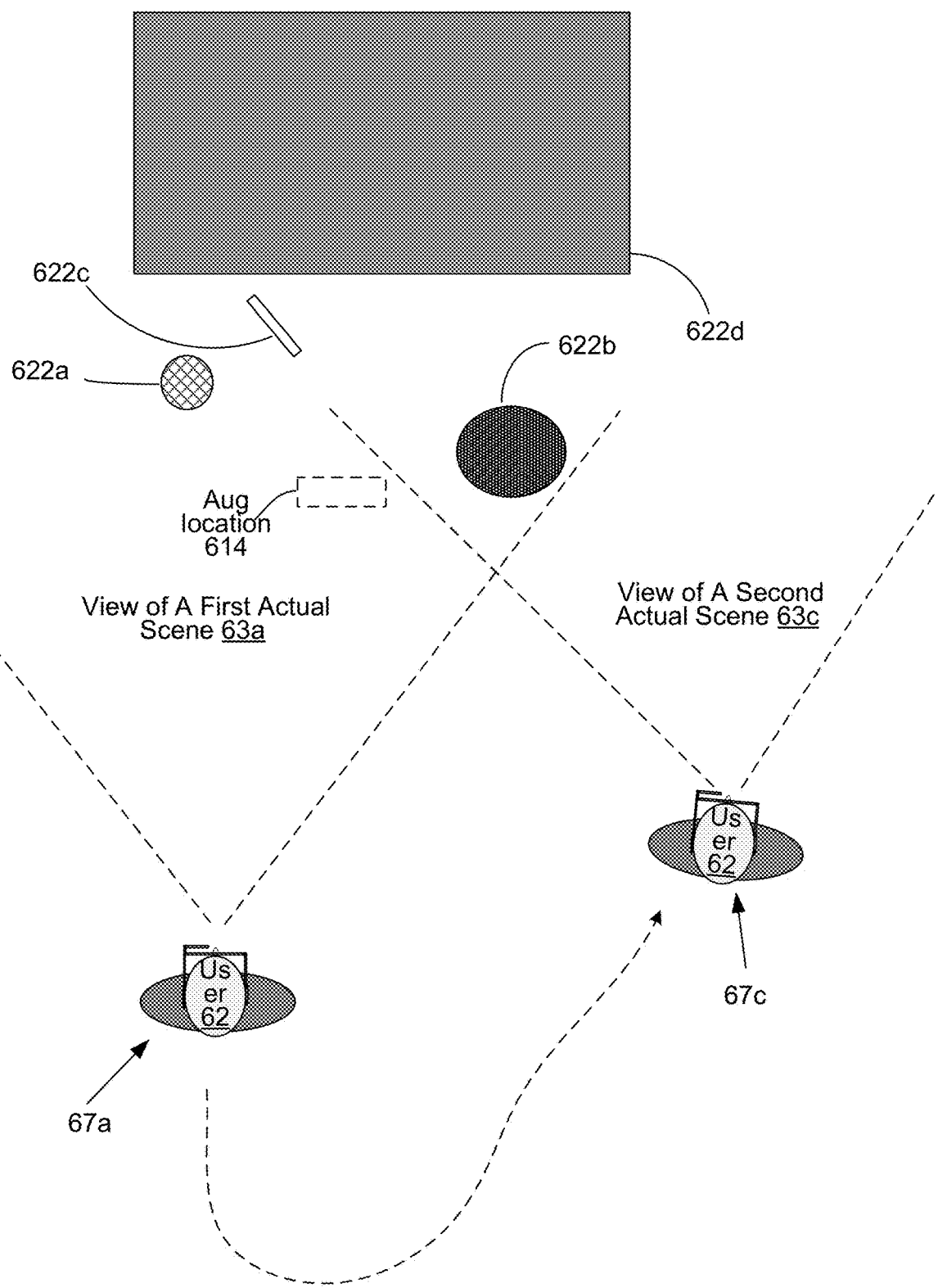
FIG. 6E shows another exemplary top-down view of a user 62 viewing an actual scene from different perspectives.

Referring now to FIGS. 6D and 6E, which illustrates top-down views of a user 62 looking at the store front scene illustrated in FIGS. 6A, 6B, and 6C from two different perspectives. In particular, FIGS. 6D and 6E introduce certain concepts that will be subsequently discussed herein. FIG. 6D shows a user 62 looking at the store front scene first from location 67a, and second, from location 67b. As a result, the user 62 viewing through an augmented view or non-augmented view a first actual scene 63a and a second actual scene 63b that may overlap the first actual scene 63a. Similarly, FIG. 6E shows a user 62 looking at the store front scene first from location 67a, and second, from location 67c. As a result, the user 62 viewing through an augmented view or non-augmented view a first actual scene 63a and a second actual scene 63c that may overlap the first actual scene 63a. Note that although the example views illustrated in FIGS. 6D and 6E appear to be similar they are, in fact, different as the overlap between the actual scenes (e.g., actual scenes 63a and 63c) illustrated in FIG. 6E is smaller than the overlap between the actual scenes (e.g., actual scenes 63a and 63b) illustrated in FIG. 6D. In any event, a more detailed discussion related to the various scenarios illustrated in FIGS. 6D and 6E will be provided below with respect to the processes and operations to be described herein.

Referring now to FIGS. 7A and 7B, illustrating two block diagrams representing two different implementations of AR device 70* that can execute the operations and processes to be described herein. In particular, and as will be further described herein, FIG. 7A illustrates an AR device 70' that is the "hardwired" or "hard" implementation of an augmented reality system that can implement the operations and processes to be described herein. The AR device 70' may include certain logic modules including, for example, an augmentation recording module 102', a user behavior ascertaining module 104', and/or an augmentation presenting module 106' that are implemented using purely hardware or circuitry components (e.g., application specific integrated circuit or "ASIC"). In contrast, FIG. 7B illustrates an AR device 70" that is the "soft" implementation of an augmented reality system that can implement the operations and processes to be described herein. In various embodiments, the AR device 70" may include certain logic modules including, for example, an augmentation recording module 102", a user behavior ascertaining module 104", and/or an augmentation presenting module 106" that are implemented using electronic circuitry (e.g., one or more processors including one or more microprocessors, controllers, etc.) executing one or more programming instructions (e.g., software in the form of computer readable instructions 152—see FIG. 7B).

The embodiments of the AR device 70* illustrated in FIGS. 7A and 7B are two extreme implementations of an augmented reality system in which all of the logic modules (e.g., the augmentation recording module 102', the user behavior ascertaining module 104', and the augmentation presenting module 106') are implemented using purely hardware solutions (e.g., circuitry such as ASIC) as illustrated in FIG. 7A or in which all of the logic modules (e.g., the augmentation recording module 102", the user behavior ascertaining module 104", and the augmentation presenting module 106") are implemented using software solutions (e.g., programmable instructions in the form of computer readable instructions 152 being executed by hardware such as one or more processors) as illustrated in FIG. 7B. Since, there are many ways of combining hardware, software, and/or firmware in order to implement the various logic modules (e.g., the augmentation recording module 102*, the user behavior ascertaining module 104*, and the augmentation presenting module 106*), only the two extreme implementations (e.g., the purely hardware solution as illustrated in FIG. 7A and the software solution of FIG. 7B) are illustrated here. It should be noted here that with respect to the "soft" implementation illustrated in FIG. 7B, hardware in the form of circuitry such as one or more processors 116 are still needed in order to execute the software. Further details related to the two implementations of the AR device 70* illustrated in FIGS. 7A and 7B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 7A, which illustrates a block diagram of an AR device 70' that includes an augmentation recording module 102', a user behavior ascertaining module 104', and/or an augmentation presenting module 106', one or more processors 116 (e.g., one or more microprocessors), a memory 114, a user interface 110 (e.g., a keyboard, a touchscreen, a microphone, and so forth), a network interface 112 (e.g., a network interface card or "NIC"), and one or more sensors 120. In various embodiments, the memory 114 may store one or more applications 160 (e.g., an operating system (OS) 162, one or more facial recognition applications 163, and/or one or more visual object recognition applications 164 for visually recognizing one or more items that are visible in a scene from the real physical environment), one or more augmentations 170, and one or more augmentation rules 171 that are one or more directives for directing when and how augmentations are to be presented. Although not depicted, the memory 114 may further include other types of applications not depicted in FIG. 7A including, for example, communication applications such as an email application and/or an instant messaging (IM) application.

In various embodiments, the augmentation recording module 102' of FIG. 7A is a logic module that may be designed to, among other things, record one or more first augmentations that were shown to a user through a first augmented view of a first actual scene, the one or more first augmentations having been shown for a segment of time. The user behavior ascertaining module 104' of FIG. 7A, on the other hand, is a logic module that may be configured to ascertain one or more user behaviors of the user following the showing of the one or more first augmentations that when ascertained as occurring infers user's interest in seeing the one or more first augmentations. In contrast, the augmentation presenting module 106' of FIG. 7A is a logic module that may be configured to present, prior to presenting in response to said ascertaining one or more second augmentations through a second augmented view of the first actual scene or of a second actual scene, one or more third augmentations that directs the user to execute one or more acts in order to view the one or more second augmentations, the one or more second augmentations having been based, at least in part, on the registered one or more first augmentations.

Turning now to FIG. 7B, which illustrates a block diagram of another AR device 70" that can implement the operations and processes to be described herein. As indicated earlier, the AR device 70" in FIG. 7B is merely the "soft" version of the AR device 70' of FIG. 7A because the various logic modules: the augmentation recording module 102", the user behavior ascertaining module 104", and the augmentation presenting module 106" that are implemented using software and one or more processors 116 (e.g., one or more microprocessors or controllers) executing the software (e.g., computer readable instructions 152) rather than being implemented using purely hardware (e.g., ASIC) as was the case in the AR device 70' of FIG. 7A. Thus, the augmentation recording module 102", the user behavior ascertaining module 104", and the augmentation presenting module 106" of FIG. 7B may be designed to execute the same functions as the augmentation recording module 102', the user behavior ascertaining module 104', and the augmentation presenting module 106' of FIG. 7A. The AR device 70", as illustrated in FIG. 7B, has other components (e.g., user interface 110, network interface 112, and so forth) that are the same or similar to the other components included in the AR device 70' of FIG. 7A. Note that in the embodiment of the augmented reality system illustrated in FIG. 7B, the various logic modules (e.g., the augmentation recording module 102", the user behavior ascertaining module 104", and the augmentation presenting module 106") may be implemented by the one or more processors 116 (or other types of circuitry such as field programmable gate arrays or FPGAs) executing one or more computer readable instructions 152 stored in memory 114.

In various embodiments, the memory 114 of the AR device 70' of FIG. 7A and the AR device 70" of FIG. 7B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Turning now to FIG. 8A illustrating a particular implementation of the augmentation recording module 102\*(e.g., the augmentation recording module 102' or augmentation recording module 102") of FIGS. 7A and 7B. As illustrated, the augmentation recording module 102\* may include one or more sub-logic modules in various alternative implementations. For example, in various embodiments, the augmentation recording module 102\* may include an augmentation aspect recording module 802 (which may further include a visual format recording module 804, a location recording module 806, and/or a content recording module 808), a non-augmentation aspect recording module 810 (which may further include a visual form recording module 812, a view location recording module 814, and/or an identity recording module 816), and/or a dynamic augmentation recording module 818 (which may further include a rotating augmentation recording module 820 that may further include a rotating message augmentation recording module 822). Specific details related to the augmentation recording module 102\* as well as the above-described sub-modules of the augmentation recording module 102\* will be provided below with respect to the operations and processes to be described herein.

FIG. 8B illustrates a particular implementation of the user behavior ascertaining module 104\*(e.g., the user behavior ascertaining module 104' or the user behavior ascertaining module 104") of FIG. 7A or 7B. As illustrated, the user behavior ascertaining module 104\* may include one or more sub-logic modules in various alternative embodiments. For example, in various embodiments, the user behavior ascertaining module 104\* may include a user movement ascertaining module 824 (which may further include a location relative user movement ascertaining module 826) and/or an ocular characteristic ascertaining module 828 (which may further include a dwell path ascertaining module 830, a focus point ascertaining module 832, and/or an actual scene ascertaining module 834). Specific details related to the user behavior ascertaining module 104\* as well as the above-described sub-modules of the user behavior ascertaining module 104\* will be provided below with respect to the operations and processes to be described herein.

FIG. 8C illustrates a particular implementation of the augmentation presenting module 106\*(e.g., the augmentation presenting module 106' or the augmentation presenting module 106") of FIG. 7A or 7B. As illustrated, the augmentation presenting module 106\* may include one or more sub-logic modules in various alternative embodiments. For example, in various embodiments, the augmentation presenting module 106\* may include a modified first augmentation presenting module 836 that may further include a first augmentation with modified visual format presenting module 837, a first augmentation with modified content presenting module 838, a selectively located modified first augmentation presenting module 843, a user behavior based modified first augmentation presenting module 839 (which may further include a movement based modified first augmentation presenting module 840 and/or an ocular characteristic based modified first augmentation presenting module 841) and/or a user directing augmentation presenting module 842.

FIG. 8D illustrates the various types of user interface devices that may be part of the user interface 110 of the AR device 70\* of FIG. 7A or 7B. In various embodiments, the user interface 110 may include one or more display monitors 852 (e.g., a touchscreen, a liquid crystal display (LCD), a see-through display, and/or other types of display monitors), one or more visual capturing devices 854 (e.g., one or more video or web cameras, digital cameras, and/or other types of cameras 870—see FIG. 8E), one or more audio speakers 856, one or more audio input devices 858 (e.g., one or more microphones)—see also audio sensors 872 of FIG. 8E, and/or one or more keyboard/keypads 860. Although not depicted, other types of user interfaces may be included with the user interface 110 in various alternative embodiments including, for example, a mouse or other types of user input/output devices.

FIG. 8E illustrates at least some of the various types of sensors 120 that may be included with the AR device 70\* (e.g. the AR device 70' of FIG. 7A or the AR device 70" of FIG. 7B). As illustrated, the one or more sensors 120 that may be included with the AR device 70\* may include one or more cameras 870 (note that the one or more cameras 870 may be the same as the one or more visual capturing devices 854 described above with respect to the user interface 110), one or more audio sensors 872 (see also audio input device[s] 858 described above), one or more location sensors 874 such as one or more global positioning systems (GPSs) 875, one or more orientation/movement sensors 876 (which may comprise one or more accelerometers 877, one or more gyroscopes 878, one or more inertia sensors 879, one or more pedometers 880), one or more user physiological sensors 882 (e.g., one or more blood pressure sensors 883, one or more pulse/heart rate sensors 884, one or more blood sugar sensors 885), and/or one or more external environmental sensors 886 (which may further include one or more atmospheric condition sensors 887 such as a thermometer or a barometer). Note that with respect to the one or more location sensors 874, the one or more orientation/movement sensors 876, and/or one or more user physiological sensors 882, these sensor devices may include other types of sensors not depicted in FIG. 8E. For example the one or more location sensors 874 in some alternative implementations may include a location sensor that employs triangulation techniques and signals from cellular towers to determine location while the one or more user physiological sensors 882 may include in some alternative embodiments one or more blood pressure sensors and/or other types of sensors.

Figure 9:
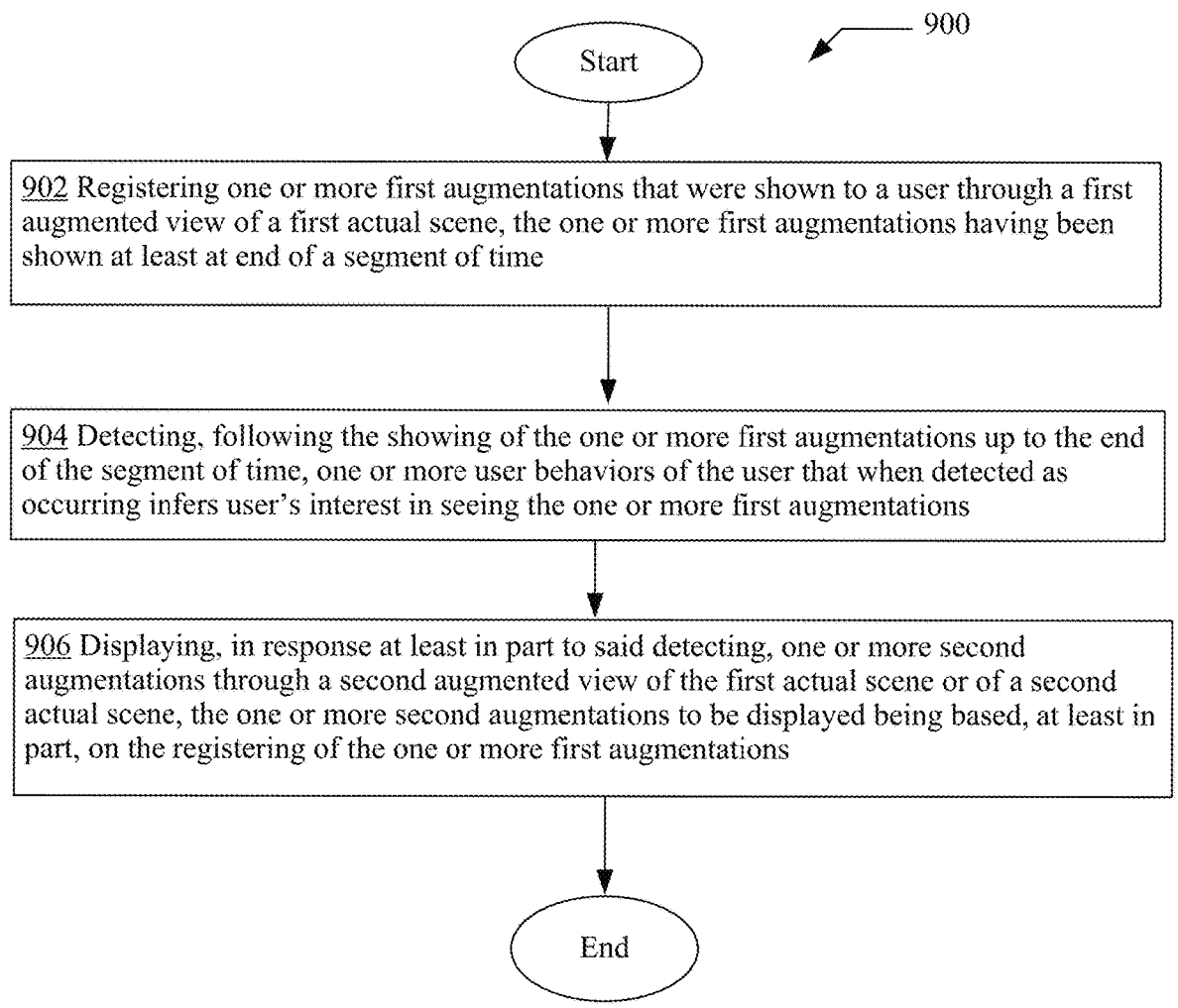
FIG. 9 is a high-level logic flowchart of a process, e.g., operational flow 900, according to some embodiments.

A more detailed discussion related to the AR device 70\* (e.g., the AR device 70' of FIG. 7A or the AR device 70" of FIG. 7B) discussed above will now be provided with respect to the processes and operations to be described herein. FIG. 9 illustrates an operational flow 900 representing example operations for, among other things restoring a modified or exact version of a previously displayed augmentation upon determining that a user's interest in seeing again the previously displayed augmentation. More particularly, presenting, in response to determining one or more behaviors of a user that when detected as occurring infer the user's interest in viewing one or more first augmentations that were previously presented and recorded, one or more second augmentations that are based, at least in part, on the recorded one or more first augmentations. In various implementations, these operations may be implemented by the AR device 70\* of FIG. 7A or 7B.

In FIG. 9 and in the following figures that include various examples of operational flows, discussions and explanations will be provided with respect to the AR device 70\* described above and as illustrated in FIGS. 7A, 7B, 8A, 8B, 8C, 8D, and 8E and/or with respect to other examples (e.g., as provided in FIGS. 1A, 1B, 2A, 2B, 3A, 3B, 4A, 4B, 5A, 5B, 5C, 5D, 5E, 5F, 5G, 5H, 5I, 5J, 5K, 5M, 5N, 5P, 5Q, 5R, 5S, 5T, 5U, 5V, 5W, 5X, 5Y, 5Z, 6A, 6B, 6C, 6D, and 6E) and contexts. However, it should be understood that the operational flows may be executed in a number of other environments and contexts, and/or in modified versions of FIGS. 1A, 1B, 2A, 2B, 3A, 3B, 4A, 4B, 5A, 5B, 5C, 5D, 5E, 5F, 5G, 5H, 5I, 5J, 5K, 5M, 5N, 5P, 5Q, 5R, 5S, 5T, 5U, 5V, 5W, 5X, 5Y, 5Z, 6A, 6B, 6C, 6D, 6E, 7A, 7B, 8A, 8B, 8C, 8D, and 8E. Also, although the various operational flows are presented in the sequence(s) illustrated, it should be understood that the various operations may be performed in other orders other than those which are illustrated, or may be performed concurrently.

Further, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 9 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

More particularly, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated FIG. 9 as well as the other operations to be described herein may be performed by at least one of a machine or an article of manufacture.

In any event, after a start operation, the operational flow 900 of FIG. 9 may move to an augmentation registering operation 902 for registering one or more first augmentations that were shown to a user through a first augmented view of a first actual scene, the one or more first augmentations having been shown at least at end of a segment of time. For instance, and as illustration, the augmentation recording module 102\* of the AR device 70\* of FIG. 7A or 7B (e.g., the augmentation recording module 102' of FIG. 7A or the augmentation recording module 102" of FIG. 7B) registering (e.g., recording or memorializing) one or more first augmentations (e.g., augmentation 51*b* of FIG. 5C) that were shown to a user 62 through a first augmented view (e.g., view 50*c* of FIG. 5C) of a first actual scene (e.g., view 50*a* of FIG. 5A), the one or more first augmentations (e.g., augmentation 50*b*) having been shown at least at the end of a segment of time (e.g., any length of time in which one or more augmentations, such as one or more dynamically changing augmentations, may be displayed). In various embodiments, the one or more first augmentations may be in the form of textual augmentations, animation augmentations, video motion augmentations, and/or other types of augmentations that may dynamically changes over time. For these implementations, the one or more first augmentations (e.g., augmentation 51b of FIG. 5C) to be shown only up to the end of the segment of time and being, at least temporary, no longer being displayed after the end of the segment of time.

Operational flow 900 may also include a user behavior detecting operation 904 for detecting, following the showing of the one or more first augmentations up to the end of the segment of time, one or more user behaviors of the user that when detected as occurring infers user's interest in seeing the one or more first augmentations. For instance, the user behavior ascertaining module 102*(e.g., the user behavior ascertaining module 102' of FIG. 7A or the user behavior ascertaining module 102" of FIG. 7B) of the AR device 70* of FIG. 7A or 7B detecting (e.g., ascertaining or determining), following the showing of the one or more first augmentations (e.g., augmentation 51b) up to the end of the segment of time, one or more user behaviors (e.g., eye movements, head movements, and/or overall body movements) of the user 62 that when detected as occurring infers user 62's interest in seeing the one or more first augmentations (e.g., augmentation 51b). Note that in various embodiments the segment of time that the one or more first augmentations are to be shown may essentially be any increment of time so long as at least one form of the one or more first augmentations is ceased from being shown at the end of the segment of time.

As further illustrated in FIG. 9, operational flow 900 may also include an augmentation displaying operation 906 for displaying, in response at least in part to said detecting, one or more second augmentations through a second augmented view of the first actual scene or of a second actual scene, the one or more second augmentations to be displayed being based, at least in part, on the registering of the one or more first augmentations. For instance, the augmentation presenting module 106*(e.g., the augmentation presenting module 106' of FIG. 7A or the user augmentation presenting module 106" of FIG. 7B) displaying (e.g., visually presenting via one or more displays 852), in response at least in part to said detecting of the one or more user behaviors, one or more second augmentations (e.g., augmentation 51b of FIG. 5E, which is the same as the "first" augmentation 51b of FIG. 5C) through a second augmented view (e.g., view 50c FIG. 5C or view 50e of FIG. 5E) of the first actual scene (e.g., view 50a of FIG. 5A if the user 62 returns to the same exact location where the user 2 last saw augmentation 51b) or of a second actual scene (e.g., the actual view that augmented view 50e of FIG. 5E is based on), the one or more second augmentations (e.g., the augmentation 51b of FIG. 5E or a modified version of augmentation 51b) to be displayed being based, at least in part, on the registered one or more first augmentations (e.g., the augmentation 51b of FIG. 5C). In some embodiments, the one or more second augmentations to be displayed may be exactly the same as the final form of the one or more first augmentations that was displayed at the end of the segment of time. While in other embodiments, the one or more second augmentations to be displayed may be modified version or versions of the final form of the one or more augmentations that was displayed at the end of the segment of time.

Figure 10A:
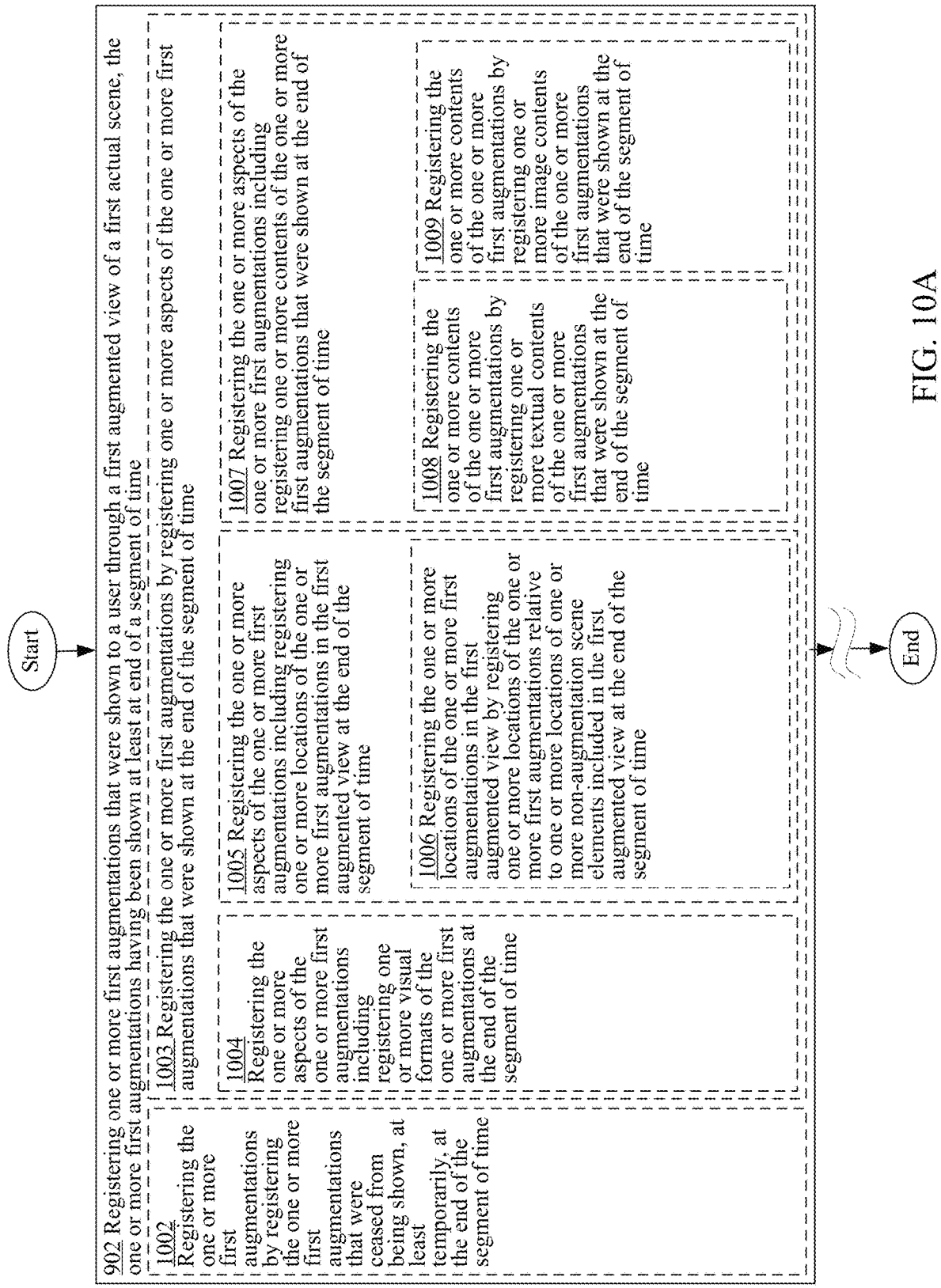
FIG. 10A is a high-level logic flowchart of a process depicting alternate implementations of the augmentation registering operation 902 of FIG. 9.

As will be described below, the augmentation registering operation 902, the user behavior detecting operation 904, and the augmentation displaying operation 906 may be executed in a variety of different ways in various alternative implementations. FIGS. 10A, 10B, 10C, 10D, and 10E, for example, illustrates at least some of the alternative ways that the augmentation registering operation 902 of FIG. 9 may be executed in various alternative implementations. In some cases, for example, the augmentation registering operation 902 may include an operation 1002 for registering the one or more first augmentations by registering one or more first augmentations that were ceased from being shown, at least temporarily, at the end of the segment of time as illustrated in FIG. 10A. For instance, the augmentation recording module 102* of the AR device 70*(e.g., the AR device 70' of FIG. 7A or the AR device 70" of FIG. 7B) registering the one or more first augmentations by registering one or more first augmentations (e.g., one or more dynamic visual augmentations that dynamically changes based on one or more factors such as time) that were ceased from being shown, at least temporarily, at the end of the segment of time. For example, in the example views illustrated in FIGS. 5C and 5D (which are exemplary sequential augmented and non-augmented views that may be provided by the AR device 70*), augmentation 51b shown in view 50c of FIG. 5C is no longer being shown in view 50d of FIG. 5D.

As further illustrated in FIG. 10A, in the same or alternative implementations, the augmentation registering operation 902 may additionally or alternatively include an operation 1003 for registering the one or more first augmentations by registering one or more aspects of the one or more first augmentations that were shown at the end of the segment of time. For instance, the augmentation recording module 102* including the augmentation aspect recording module 802 (see FIG. 8A) of the AR device 70* of FIG. 7A or 7B registering (e.g., recording or memorializing) the one or more first augmentations when the augmentation aspect recording module 802 registers (e.g., memorializes or records) one or more aspects (e.g., one or more visual formats) of the one or more first augmentations (e.g., augmentation 51b of FIG. 5C) that were shown at the end of the segment of time (e.g., were shown up to the end of the segment of time).

As further illustrated in FIG. 10A, operation 1003 may be implemented in a variety of different ways. For example, in some implementations, operation 1003 may actually involve an operation 1004 for registering the one or more aspects of the one or more first augmentations including registering one or more visual formats of the one or more first augmentations at the end of the segment of time. For instance, the augmentation aspect recording module 802 including the visual format recording module 804 (see FIG. 8A) of the AR device 70* of FIG. 7A or 7B registering the one or more aspects of the one or more first augmentations when the visual format recording module 804 registers (e.g., records) one or more visual formats (e.g. visual formats such as brightness, color, unique 2 or 3-dimensional features, textual formats, and so forth) of the one or more first augmentations (e.g., augmentation 51b of FIG. 5C) at the end of the segment of time.

In the same or alternative implementations, operation 1003 may additionally or alternatively include an operation 1005 for registering the one or more aspects of the one or more first augmentations including registering one or more locations of the one or more first augmentations in the first augmented view at the end of the segment of time. For instance, the augmentation aspect recording module 802 including the location recording module 806 (see FIG. 8A) of the AR device 70* of FIG. 7A or 7B registering the one or more aspects of the one or more first augmentations when the location recording module 806 registers one or more locations (e.g., location 504a of augmentation 51b of FIG. 5C) of the one or more first augmentations (e.g., augmentation 51*b* of FIG. 5C) in the first augmented view (e.g., view 50*c* of FIG. 5C) at the end of the segment of time.

In some cases, operation 1005 may additionally or alternatively include an operation for registering the one or more aspects of the presented augmented view including registering one or more non-augmentation scene elements that have been obfuscated in the augmented view by the one or more augmentations. For instance, the augmented aspect recording module 802 including an obfuscated non-augmentation scene element recording module of the AR device 70* of FIG. 7A or 7B registering the one or more aspects of the presented augmented view when the obfuscated non-augmentation scene element recording module registers one or more non-augmentation scene elements that have been obfuscated (e.g., hidden) in the augmented view by the one or more augmentations. Such an operation may be particularly beneficial when, for example, obfuscation of a non-augmentation scene element causes the user to react in a particular measurable way (e.g., eye movement or eye focus).

In some cases, operation 1005 may further involve or include an 1006 for registering the one or more locations of the one or more first augmentations in the first augmented view by registering one or more locations of the one or more first augmentations relative to one or more locations of one or more non-augmentation scene elements included in the first augmented view at the end of the segment of time. For instance, the location recording module 806 of the AR device 70* of FIG. 7A or 7B registering the one or more locations of the one or more first augmentations in the first augmented view by registering (e.g., recording or memorializing) one or more locations (location 504*a* of FIG. 5C) of the one or more first augmentations (e.g., augmentation 51*b* of FIG. 5C) relative to one or more locations of one or more non-augmentation scene elements (e.g., non-augmentation scene element 502*a* of FIG. 5C) included in the first augmented view 50*c* at the end of the segment of time. In various embodiments, the registering or recording of the one or more locations of the one or more first augmentations may be the one or more locations of the one or more first augmentations relative to the augmented view or relative to an actual view associated with the augmented view.

In the same or alternative implementations, operation 1003 may additionally or alternative include an operation 1007 for registering the one or more aspects of the one or more first augmentations including registering one or more contents of the one or more first augmentations that were shown at the end of the segment of time as further depicted in FIG. 10A. For instance, the augmentation aspect recording module 802 including the content recording module 808 (see FIG. 8A) of the AR device 70* of FIG. 7A or 7B registering the one or more aspects of the one or more first augmentations when the content recording module 808 registers (e.g., records or memorializes) one or more contents (e.g., textual content, video content, image content, and so forth) of the one or more first augmentations (e.g., augmentation 51*b* of FIG. 5C or augmentation 51*c* of FIG. 5H) that were shown at the end of the segment of time.

As further illustrated in FIG. 10A, in various implementations operation 1007 may further include or involve one or more additional operations including, for example, an operation 1008 for registering the one or more contents of the one or more first augmentations by registering one or more textual contents of the one or more first augmentations that were shown at the end of the segment of time. For instance, the content recording module 808 of the AR device 70* of FIG. 7A or 7B registering the one or more contents of the one or more first augmentations by registering one or more textual contents of the one or more first augmentations (e.g., augmentation 51*b* of FIG. 5C or augmentation 51*g* of FIG. 5R) that were shown at the end of the segment of time.

In the same or alternative implementations, operation 1007 may additionally or alternatively include an operation 1009 for registering the one or more contents of the one or more first augmentations by registering one or more image contents of the one or more first augmentations that were shown at the end of the segment of time. For instance, the content recording module 808 of the AR device 70* of FIG. 7A or 7B registering the one or more contents of the one or more first augmentations by registering one or more image contents of the one or more first augmentations (e.g., augmentation 51*b* of FIG. 5C) that were shown at the end of the segment of time.

Figure 10B:
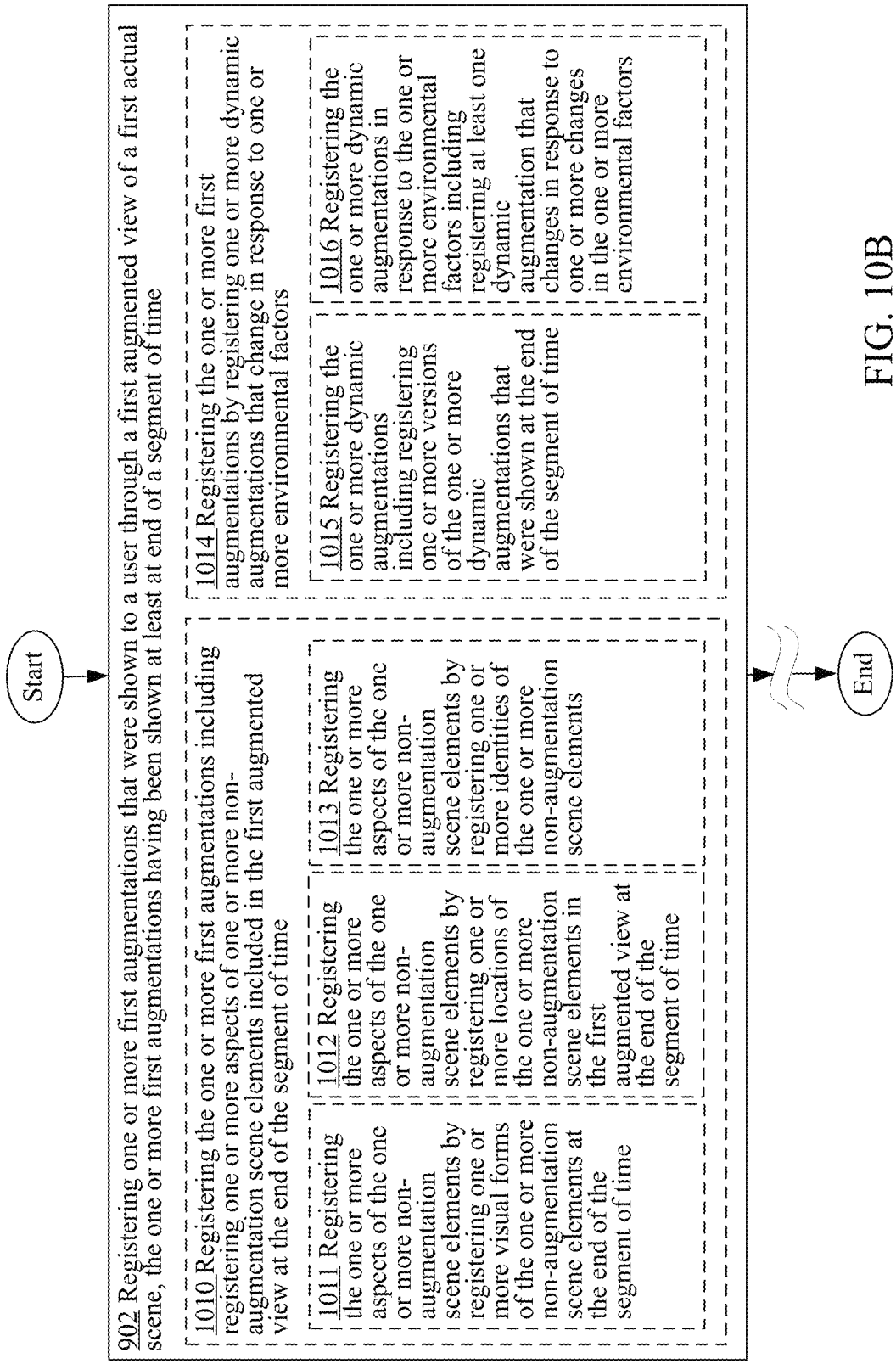
FIG. 10B is a high-level logic flowchart of a process depicting alternate implementations of the augmentation registering operation 902 of FIG. 9.

Referring now to FIG. 10B, in some cases, the augmentation registering operation 902 of FIG. 9 may actually involve an operation 1010 for registering the one or more first augmentations including registering one or more aspects of one or more non-augmentation scene elements included in the first augmented view at the end of the segment of time. For instance, the augmentation recording module 102* including the non-augmentation aspect recording module 810 (see FIG. 8A) of the AR device 70* of FIG. 7A or 7B registering (e.g., recording or memorializing) the one or more first augmentations including registering, by the non-augmentation aspect recording module 810, of one or more aspects of one or more non-augmentation scene elements (e.g., non-augmentation scene element 502*b* of FIGS. 5G and 5H) included in the first augmented view (e.g., view 50*h* of FIG. 5H) at the end of the segment of time.

As further illustrated in FIG. 10B, operation 1010 in some implementations may include one or more additional operations including, in some cases, an operation 1011 for registering the one or more aspects of the one or more non-augmentation scene elements by registering one or more visual forms of the one or more non-augmentation scene elements at the end of the segment of time. For instance, the non-augmentation aspect recording module 810 including the visual form recording module 812 (see FIG. 8A) of the AR device 70* of FIG. 7A or 7B registering the one or more aspects of the one or more non-augmentation scene elements when the visual form recording module 812 registers one or more visual forms (e.g., color, brightness, and so forth) of the one or more non-augmentation scene elements (e.g., non-augmentation scene element 502*c* of FIG. 5M) at the end of the segment of time.

In the same or alternative implementations, operation 1010 may additionally or alternatively include an operation 1012 for registering the one or more aspects of the one or more non-augmentation scene elements by registering one or more locations of the one or more non-augmentation scene elements in the first augmented view at the end of the segment of time. For instance, the non-augmentation aspect recording module 810 including the view location recording module 814 (see FIG. 8A) of the AR device 70* of FIG. 7A or 7B registering the one or more aspects of the one or more non-augmentation scene elements when the view location recording module 814 registers one or more locations of the one or more non-augmentation scene elements in the first augmented view (e.g., location of the non-augmentation scene element 502*b* relative to the location of, for example, non-augmentation scene element 502*c* in the augmented view 50*h* of FIG. 5H) at the end of the segment of time.

In the same or alternative implementations, operation 1010 may additionally or alternatively include an operation 1013 for registering the one or more aspects of the one or more non-augmentation scene elements by registering one or more identities of the one or more non-augmentation scene elements. For instance, the non-augmentation aspect recording module 810 including the identity recording module 816 (see FIG. 8A) of the AR device 70* of FIG. 7A or 7B registering the one or more aspects of the one or more non-augmentation scene elements when the identity recording module 816 registers one or more identities of the one or more non-augmentation scene elements (e.g., a particular automobile model or a particular manmade or natural landmark). In various implementations, the identities of the one or more non-augmentations scene elements may be used in order to obtain additional information (e.g., dimensions, location, and so forth) related to the one or more non-augmentations scene elements In some cases, the augmentation registering operation 902 of FIG. 9 may actually involve an operation 1014 for registering the one or more first augmentations by registering one or more dynamic augmentations that change in response to one or more environmental factors. For instance, the augmentation recording module 102* including the dynamic augmentation recording module 818 (see FIG. 8A) of the AR device 70* of FIG. 7A or 7B registering (e.g., recording or memorializing) the one or more first augmentations when the dynamic augmentation recording module 818 registers (e.g., records or memorializes) one or more dynamic augmentations (e.g., augmentation 51d of FIG. 5M) that changes in response to one or more environmental factors (e.g., atmospheric conditions).

In some cases, operation 1014 may include or involve an operation 1015 for registering the one or more dynamic augmentations including registering one or more versions of the one or more dynamic augmentations that were shown at the end of the segment of time. For instance, the dynamic augmentation recording module 818 of the AR device 70* of FIG. 7A or 7B registering the one or more dynamic augmentations including registering one or more versions of the one or more dynamic augmentations (e.g., augmentation 51b of FIG. 5C) that were shown at the end of the segment of time.

In the same or alternative implementations, operation 1014 may additionally or alternatively include an operation 1016 for registering the one or more dynamic augmentations in response to the one or more environmental factors including registering at least one dynamic augmentation that changes in response to one or more changes in the one or more environmental factors. For instance, the dynamic augmentation recording module 818 of the AR device 70* of FIG. 7A or 7B registering the one or more dynamic augmentations in response to the one or more environmental factors including registering at least one dynamic augmentation (e.g., augmentation 51d of FIG. 5M, which may change with changes in atmospheric conditions) that changes in response to one or more changes in the one or more environmental factors (e.g., weather conditions, user mental or physical conditions, user activity, location, and so forth).

Figure 10C:
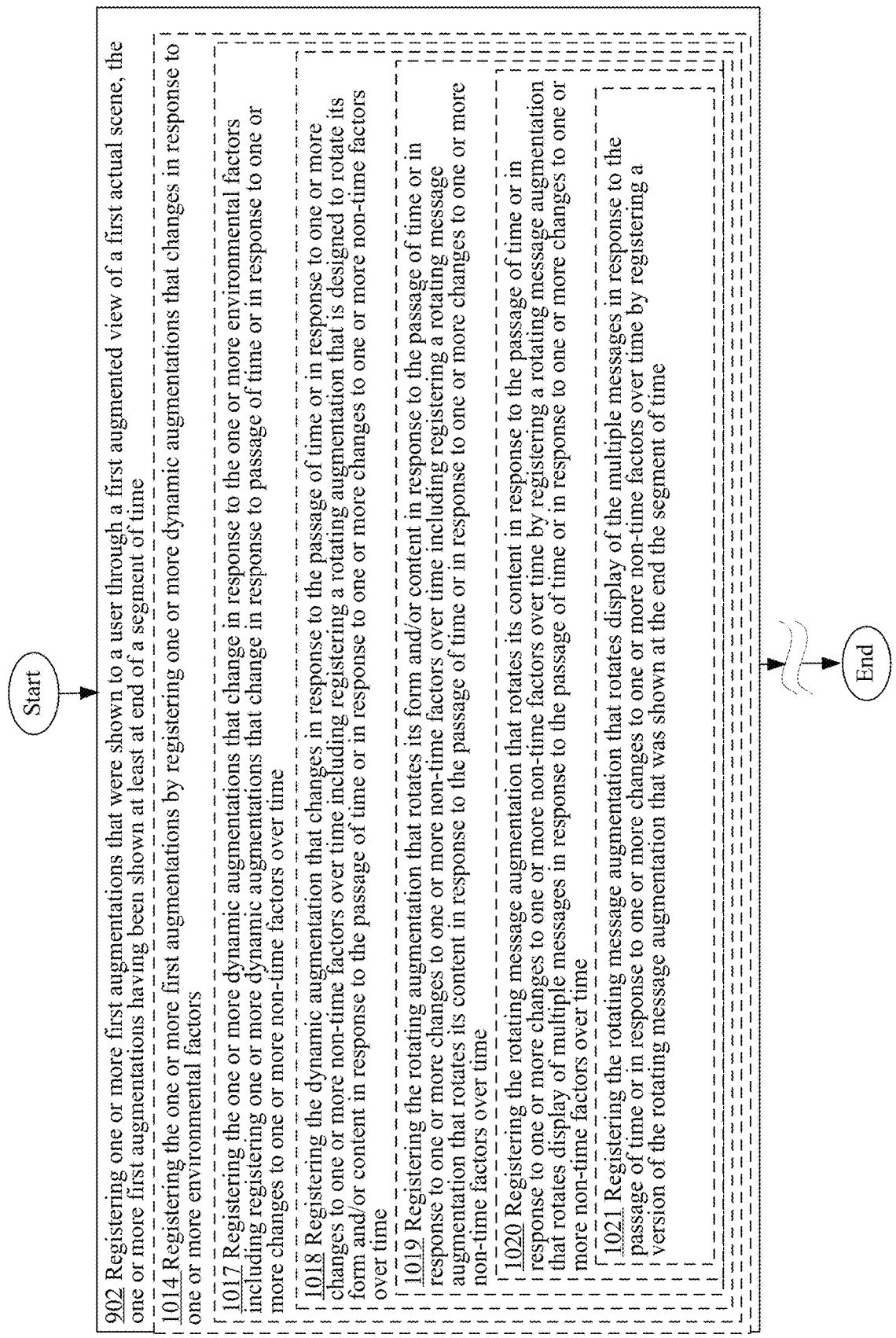
FIG. 10C is a high-level logic flowchart of a process depicting alternate implementations of the augmentation registering operation 902 of FIG. 9.

Turning now to FIG. 10C, in some cases, operation 1014 may actually involve an operation 1017 for registering the one or more dynamic augmentations that change in response to the one or more environmental factors including registering one or more dynamic augmentations that change in response to passage of time or in response to one or more changes to one or more non-time factors over time. For instance, the dynamic augmentation recording module 818 of the AR device 70* of FIG. 7A or 7B registering the one or more dynamic augmentations that changes in response to the one or more environmental factors including registering one or more dynamic augmentations (e.g., augmentations 51a and augmentation 51b of FIGS. 5B and 5C) that changes in response to passage of time or in response to one or more changes to one or more non-time factors (e.g., environmental factors) over passage of time. For example, augmentations 51a and 51b of FIGS. 5B and 5C are essentially the same dynamic augmentation but at different points in time reflecting the normal or natural changes to its content (e.g., sales information) over time. That is, augmentations 51a and 51b is an ad rotator augmentation that rotates or changes its sales information as time progresses.

As further illustrated in FIG. 10C, operation 1017 may include one or more additional operations including, for example, an operation 1018 for registering the dynamic augmentation that changes in response to the passage of time or in response to one or more changes to one or more non-time factors over time including registering a rotating augmentation that is designed to rotate its form and/or content in response to the passage of time or in response to one or more changes to one or more non-time factors over time. For instance, the dynamic augmentation recording module 818 including the rotating augmentation recording module 820 (see FIG. 8A) of the AR device 70* of FIG. 7A or 7B registering the dynamic augmentation that changes in response to the passage of time or in response to one or more changes to one or more non-time factors over time when the rotating augmentation recording module 820 registers a rotating augmentation (e.g., augmentations 51a and 51b of FIGS. 5B and 5C) that is designed to rotate its form and/or content in response to the passage of time or in response to one or more changes to one or more non-time factors over time.

In some cases, operation 1018 may, in turn, further include an operation 1019 for registering the rotating augmentation that rotates its form and/or content in response to the passage of time or in response to one or more changes to one or more non-time factors over time including registering a rotating message augmentation that rotates its content in response to the passage of time or in response to one or more changes to one or more non-time factors over time. For instance, the rotating augmentation recording module 820 including the rotating message augmentation recording module 822 (see FIG. 8A) of the AR device 70* of FIG. 7A or 7B registering the rotating augmentation that rotates its form and/or content in response to the passage of time or in response to one or more changes to one or more non-time factors over time when the rotating message augmentation recording module 822 registers a rotating message augmentation (e.g., a message rotator augmentation as illustrated in FIGS. 5B and 5C) that rotates its content in response to the passage of time or in response to one or more changes to one or more non-time factors over time. In some embodiments, the rotating message augmentation may be an augmentation that is an ad rotator for rotating advertisements.

As further illustrated in FIG. 10C, in some cases operation 1019 may, in turn, further include an operation 1020 for registering the rotating message augmentation that rotates its content in response to the passage of time or in response to one or more changes to one or more non-time factors over time by registering a rotating message augmentation that rotates display of multiple messages in response to the passage of time or in response to one or more changes to one or more non-time factors over time. For instance, the rotating message augmentation recording module 822 of the AR device 70* of FIG. 7A or 7B registering the rotating message augmentation that rotates its content in response to the passage of time or in response to one or more changes to one or more non-time factors over time by registering a rotating message augmentation (e.g., a rotating message board or billboard as illustrated in, for example, FIGS. 5B and 5C) that rotates display of multiple messages in response to the passage of time or in response to one or more changes to one or more non-time factors over time.

In some instances, operation 1020 may, in turn, further include operation 1021 for registering the rotating message augmentation that rotates display of the multiple messages in response to the passage of time or in response to one or more changes to one or more non-time factors over time by registering a version of the rotating message augmentation that was shown at the end the segment of time. For instance, the rotating message augmentation recording module 822 of the AR device 70* of FIG. 7A or 7B registering the rotating message augmentation that rotates display of the multiple messages in response to the passage of time or in response to one or more changes to one or more non-time factors over time by registering a version of the rotating message augmentation that was shown at the end the segment of time. For example, in the example illustrated in FIGS. 5B and 5C, recording or registering augmentation 51*b* of FIG. 5C, which is the last version of the message rotating augmentation (e.g., augmentation 51*a* and 51*b*) illustrated in FIGS. 5B and 5C.

Figure 10D:
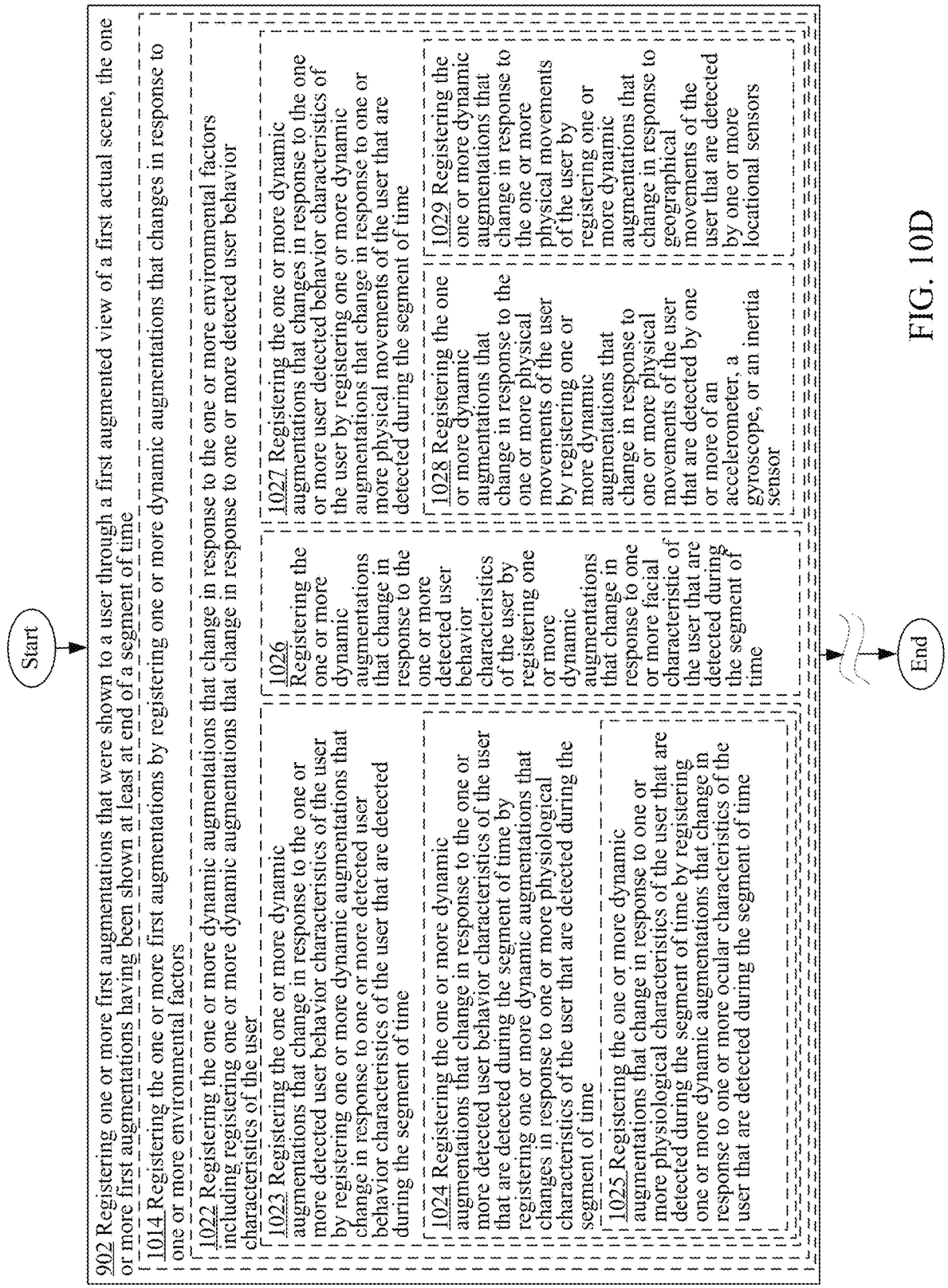
FIG. 10D is a high-level logic flowchart of a process depicting alternate implementations of the augmentation registering operation 902 of FIG. 9.

Referring now to FIG. 10D, in some cases, operation 1014 for registering the one or more first augmentations by registering one or more dynamic augmentations that change in response to one or more environmental factors may additionally or alternatively include an operation 1022 for registering the one or more dynamic augmentations that change in response to the one or more environmental factors including registering one or more dynamic augmentations that change in response to one or more detected user behavior characteristics of the user. For instance, the dynamic augmentation recording module 818 of the AR device 70* of FIG. 7A or 7B registering (e.g., recording or memorializing) the one or more dynamic augmentations that change in response to one or more environmental factors including registering (e.g., recording or memorializing) one or more dynamic augmentations that are designed to change in response to one or more detected user behavior characteristics (e.g. physiological characteristics or movement characteristics) of the user 62.

As further illustrated in FIG. 10D, operation 1022 may further include one or more additional operations in various implementations including in some cases an operation 1023 for registering the one or more dynamic augmentations that change in response to the one or more detected user behavior characteristics of the user by registering one or more dynamic augmentations that change in response to one or more detected user behavior characteristics of the user that are detected during the segment of time. For instance, the dynamic augmentation recording module 818 of the AR device 70* of FIG. 7A or 7B registering the one or more dynamic augmentations that change in response to the one or more detected user behavior characteristics of the user by registering one or more dynamic augmentations that are designed to change in response to one or more detected user behavior characteristics (e.g., user physiological characteristics and/or user movements) of the user 62 that are detected during the segment of time.

In some instances, operation 1023 may, in turn, further include or involve an operation 1024 for registering the one or more dynamic augmentations that change in response to the one or more detected user behavior characteristics of the user that are detected during the segment of time by registering one or more dynamic augmentations that change in response to one or more physiological characteristics of the user that are detected during the segment of time. For instance, the dynamic augmentation recording module 818 of the AR device 70* of FIG. 7A or 7B registering the one or more dynamic augmentations that change in response to the one or more detected user behavior characteristics of the user that are detected during the segment of time by registering one or more dynamic augmentations that are designed to change in response to one or more physiological characteristics (e.g., physiological characteristics such as ocular characteristics and/or heart rate that when detected may infer user mental or emotional state) of the user 62 that are detected during the segment of time.

In turn, operation 1024 may further include or involve, in some cases, an operation 1025 for registering the one or more dynamic augmentations that change in response to one or more physiological characteristics of the user that are detected during the segment of time by registering one or more dynamic augmentations that change in response to one or more ocular characteristics of the user that are detected during the segment of time. For instance, the dynamic augmentation recording module 818 of the AR device 70* of FIG. 7A or 7B registering the one or more dynamic augmentations that change in response to one or more physiological characteristics of the user that are detected during the segment of time by registering one or more dynamic augmentations that are designed change in response to one or more ocular characteristics (e.g., focus point and/or dwell time, dwell path, pupil characteristics, and so forth) of the user 62 that are detected during the segment of time.

In some cases operation 1022 for registering the one or more dynamic augmentations that change in response to the one or more environmental factors including registering one or more dynamic augmentations that change in response to one or more detected user behavior characteristics of the user may additionally or alternatively include or involve an operation 1026 for registering the one or more dynamic augmentations that change in response to the one or more detected user behavior characteristics of the user by registering one or more dynamic augmentations that change in response to one or more facial characteristic of the user that are detected during the segment of time. For instance, the dynamic augmentation recording module 818 of the AR device 70* of FIG. 7A or 7B registering the one or more dynamic augmentations that change in response to the one or more detected user behavior characteristics of the user by registering one or more dynamic augmentations that are designed to change in response to one or more facial characteristic (e.g., facial expressions) of the user 62 that are detected during the segment of time. Such dynamic augmentations may be available when the AR device 70* is in the form of, for example, a smartphone or a tablet computer that can capture a visual image of the face of the user 62.

In the same or alternative implementations, operation 1022 may additionally or alternative include an operation 1027 for registering the one or more dynamic augmentations that change in response to the one or more detected user behavior characteristics of the user by registering one or more dynamic augmentations that change in response to one or more physical movements of the user that are detected during the segment of time. For instance, the dynamic augmentation recording module 818 of the AR device 70* of FIG. 7A or 7B registering the one or more dynamic augmentations that change in response to the one or more detected user behavior characteristics of the user by registering one or more dynamic augmentations that are designed to change in response to one or more physical movements (e.g., movements of the user's arms and/or legs and/or relative geographical movements of the user including speed) of the user 62 that are detected during the segment of time. For example, FIGS. 5Q to 5U illustrate an example augmentations 51g, 51h, 51i, and 51k that may be displayed as a result of, for example, a determination that the user 62 is exercising or riding a bicycle based on the movements of the user 62.

In some implementations, operation 1127 may further include an operation 1028 for registering the one or more dynamic augmentations that change in response to the one or more physical movements of the user by registering one or more dynamic augmentations that change in response to one or more physical movements of the user that are detected by one or more of an accelerometer, a gyroscope, or an inertia sensor. For instance, the dynamic augmentation recording module 818 of the AR device 70* of FIG. 7A or 7B registering the one or more dynamic augmentations that changes in response to the one or more physical movements of the user by registering one or more dynamic augmentations that are designed to change in response to one or more physical movements (e.g., gestures, movements that indicate specific activities such as playing tennis) of the user 62 that are detected by one or more of an accelerometer, a gyroscope, or an inertia sensor.

In the same or alternative implementations, operation 1127 may additionally or alternatively involve an operation 1029 for registering the one or more dynamic augmentations that change in response to the one or more physical movements of the user by registering one or more dynamic augmentations that change in response to geographical movements of the user that are detected by one or more locational sensors. For instance, the dynamic augmentation recording module 818 of the AR device 70* of FIG. 7A or 7B registering the one or more dynamic augmentations that change in response to the one or more physical movements of the user by registering one or more dynamic augmentations that are designed to change in response to one or more geographical movements (e.g., locational, speed, acceleration, and/or directional data as provided by a GPS or other types of locational sensors such as those that employ cellular tower signals for determining geographical locations and/or movements) of the user 62 that are detected by one or more locational sensors (e.g., GPS 875 of FIG. 8E).

Figure 10E:
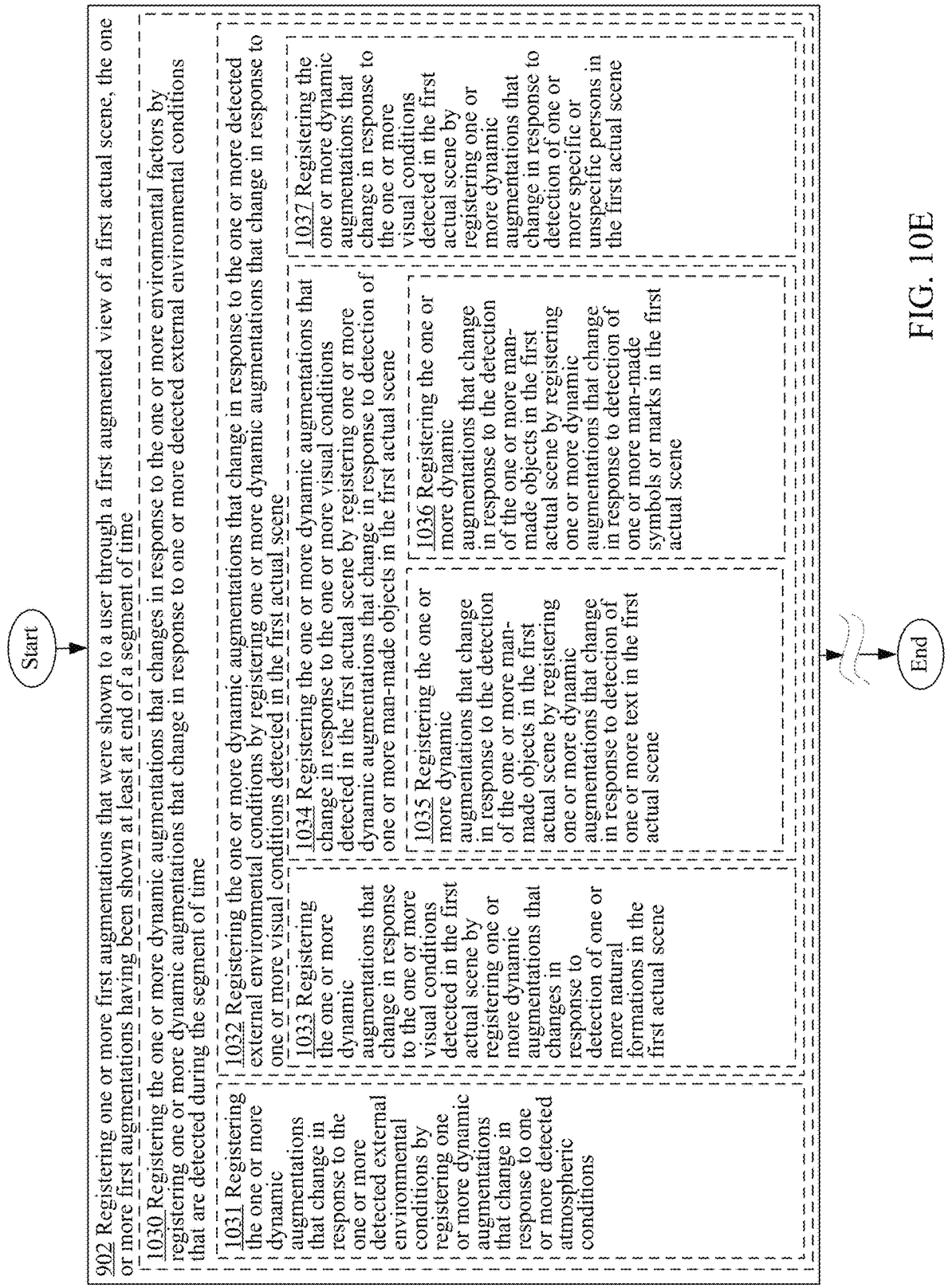
FIG. 10E is a high-level logic flowchart of a process depicting alternate implementations of the augmentation registering operation 902 of FIG. 9.

Referring now to FIG. 10E, in some implementations, the augmentation recording operation 902 of FIG. 9 may actually involve an operation 1030 for registering the one or more dynamic augmentations that change in response to the one or more environmental factors by registering one or more dynamic augmentations that change in response to one or more detected external environmental conditions that are detected during the segment of time. For instance, the dynamic augmentation recording module 818 of the AR device 70* of FIG. 7A or 7B registering (e.g., recording or memorializing) the one or more dynamic augmentations that changes in response to one or more environmental factors by registering (e.g., recording or registering) one or more dynamic augmentations (e.g., augmentation 51d of FIG. 5M) that are designed to change in response to one or more detected external environmental conditions (e.g., weather, presence or absence of one or more identifiable or unidentifiable persons, and so forth) that are detected during the segment of time.

As further illustrated in FIG. 10E, operation 1030 may further include or involve one or more additional operations in various alternative implementations, For example, in some implementations, operation 1030 may further include an operation 1031 for registering the one or more dynamic augmentations that change in response to the one or more detected external environmental conditions by registering one or more dynamic augmentations that change in response to one or more detected atmospheric conditions. For instance, the dynamic augmentation recording module 818 of the AR device 70* of FIG. 7A or 7B registering the one or more dynamic augmentations that change in response to the one or more detected external environmental conditions by registering one or more dynamic augmentations that are designed to change in response to one or more detected atmospheric conditions (e.g., precipitation, humidity, temperature, and so forth). In some embodiments, one or more dynamic augmentations may include one or more persistent dynamic graphical augmentations (e.g., a persistent augmentation that will show the mercury level of a thermometer moving up and down in accordance with actual sensor provided ambient temperature readings) that content-wise at least dynamically change in response to sensor provided data.

In some cases, operation 1130 may additionally or alternatively include an operation 1032 for registering the one or more dynamic augmentations that change in response to the one or more detected external environmental conditions by registering one or more dynamic augmentations that change in response to one or more visual conditions detected in the first actual scene. For instance, the dynamic augmentation recording module 818 of the AR device 70* of FIG. 7A or 7B registering the one or more dynamic augmentations that change in response to one or more detected external environmental conditions by registering (e.g., recording or memorializing) one or more dynamic augmentations (e.g., augmentation 51c of FIG. 5H) that are designed to change in response to one or more visual conditions (e.g., detection of one or more visual cues such as a sign and/or identifiable objects) detected in the first actual scene (e.g., the sign in view 50h of FIG. 5H). Note that although augmentation 51c of FIG. 5H is not shown as being dynamically changing in the examples illustrated in FIGS. 5H and 5J, in alternative implementations, augmentation 51c may dynamically change by showing images of different meals based on detecting corresponding textual signs (e.g., textual signs that indicate the name of the corresponding meals) that may be posted throughout the interior of the restaurant.

As further illustrated in FIG. 10E, in various implementations operation 1032 may actually involve or include one or more additional operations including in some cases an operation 1033 for registering the one or more dynamic augmentations that change in response to the one or more visual conditions detected in the first actual scene by registering one or more dynamic augmentations that change in response to detection of one or more natural formations in the first actual scene. For instance, the dynamic augmentation recording module 818 of the AR device 70* of FIG. 7A or 7B registering the one or more dynamic augmentations that change in response to the one or more visual conditions detected in the first actual scene by registering one or more dynamic augmentations that are designed to change in response to detection of one or more natural formations (e.g., oceans, lakes, mountains, trees, and so forth) in the first actual scene.

In the same or alternative implementations, operation 1032 may include or involve an operation 1034 for registering the one or more dynamic augmentations that change in response to the one or more visual conditions detected in the first actual scene by registering one or more dynamic augmentations that change in response to detection of one or more man-made objects in the first actual scene. For instance, the dynamic augmentation recording module 818 of the AR device 70\* of FIG. 7A or 7B registering the one or more dynamic augmentations that change in response to the one or more visual conditions detected in the first actual scene by registering one or more dynamic augmentations (e.g., a message rotator augmentation that provides information related to automobiles that are visually detected) that are designed to change in response to detection of one or more man-made objects (e.g., automobiles, buildings, signs, and so forth) in the first actual scene.

In some implementations, operation 1134 may further include or involve an operation 1035 for registering the one or more dynamic augmentations that change in response to the detection of the one or more man-made objects in the first actual scene by registering one or more dynamic augmentations that change in response to detection of one or more text in the first actual scene. For instance, the dynamic augmentation recording module 818 of the AR device 70\* of FIG. 7A or 7B registering the one or more dynamic augmentations that change in response to the detection of the one or more man-made objects in the first actual scene by registering one or more dynamic augmentations that are designed to change in response to detection of one or more text (e.g., a sign that contains text) in the first actual scene. For example, the text included in the non-augmentation scene element 502*a* of FIGS. 5A, 5B, and 5C may prompt the display of a dynamic augmentation (e.g., augmentation 51*a*) that provides a series of information related to on-sale items.

In the same or alternative implementations, operation 1134 may include an operation 1036 for registering the one or more dynamic augmentations that change in response to the detection of the one or more man-made objects in the first actual scene by registering one or more dynamic augmentations that change in response to detection of one or more man-made symbols or marks in the first actual scene. For instance, the dynamic augmentation recording module 818 of the AR device 70\* of FIG. 7A or 7B registering the one or more dynamic augmentations that change in response to the detection of the one or more man-made objects in the first actual scene by registering one or more dynamic augmentations (e.g., visual images of meals served at a restaurant) that are designed to change in response to detection of one or more man-made symbols or marks (e.g., signs) in the first actual scene (e.g., scene of an interior or exterior of the restaurant). For example, in the example illustrated in FIG. 5H the augmentation 51*c* showing images of different meals served by the restaurant being based on the signs posted inside the restaurant.

In some implementations, operation 1132 for registering the one or more dynamic augmentations that change in response to the one or more detected external environmental conditions by registering one or more dynamic augmentations that change in response to one or more visual conditions detected in the first actual scene may actually include or involve an operation 1037 for registering the one or more dynamic augmentations that change in response to the one or more visual conditions detected in the first actual scene by registering one or more dynamic augmentations that change in response to detection of one or more specific or unspecific persons in the first actual scene. For instance, the dynamic augmentation recording module 818 of the AR device 70\* of FIG. 7A or 7B registering the one or more dynamic augmentations that change in response to the one or more visual conditions detected in the first actual scene by registering one or more dynamic augmentations that are designed to change in response to detection of one or more specific or unspecific persons in the first actual scene. For example, a dynamic augmentation that provides specific information related to a specific football player based on visual detection of the specific football player (e.g., detection of the player's football jersey).

Figure 11A:
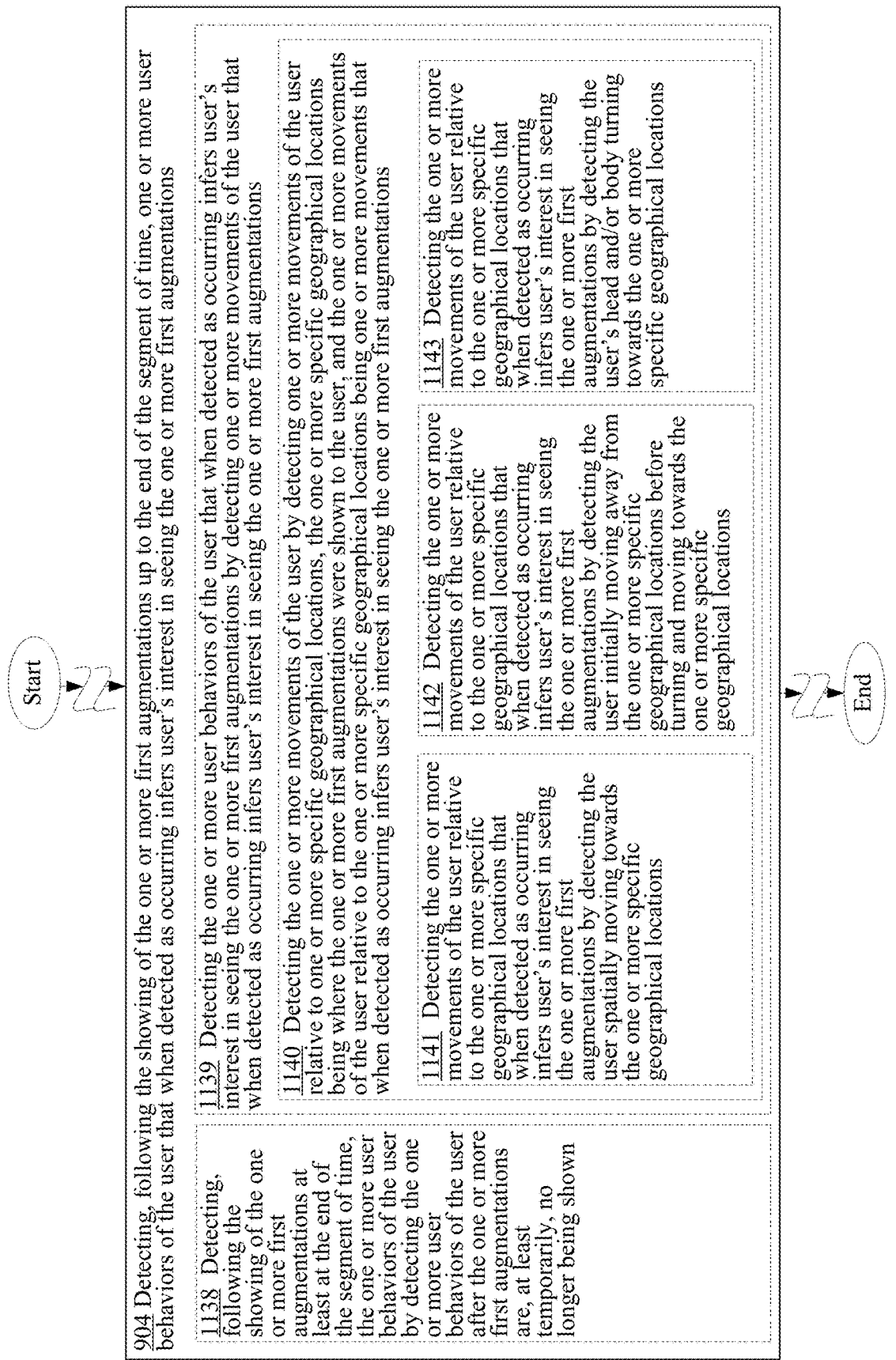
FIG. 11A is a high-level logic flowchart of a process depicting alternate implementations of the user behavior detecting operation 904 of FIG. 9.
Figure 11B:
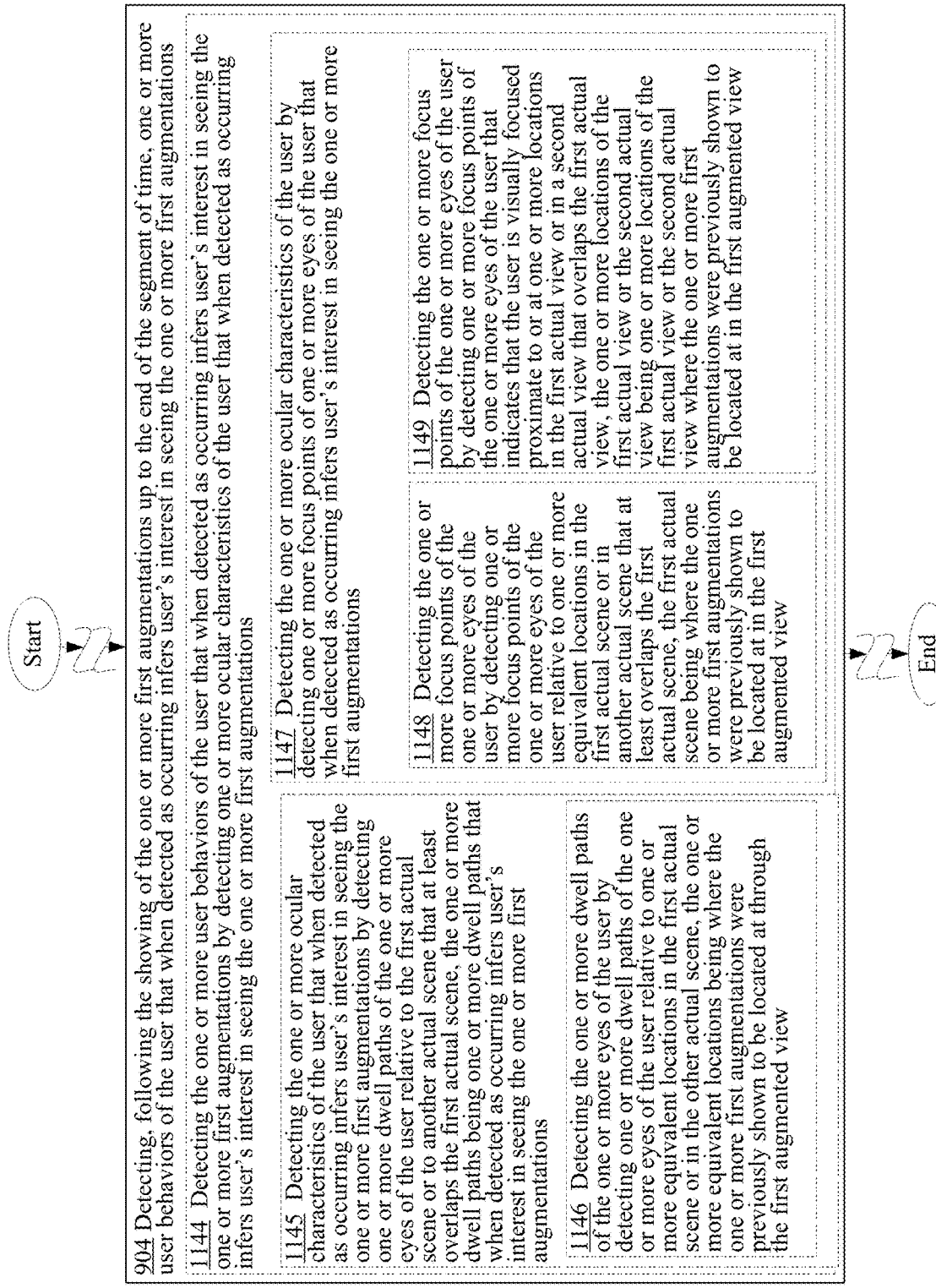
FIG. 11B is a high-level logic flowchart of a process depicting alternate implementations of the user behavior detecting operation 904 of FIG. 9.
Figure 11C:
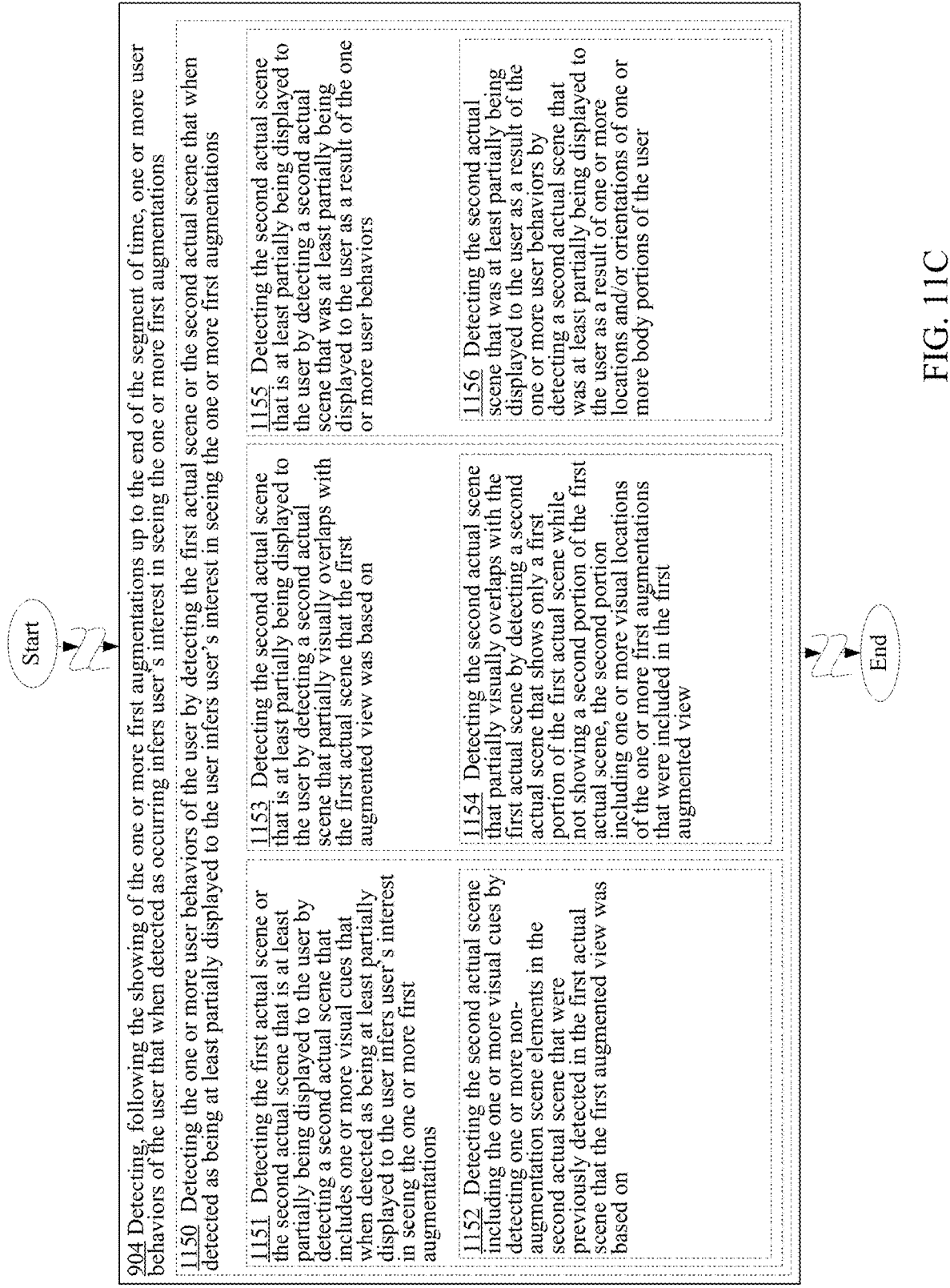
FIG. 11C is a high-level logic flowchart of a process depicting alternate implementations of the user behavior detecting operation 904 of FIG. 9.

Referring back to the user behavior detecting operation 904 of FIG. 9, the user behavior detecting operation 904 similar to the augmentation registering operation 902 of FIG. 9 may be executed in a number of different ways in various alternative embodiments as illustrated in FIGS. 11A, 11B, and 11C. In some implementations, for example, the user behavior detecting operation 904 may include an operation 1138 for detecting, following the showing of the one or more first augmentations up to the end of the segment of time, the one or more user behaviors of the user by detecting the one or more user behaviors of the user after the one or more first augmentations are, at least temporarily, no longer being shown. For instance, the user behavior ascertaining module 102\*of the AR device 70\* of FIG. 7A or 7B detecting (e.g., ascertaining or determining), following the showing of the one or more first augmentations up to the end of the segment of time, the one or more user behaviors of the user by detecting the one or more user behaviors of the user 62 after the one or more first augmentations are, at least temporarily, no longer being shown. For example, in the examples illustrated in FIGS. 5B, 5C, and 5D, the augmentations 51*b* (as well as augmentation 51*a* of FIG. 5B) being no longer shown at the end of time segment as the user 62 visually scans the scenery surrounding the user 62 such as depicted, for example, in FIG. 5D.

In the same or alternative implementations, the user behavior detecting operation 904 may additionally or alternatively include an operation 1139 for detecting the one or more user behaviors of the user that when detected as occurring infers user's interest in seeing the one or more first augmentations by detecting one or more movements of the user that when detected as occurring infers user's interest in seeing the one or more first augmentations. For instance, the user behavior ascertaining module 102\* including the user movement ascertaining module 824 (see FIG. 8B) of the AR device 70\* of FIG. 7A or 7B detecting the one or more user behaviors of the user that when detected as occurring infers user's interest in seeing the one or more first augmentations when the user movement ascertaining module 824 detects (e.g., ascertains or determines) one or more movements (e.g., ocular movements) of the user 62 that when detected as occurring infers user's interest in seeing the one or more first augmentations (e.g., augmentation 51*b* of FIG. 5C). For example, detecting the user 62 visually scanning the surrounding scenery and towards where the user 62 last saw the one or more first augmentations such as illustrated in, for example, FIG. 6C or detecting that the user 62 moving back towards where the user 62 last saw the one or more first augmentations such as illustrated in, for example, in FIG. 6A

As further illustrated in FIG. 11A, in various implementations operation 1139 may actually include or involve an operation 1140 for detecting the one or more movements of the user by detecting one or more movements of the user relative to one or more specific geographical locations, the one or more specific geographical locations being where the one or more first augmentations were shown to the user, and the one or more movements of the user relative to the one or more specific geographical locations being one or more movements that when detected as occurring infers user's interest in seeing the one or more first augmentations. For instance, the user movement ascertaining module 824 including the location relative user movement ascertaining module 826 (see FIG. 8B) of the AR device 70\* of FIG. 7A or 7B detecting the one or more movements of the user 62 when the location relative user movement ascertaining module 826 detects one or more movements of the user 62 (e.g., movements of the user 62 such as illustrated in, for example, in FIG. 6A) relative to one or more specific geographical locations (e.g., augmentation location 614 of FIG. 6A), the one or more specific geographical locations (e.g., augmentation location 614) being where the one or more augmentations (e.g., augmentation 51*m* of FIG. 5V) were shown to be located at to the user 62, and the one or more movements of the user 62 relative to the one or more specific geographical locations (e.g., augmentation location 614) being one or more movements (see, for example, FIG. 6A in which a user 62 is shown moving away from augmentation location 614 before turning around and returning to look at the same augmentation location 614) that when detected as occurring infers user's interest in seeing the one or more first augmentations (e.g., augmentation 602).

In some cases, operation 1140 may further include or involve an operation 1141 for detecting the one or more movements of the user relative to the one or more specific geographical locations that when detected as occurring infers user's interest in seeing the one or more first augmentations by detecting the user spatially moving towards the one or more specific geographical locations. For instance, the location relative user movement ascertaining module 826 of the AR device 70\* of FIG. 7A or 7B detecting the one or more movements of the user 62 relative to the one or more specific geographical locations that when detected as occurring infers user's interest in seeing the one or more first augmentations by detecting the user 62 spatially moving towards the one or more specific geographical locations (e.g., augmentation location 614 of FIG. 6A) such as illustrated in, for example, FIG. 6A.

In the same or alternative implementations, operation 1240 may additionally or alternatively include an operation 1142 for detecting the one or more movements of the user relative to the one or more specific geographical locations that when detected as occurring infers user's interest in seeing the one or more first augmentations by detecting the user initially moving away from the one or more specific geographical locations before turning and moving towards the one or more specific geographical locations. For instance, the location relative user movement ascertaining module 826 of the AR device 70\* of FIG. 7A or 7B detecting the one or more movements of the user 62 relative to the one or more specific geographical locations that when detected as occurring infers user's interest in seeing the one or more first augmentations by detecting the user 62 initially moving away from the one or more specific geographical locations (e.g., the augmentation location 614 of FIG. 6A) such as illustrated in, for example, FIG. 6A before turning and moving towards the one or more specific geographical locations (e.g., the augmentation location 614 of FIG. 6A).

In the same or alternative implementations, operation 1240 may additionally or alternatively include an operation 1143 for detecting the one or more movements of the user relative to the one or more specific geographical locations that when detected as occurring infers user's interest in seeing the one or more first augmentations by detecting the user's head and/or body turning towards the one or more specific geographical locations. For instance, the location relative user movement ascertaining module 826 of the AR device 70\* of FIG. 7A or 7B detecting the one or more movements of the user 62 relative to the one or more specific geographical locations (e.g., augmentation location 614 of FIG. 6A) that when detected as occurring infers user's interest in seeing the one or more first augmentations by detecting the user's head and/or body turning towards the one or more specific geographical locations (e.g., augmentation location 614). For example, FIG. 6A depicts the user 62 turning his head towards where the user 62 last saw the augmentation 602. Note also that alternatively, the user 62 could have turned his head around to look in the direction where he last saw the one or more first augmentations when the user 62 first decided to turn around to seek out the one or more first augmentations.

Referring now to FIG. 11B, in some cases, the user behavior detecting operation 904 of FIG. 9 may actually include or involve an operation 1144 for detecting the one or more user behaviors of the user that when detected as occurring infers user's interest in seeing the one or more first augmentations by detecting one or more ocular characteristics of the user that when detected as occurring infers user's interest in seeing the one or more first augmentations. For instance, the user behavior ascertaining module 102\*including the ocular characteristic ascertaining module 828 (see FIG. 8B) of the AR device 70\* of FIG. 7A or 7B detecting the one or more user behaviors of the user 62 that when detected as occurring infers user's interest in seeing the one or more first augmentations when the ocular characteristic ascertaining module 828 detects (e.g., ascertains or determines) one or more ocular characteristics (e.g., eye focus and/or eye movements that at least infers that the user 62 is visually scanning or searching the scenery for the one or more first augmentations) of the user 62 that when detected as occurring infers user's interest in seeing the one or more first augmentations such as illustrated in, for example, FIG. 6B or 6C.

As further illustrated in FIG. 11B, operation 1144 may include or involve one or more additional operations in various alternative implementations. For example, in some implementations, operation 1144 may include or involve an operation 1145 for detecting the one or more ocular characteristics of the user that when detected as occurring infers user's interest in seeing the one or more first augmentations by detecting one or more dwell paths of one or more eyes of the user relative to the first actual scene or to another actual scene that at least overlaps the first actual scene, the one or more dwell paths being one or more dwell paths that when detected as occurring infers user's interest in seeing the one or more first augmentations. For instance, the ocular characteristic ascertaining module 828 including the dwell path ascertaining module 830 (see FIG. 8B) of the AR device 70\* of FIG. 7A or 7B detecting the one or more ocular characteristics of the user 62 that when detected as occurring infers user's interest in seeing the one or more first augmentations when the dwell path ascertaining module 830 detects one or more dwell paths (e.g., scanning path 616 of FIG. 6C) of one or more eyes 610 of the user 62 relative to the first actual scene or to another actual scene that at least overlaps the first actual scene, the one or more dwell paths being one or more dwell paths that when detected as occurring infers user's interest in seeing the one or more first augmentations such as illustrated, for example, in FIG. 6C.

In some cases, operation 1145 may, in turn, include an operation 1146 for detecting the one or more dwell paths of the one or more eyes of the user by detecting one or more dwell paths of the one or more eyes of the user relative to one or more equivalent locations in the first actual scene or in the other actual scene, the one or more equivalent locations being where the one or more first augmentations were previously shown to be located at through the first augmented view. For instance, the dwell path ascertaining module 830 of the AR device 70*  of FIG. 7A or 7B detecting the one or more dwell paths of the one or more eyes 610 of the user 62 (see FIG. 6C) by detecting (e.g., ascertaining or sensing) one or more dwell paths (e.g., scanning path 616 of FIG. 6C) of the one or more eyes 610 of the user 62 relative to one or more equivalent locations (e.g., augmentation location 614 of FIG. 6D) in the first actual scene (e.g., first actual scene 63*a* of FIG. 6D) or in the other actual scene (e.g., second actual scene 63*b* of FIG. 6D, which may overlap the first actual scene 63*a*), the one or more equivalent locations being where the one or more first augmentations were previously shown to be located at through the first augmented view (e.g., an augmented view of the first actual scene 63*a* of FIG. 6D that shows an augmentation placed at augmentation location 620).

In some cases, operation 1144 may actually involve or include an operation 1147 for detecting the one or more ocular characteristics of the user by detecting one or more focus points of one or more eyes of the user that when detected as occurring infers user's interest in seeing the one or more first augmentations. For instance, the ocular characteristic ascertaining module 828 including the focus point ascertaining module 832 (see FIG. 8B) of the AR device 70*  of FIG. 7A or 7B detecting the one or more ocular characteristics of the user when the focus point ascertaining module 832 detects one or more focus points of one or more eyes 610 of the user 62 (such as illustrated, for example, in FIG. 6B) that when detected as occurring infers user's interest in seeing the one or more first augmentations.

In some cases, operation 1247 may further involve or include one or more additional operations including in some cases an operation 1148 for detecting the one or more focus points of the one or more eyes of the user by detecting one or more focus points of the one or more eyes of the user relative to one or more equivalent locations in the first actual scene or in another actual scene that at least overlaps the first actual scene, the first actual scene being where the one or more first augmentations were previously shown to be located at in the first augmented view. For instance, the focus point ascertaining module 832 of the AR device 70*  of FIG. 7A or 7B detecting the one or more focus points of the one or more eyes 610 of the user 62 by detecting one or more focus points (e.g., focus point 612 of FIG. 6B) of the one or more eyes 610 of the user 62 relative to one or more equivalent locations (e.g., augmentation location 614 in FIG. 6D) in the first actual scene (e.g., first actual scene 63*a* of FIG. 6D) or in another actual scene (e.g., second actual scene 63*b* of FIG. 6D) that at least overlaps the first actual scene (e.g., first actual scene 63*a*), the first actual scene (e.g., first actual scene 63*a*) being where the one or more first augmentations were previously shown to be located at in the first augmented view (e.g., the augmented view, no of the first actual scene 63*a*).

In the same or alternative implementations, operation 1247 may additionally or alternatively include an operation 1149 for detecting the one or more focus points of the one or more eyes of the user by detecting one or more focus points of the one or more eyes of the user that indicates that the user is visually focused proximate to or at one or more locations in the first actual view or in a second actual view that overlaps the first actual view, the one or more locations of the first actual view or the second actual view being one or more locations of the first actual view or the second actual view where the one or more first augmentations were previously shown to be located at in the first augmented view. For instance, the focus point ascertaining module 832 of the AR device 70*  of FIG. 7A or 7B detecting the one or more focus points of the one or more eyes 610 of the user 62 by detecting one or more focus points (e.g., focus point 612 of FIG. 6B) of the one or more eyes 610 of the user 62 that indicates that the user 62 is visually focused proximate to or at one or more locations (e.g., augmentation location 614 of FIG. 6D) in the first actual view (e.g., first actual scene 63*a* of FIG. 6D) or in a second actual view (e.g., second actual scene 63*b* of FIG. 6D) that overlaps the first actual view (e.g., first actual scene 63*a*), the one or more locations (e.g., augmentation location 614 of FIG. 6D) of the first actual view or the second actual view being one or more locations (e.g., augmentation location 614) of the first actual view (e.g., first actual scene 63*a*) or the second actual view (e.g., second actual scene 63*b*) where the one or more first augmentations were previously shown to be located at through the first augmented view.

Referring now to FIG. 12C, in various implementations, the user behavior detecting operation 904 of FIG. 9 may additionally or alternatively include or involve an operation 1150 for detecting the one or more user behaviors of the user by detecting the first actual scene or the second actual scene that when detected as being at least partially displayed to the user infers user's interest in seeing the one or more first augmentations. For instance, the user behavior ascertaining module 102*  including the actual scene ascertaining module 834 (see FIG. 8B) of the AR device 70*  of FIG. 7A or 7B detecting the one or more user behaviors of the user 62 when the actual scene ascertaining module 834 detects (e.g., ascertains or determines) the first actual scene 63*a* or the second actual scene 63*b* that when detected as being at least partially displayed (note that an actual scene may only be partially displayed if displayed through an augmented view) to the user 62 infers user's interest in seeing the one or more first augmentations (e.g., augmentation 51*m* of FIG. 5V). That is, a user's desire to see the one or more first augmentations (e.g., augmentation 51*m* of FIG. 5V) may, in some implementations, be inferred based purely on the actual scenes captured by the AR device 70*(e.g., if the AR device 70*  detects that the user is moving towards or back to the location where the user 62 last saw, for example, augmentation 51*m*). Note that with respect to the phrase "the first actual scene 63*a* or the second actual scene 63*b*" recited above, if a user 62 is interested in seeing again the one or more first augmentations than the user 62 may return to the same exact location where the user 62 last saw the one or more first augmentations and look at the same exact direction or scenery (e.g., first actual scene 63*a*) where the user 62 last saw the one or more first augmentations or the user 62 may try looking for the one or more first augmentations from a different location and look for the one or more first augmentations in another scene (e.g., second actual scene 63*b*). Note further that for ease of illustration and explanation, the following descriptions of operations 1150 to 1156 illustrated in FIG. 11C will be described with respect to FIGS. 5V, 6A, 6B, 6C, 6D, and 6E.

As further illustrated in FIG. 11C, operation 1150 may, in turn, include or involve one or more additional operations including, in some cases, an operation 1151 for detecting the first actual scene or the second actual scene that is at least partially being displayed to the user by detecting a second actual scene that includes one or more visual cues that when detected as being at least partially displayed to the user infers user's interest in seeing the one or more first augmentations. For instance, the actual scene ascertaining module 834 of the AR device 70* of FIG. 7A or 7B detecting the first actual scene 63a or the second actual scene 63b that is at least partially being displayed to the user 62 by detecting a second actual scene (e.g., 63b) that includes one or more visual cues (e.g., non-augmentation scene elements 622a, 622b, 622c, and/or 622d of FIG. 6D) that when detected as being at least partially displayed to the user 62 infers user's interest in seeing the one or more first augmentations. That is, the detection of such visual cues may infer that the user 62 has returned to the same location where the user 62 last saw the one or more first augmentations (e.g., augmentation 51m) and/or is looking at the same or proximate location of locations (e.g., augmentation location 614) where the user 62 last saw the one or more first augmentations (e.g., augmentation 51m of FIG. 5V).

In some implementations, operation 1151 may further include an operation 1152 for detecting the second actual scene including the one or more visual cues by detecting one or more non-augmentation scene elements in the second actual scene that were previously detected in the first actual scene that the first augmented view was based on. For instance, the actual scene ascertaining module 834 of the AR device 70* of FIG. 7A or 7B detecting the second actual scene including the one or more visual cues by detecting one or more non-augmentation scene elements (e.g., non-augmentation scene elements 622a, 622b, 622c, and/or 622d of FIG. 6D) in the second actual scene 63b (see FIG. 6D) that were previously detected in (or previously registered from) the first actual scene 63a that the first augmented view (e.g., view 50v of FIG. 5V) was based on.

In some cases, operation 1150 may additionally or alternatively include an operation 1153 for detecting the second actual scene that is at least partially being displayed to the user by detecting a second actual scene that partially visually overlaps with the first actual scene that the first augmented view was based on. For instance, the actual scene ascertaining module 834 of the AR device 70* of FIG. 7A or 7B detecting the second actual scene that is at least partially being displayed to the user 62 by detecting a second actual scene 63b (see FIG. 6D) that partially visually overlaps with the first actual scene 63a that the first augmented view (e.g., view 50v of FIG. 5V) was based on.

In some implementations, operation 1153 may further include or involve an operation 1154 for detecting the second actual scene that partially visually overlaps with the first actual scene by detecting a second actual scene that shows only a first portion of the first actual scene while not showing a second portion of the first actual scene, the second portion including one or more visual locations of the one or more first augmentations that were included in the first augmented view. For instance, the actual scene ascertaining module 834 of the AR device 70* of FIG. 7A or 7B detecting the second actual scene that partially visually overlaps with the first actual scene by detecting a second actual scene 63c (see FIG. 6E) that shows only a first portion of the first actual scene 63a (see FIG. 6E) while not showing a second portion of the first actual scene 63a, the second portion including one or more visual locations (e.g., augmentation location 614 of FIG. 6E) of the one or more first augmentations (e.g., augmentation 51m of FIG. 5V) that were included in the first augmented view (e.g., augmented view 50v of FIG. 5V). For purposes of this description, a "visual location" being the location of an item such as an augmentation that was visually determined.

In some implementations, operation 1150 may additionally or alternatively include an operation 1155 for detecting the second actual scene that is at least partially being displayed to the user by detecting a second actual scene that was at least partially being displayed to the user as a result of the one or more user behaviors. For instance, the actual scene ascertaining module 834 of the AR device 70* of FIG. 7A or 7B detecting the second actual scene that is at least partially being displayed to the user by detecting a second actual scene (e.g., the second actual scene 63b or 63c of FIG. 6D or 6E) that was at least partially being displayed to the user 62 as a result of the one or more user behaviors (e.g., one or more user movements).

As further illustrated in FIG. 11C, in some cases operation 1155 may further include or involve an operation 1156 for detecting the second actual scene that was at least partially being displayed to the user as a result of the one or more user behaviors by detecting a second actual scene that was at least partially being displayed to the user as a result of one or more locations and/or orientations of one or more body portions of the user. For instance, the actual scene ascertaining module 834 of the AR device 70* of FIG. 7A or 7B detecting the second actual scene that was at least partially being displayed to the user as a result of the one or more user behaviors by detecting a second actual scene (e.g., the second actual scene 63b or 63c of FIG. 6D or 6E) that was at least partially being displayed to the user 62 as a result of one or more locations and/or orientations of one or more body portions (e.g., head) of the user 62. That is, the second actual scene that is being at least partially displayed (e.g., via augmented or non-augmented view) to the user 62 may be based on the geographic location of the user's body and/or orientation of the user's head.

Referring back to the augmentation displaying operation 906 of FIG. 9, the augmentation displaying operation 906 similar to the augmentation registering operation 902 and the user behavior detecting operation 904 of FIG. 9 may be executed in a number of different ways in various alternative embodiments as illustrated in FIGS. 12A, 12B, 12C, 12D, and 12E. In some implementations, for example, the augmentation displaying operation 906 may include an operation 1257 for displaying the one or more second augmentations by displaying one or more second augmentations that are at least substantially same as the one or more first augmentations. For instance, the augmentation presenting module 106* of the AR device 70* of FIG. 7A or 7B displaying the one or more second augmentations by displaying (e.g., visually presenting) one or more second augmentations (e.g., augmentation 51i of FIG. 5T) that are at least substantially same as the one or more first augmentations (e.g., augmentation 51g of FIG. 5R).

Figure 12A:
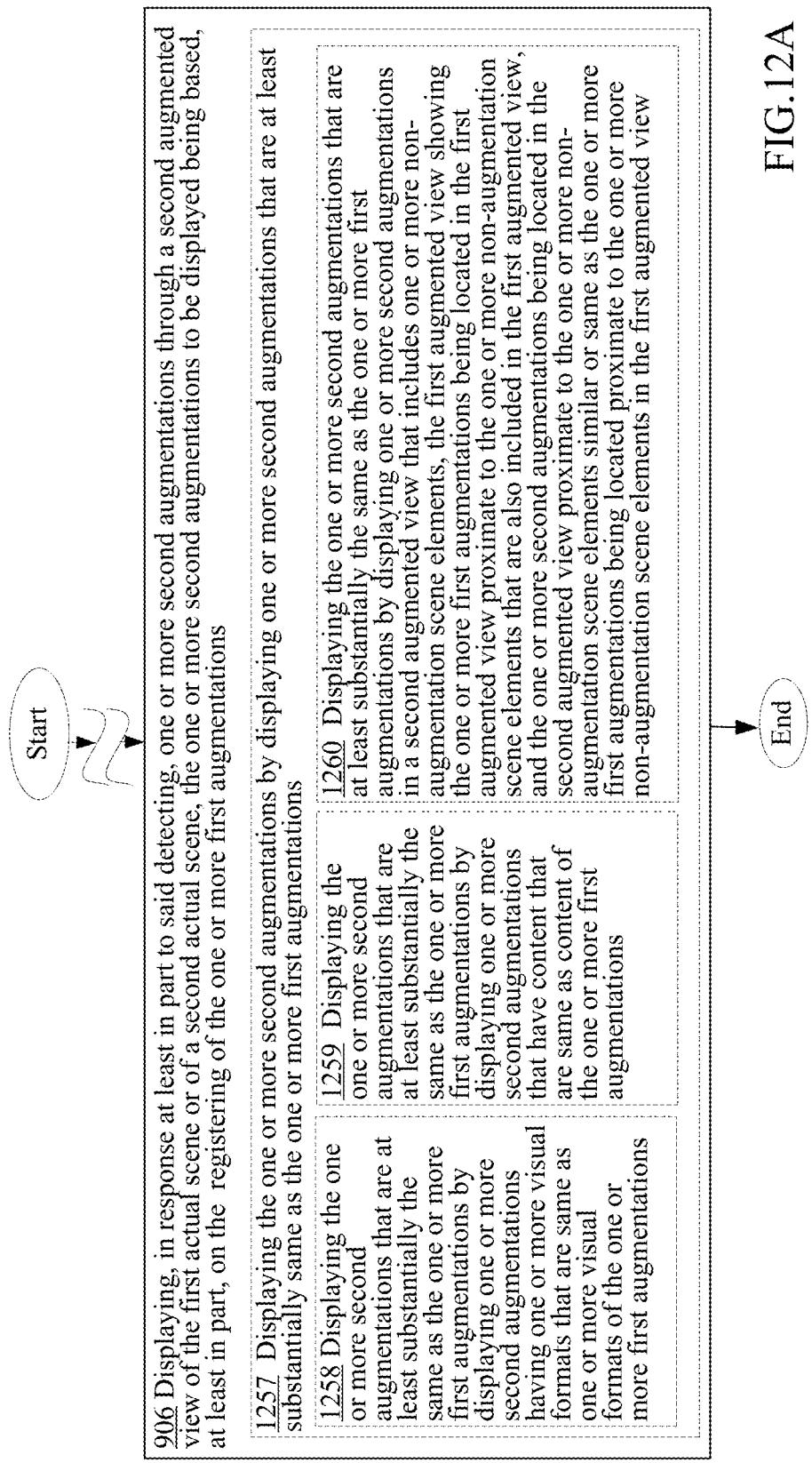
FIG. 12A is a high-level logic flowchart of a process depicting alternate implementations of the augmentation displaying operation 906 of FIG. 9.

As further illustrated in FIG. 12A, operation 1257 may include or involve one or more additional operations in various implementations including in some cases an operation 1258 for displaying the one or more second augmentations that are at least substantially the same as the one or more first augmentations by displaying one or more second augmentations having one or more visual formats that are same as one or more visual formats of the one or more first augmentations. For instance, the augmentation presenting module 106* of the AR device 70* of FIG. 7A or 7B displaying the one or more second augmentations that are at least substantially the same as the one or more first augmentations by displaying one or more second augmentations (e.g., augmentation 51c of FIG. 5J) having one or more visual formats that are same as one or more visual formats of the one or more first augmentations (e.g., augmentation 51c of FIG. 5H).

In the same or alternative implementations, operation 1257 may additionally or alternatively include an operation 1259 for displaying the one or more second augmentations that are at least substantially the same as the one or more first augmentations by displaying one or more second augmentations that have content that are same as content of the one or more first augmentations. For instance, the augmentation presenting module 106* of the AR device 70* of FIG. 7A or 7B displaying the one or more second augmentations that are at least substantially the same as the one or more first augmentations by displaying one or more second augmentations (e.g., augmentation 51b of FIG. 5F) that have content (e.g., textual content) that are same as content of the one or more first augmentations (e.g., augmentation 51b of FIG. 5C).

In the same or alternative implementations, operation 1257 may additionally or alternatively include an operation 1260 for displaying the one or more second augmentations that are at least substantially the same as the one or more first augmentations by displaying one or more second augmentations in a second augmented view that includes one or more non-augmentation scene elements, the first augmented view showing the one or more first augmentations being located in the first augmented view proximate to the one or more non-augmentation scene elements that are also included in the first augmented view, and the one or more second augmentations being located in the second augmented view proximate to the one or more non-augmentation scene elements similar or same as the one or more first augmentations being located proximate to the one or more non-augmentation scene elements in the first augmented view. For instance, the augmentation presenting module 106* of the AR device 70* of FIG. 7A or 7B displaying the one or more second augmentations that are at least substantially the same as the one or more first augmentations by displaying one or more second augmentations (e.g., augmentation 51f of FIG. 5P, which is a modified version of augmentation 51d of FIG. 5M) in a second augmented view (e.g., view 50p of FIG. 5P) that includes one or more non-augmentation scene elements (e.g., ocean, sand, sun umbrella shown in view 50p), the first augmented view (e.g., view 50m of FIG. 5M) showing the one or more first augmentations (e.g., augmentation 51d of FIG. 5M) being located in the first augmented view (e.g., view 50m) proximate to the one or more non-augmentation scene elements that are also included in the first augmented view (e.g., view 50m), and the one or more second augmentations (e.g., augmentation 51f) being located in the second augmented view (e.g., view 50p of FIG. 5P) proximate to the one or more non-augmentation scene elements (e.g., sand, ocean, beach umbrella, etc.) similar or same as the one or more first augmentations (e.g., augmentation 51d) being located proximate to the one or more non-augmentation scene elements (e.g., sand, ocean, beach umbrella, etc.) in the first augmented view (e.g., view 50m of FIG. 5M).

In some implementations, the one or more second augmentations that may be displayed through the augmentation displaying operation 906 of FIG. 9 may be one or more modified versions of the one or more registered first augmentations. For example, in some cases, the augmentation displaying operation 906 of FIG. 9 may actually involve or include an operation 1261 for displaying the one or more second augmentations by displaying one or more second augmentations that are modified version or versions of the one or more first augmentations as illustrated in FIG. 12B. For instance, the augmentation presenting module 106* including the modified first augmentation presenting module 836 (see FIG. 8C) of the AR device 70* of FIG. 7A or 7B displaying the one or more second augmentations when the modified first augmentation presenting module 836 displays (e.g. one or more second augmentations (e.g., augmentation 51i of FIG. 5T) that are modified version or versions of the one or more first augmentations (e.g. augmentation 51g of FIG. 5R).

As further illustrated in FIG. 12B, operation 1261 may include or involve one or more additional operations in various alternative implementations. For example, in some implementations, operation 1261 may include or involve an operation 1262 for displaying the one or more second augmentations that are the modified version or versions of the one or more first augmentations by displaying the modified version or versions of the one or more first augmentations that have one or more modified visual formats that are different from one or more unmodified visual formats of the one or more first augmentations displayed through the first augmented view. For instance, the modified first augmentation presenting module 836 including the first augmentation with modified visual format presenting module 337 (see FIG. 8C) of the AR device 70* of FIG. 7A or 7B displaying the one or more second augmentations that are the modified version or versions of the one or more first augmentations when the first augmentation with modified visual format presenting module 337 displays the modified version or versions of the one or more first augmentations (e.g., augmentation 51c of FIG. 5J that has been visually modified to increase visibility) that have one or more modified visual formats (e.g., increased brightness or highlighting) that are different from one or more unmodified visual formats of the one or more first augmentations (e.g., augmentation 51c of FIG. 5H) displayed through the first augmented view (e.g., view 50h of FIG. 5H).

In some cases, operation 1262 may further include an operation 1263 for displaying the modified version or versions of the one or more first augmentations that have the one or more modified visual formats that are different from the one or more unmodified visual formats of the one or more first augmentations displayed through the first augmented view by displaying the modified version or versions of the one or more first augmentations that have one or more modified visual formats that are designed to increase visibility of the one or more first augmentations. For instance the first augmentation with modified visual format presenting module 337 of the AR device 70* of FIG. 7A or 7B displaying the modified version or versions of the one or more first augmentations that have one or more modified visual formats that are different from the one or more unmodified visual formats of the one or more first augmentations displayed through the first augmented view by displaying the modified version or versions of the one or more first augmentations (e.g., modified version of augmentation 51c of FIG. 5H) that have one or more modified visual formats that are designed to increase visibility of the one or more first augmentations.

As further illustrated in FIG. 12B, operation 1263 in some cases may further include an operation 1264 for displaying the modified version or versions of the one or more first augmentations that have the one or more modified visual formats that are designed to increase the visibility of the one or more first augmentations by displaying the modified version or versions of the one or more first augmentations that are modified to have at least one of increased brightness, increased visual size, changes in bordering, or changes in coloring that are designed to increase visibility of the one or more first augmentations. For instance the first augmentation with modified visual format presenting module 337 of the AR device 70* of FIG. 7A or 7B displaying the modified version or versions of the one or more first augmentations that have one or more modified visual formats that are designed to increase the visibility of the one or more first augmentations by displaying the modified version or versions of the one or more first augmentations (e.g., modified version of augmentation 51c of FIG. 5H) that are modified to have at least one of increased brightness, increased visual size, changes in bordering, or changes in coloring that are designed to increase visibility of the one or more first augmentations.

In some implementations, operation 1261 may include or involve an operation 1265 for displaying the one or more second augmentations that are modified version or versions of the one or more first augmentations by displaying the modified version or versions of the one or more first augmentations that have one or more modified content that are different from one or more unmodified content of the one or more first augmentations displayed through the first augmented view as further illustrated in FIG. 12B. For instance, the modified first augmentation presenting module 836 including the first augmentation with modified content presenting module 338 (see FIG. 8C) of the AR device 70* of FIG. 7A or 7B displaying the one or more second augmentations that are modified version or versions of the one or more first augmentations when first augmentation with modified content presenting module 338 displays the modified version or versions of the one or more first augmentations (e.g., augmentation 51f of FIG. 5P, which is a modified version of augmentation 51d of FIG. 5M) that have one or more modified content that are different from one or more unmodified content of the one or more first augmentations (e.g., augmentation 51d) displayed through the first augmented view (e.g., view 50m of FIG. 5M).

In the same or alternative implementations, operation 1261 may additionally or alternatively include an operation 1266 for displaying the one or more second augmentations that are modified version or versions of the one or more first augmentations by displaying modified version or versions of the one or more first augmentations in the second augmented view that includes one or more non-augmentation scene elements, the modified version or versions of the one or more first augmentations being selectively located in the second augmented view at one or more specific locations relative to the one or more non-augmentation scene elements that are different from one or more specific locations of the one or more first augmentations relative to the one or more non-augmentation scene elements that was included in the first augmented view. For instance, the modified first augmentation presenting module 836 including the selectively located modified first augmentation presenting module 343 (see FIG. 8C) of the AR device 70* of FIG. 7A or 7B displaying the one or more second augmentations that are modified version or versions of the one or more first augmentations when the selectively located modified first augmentation presenting module 343 displays modified version or versions of the one or more first augmentations (e.g., augmentation 51c of FIG. 5J) in the second augmented view (e.g., view 50j of FIG. 5J) that includes one or more non-augmentation scene elements (e.g., chairs, a window, etc.), the modified version or versions of the one or more first augmentations (e.g., the augmentation 51c of FIG. 5J, which is modified version of augmentation 51c of FIG. 5h due to simply being placed in a different location of an interior scene of restaurant depicted by view 50j of FIG. 5J) being selectively located in the second augmented view (e.g., view 50j of FIG. 5J) at one or more specific locations relative to the one or more non-augmentation scene elements (e.g., restaurant window, chairs, and so forth included in the view 50j) that are different from one or more specific locations of the one or more first augmentations (e.g., augmentation 51c of FIG. 5H) relative to the one or more non-augmentation scene elements (e.g., restaurant window, chairs, wall signs, etc.) that was included in the first augmented view (e.g., view 50h of FIG. 5H).

In some cases, operation 1266 may further include or involve an operation 1267 for displaying the modified version or versions of the one or more first augmentations in the second augmented view that includes the one or more non-augmentation scene elements by displaying the modified version or versions of the one or more first augmentations in one or more selective locations in the second augmented view relative to the one or more non-augmentation scene elements included in the second augmented view in order to increase visibility of the modified version or versions of the one or more first augmentations. For instance, the selectively located modified first augmentation presenting module 343 of the AR device 70* of FIG. 7A or 7B displaying the modified version or versions of the one or more first augmentations in the second augmented view that includes the one or more non-augmentation scene elements by displaying the modified version or versions of the one or more first augmentations (e.g., augmentation 51c of FIG. 5J) in one or more selective locations in the second augmented view (e.g., view 50j of FIG. 5J) relative to the one or more non-augmentation scene elements (e.g., window, chairs, tables, and so forth in FIG. 5J) included in the second augmented view in order to increase visibility of the modified version or versions of the one or more first augmentations (e.g., augmentation 51c of FIG. 5H—note that augmentation 51c of FIG. 5J may be a modified version of the augmentation 51c of FIG. 5H simply for being relocated in the different portion of the actual scenery or scene, e.g., interior of the restaurant). One possible way to increase visibility of the one or more second augmentations is to, for example, place the second one or more augmentations in the center of the augmented view or to place the one or more second augmentations at one or more locations in the actual scenery that is at or near to the one or more locations of the actual scenery that the user 62 is focused his or her gaze on (e.g., using eye tracking application/system).

In the same or alternative implementations, operation 1261 for displaying the one or more second augmentations by displaying one or more second augmentations that are modified version or versions of the one or more first augmentations may additionally or alternatively include or involve an operation 1268 for displaying the one or more second augmentations that are the modified version or versions of the one or more first augmentations by displaying the modified version or versions one or more first augmentations in the second augmented view, the one or more modified version or versions of the one or more first augmentations to be displayed being based, at least in part, on one or more user behaviors of the user that were detected following the showing of the one or more first augmentations. For instance, the modified first augmentation presenting module 836 including the user behavior based modified first augmentation presenting module 839 (see FIG. 8C) of the AR device 70* of FIG. 7A or 7B displaying the one or more second augmentations that are the modified version or versions of the one or more first augmentations when the user behavior based modified first augmentation presenting module 839 displays the modified version or versions one or more first augmentations (e.g., displaying augmentation 51*n* of FIG. 5W, which is the modified version of augmentation 51*m* of FIG. 5V) in the second augmented view (e.g., view 50*w* of FIG. 5W), the one or more modified version or versions of the one or more first augmentations to be displayed being based, at least in part, on one or more user behaviors (e.g., physiological characteristics including ocular characteristics, user movements, and so forth) of the user 62 that were detected following the showing of the one or more first augmentations (e.g., augmentation 51*m* of FIG. 5V).

In some cases, operation 1268 may further include an operation 1269 for displaying the modified version or versions of the one or more first augmentations that are based, at least in part, on the one or more user behaviors of the user by displaying modified version or versions of one or more first augmentations that are based on the one or more user behaviors of the user that indicate user's urgency in viewing the one or more first augmentations. For instance, the user behavior based modified first augmentation presenting module 839 of the AR device 70\* of FIG. 7A or 7B displaying the modified version or versions of the one or more first augmentations that are based, at least in part, on the one or more user behaviors of the user by displaying modified version or versions of one or more first augmentations (e.g., displaying augmentation 51*n* of FIG. 5W, which is the modified version of augmentation 51*m* of FIG. 5V) that are based on one or more user behaviors (e.g., sudden head movement or the user 52 suddenly stopping and turning around and moving towards where the user 52 last saw the one or more first augmentations as illustrated in FIG. 6A) of the user 62 that indicate user's urgency (e.g., intensity of interest) in viewing the one or more first augmentations (augmentation 51*m* of FIG. 5V).

In the same or alternative implementations, operation 1268 may additionally or alternatively include or involve an operation 1270 for displaying the modified version or versions of the one or more first augmentations that are based, at least in part, on the one or more user behaviors of the user by displaying modified version or versions of the one or more first augmentations, the modified version or versions of the one or more first augmentations being based, at least in part, on one or more movements of the user that were detected following the showing of the one or more first augmentations. For instance, the user behavior based modified first augmentation presenting module 839 including the movement based modified first augmentation presenting module 840 (see FIG. 8C) of the AR device 70\* of FIG. 7A or 7B displaying the modified version or versions of the one or more first augmentations that are based, at least in part, on the one or more user behaviors of the user when the movement based modified first augmentation presenting module 840 displays modified version or versions of the one or more first augmentations (e.g., displaying augmentation 51*n* of FIG. 5W, which is the modified version of augmentation 51*m* of FIG. 5V), the modified version or versions of the one or more first augmentations to be displayed being based, at least in part, on one or more movements (e.g., head movement or body movements as illustrated in, for example, FIG. 6A) of the user 62 that were detected following the showing of the one or more first augmentations (e.g., following showing of augmentation 51*g* of FIG. 5R). For example, if the user 62 after being shown the one or more first augmentations makes sudden movements such as suddenly stopping and turning around as illustrated, for example, in FIG. 6A, then such movements may suggest urgency of the user 62 to once again view the one or more first augmentations. In such situations, the one or more first augmentations (e.g., augmentation 51*m* of FIG. 5V) may be displayed again in one or more modified forms (e.g., augmentation 51*n* of FIG. 5W with increased size, relocated to the central location in the view 50*w*, and bolded text and lines) that make them more visible.

As further illustrated in FIG. 12C, operation 1270 in some cases may in turn further include an operation 1271 for displaying the modified version or versions of the one or more first augmentations that are based on the one or more movements of the user by displaying modified versions or versions of the one or more first augmentations that have been modified to increase visibility of the one or more first augmentations in response to the one or more movements of the user that were detected following the showing of the one or more first augmentations. For instance, the movement based modified first augmentation presenting module 840 of the AR device 70\* of FIG. 7A or 7B displaying the modified version or versions of the one or more first augmentations that are based on the one or more movements of the user by displaying modified versions or versions of the one or more first augmentations (e.g., displaying augmentation 51*n* of FIG. 5W, which is the modified version of augmentation 51*m* of FIG. 5V) that have been modified (e.g., increase size or brightness) to increase visibility of the one or more first augmentations (e.g., augmentation 51*m*) in response to the one or more movements (e.g., head and/or body movements of the user 62 as illustrated in, for example, FIG. 6A) of the user 62 that were detected following the showing of the one or more first augmentations (e.g., augmentation 51*m* of FIG. 5V).

In some implementations, operation 1268 may additionally or alternatively include or involve an operation 1272 for displaying the modified version or versions of the one or more first augmentations that are based, at least in part, on the one or more user behaviors of the user by displaying modified version or versions of the one or more first augmentations in response to one or more ocular characteristics of the user that were detected following the showing of the one or more first augmentations. For instance, the user behavior based modified first augmentation presenting module 839 including the ocular characteristic based modified first augmentation presenting module 841 (see FIG. 8C) of the AR device 70\* of FIG. 7A or 7B displaying the modified version or versions of the one or more first augmentations that are based, at least in part, on the one or more user behaviors of the user when the ocular characteristic based modified first augmentation presenting module 841 displays modified version or versions of the one or more first augmentations (e.g., displaying augmentation 51*n* of FIG. 5W, which is the modified version of augmentation 51*m* of FIG. 5V) in response to one or more ocular characteristics (e.g., pupil size, eye movements, eye focus, dwell path, and so forth as illustrated, for example, in FIGS. 6B and 6C) of the user 62 that were detected following the showing of the one or more first augmentations (e.g., augmentation 51*g* of FIG. 5R).

As further illustrated in FIG. 12C, in some cases, operation 1272 may further involve or include an operation 1273 for displaying the modified version or versions of the one or more first augmentations that are based on the one or more ocular characteristics of the user by displaying modified versions or versions of the one or more first augmentations that have been modified to increase visibility of the one or more first augmentations in response to the one or more ocular characteristics of the user that were detected following the showing of the one or more first augmentations. For instance, the ocular characteristic based modified first augmentation presenting module 841 of the AR device 70* of FIG. 7A or 7B displaying the modified version or versions of the one or more first augmentations that are based on the one or more ocular characteristics of the user by displaying modified versions or versions of the one or more first augmentations (e.g., displaying augmentation 51n of FIG. 5W, which is the modified version of augmentation 51m of FIG. 5V) that have been modified (e.g., increased size or brightness, or locating the augmentations in locations of the view where the eyes of the user is focused on) to increase visibility of the one or more first augmentations in response to the one or more ocular characteristics of the user 62 that were detected following the showing of the one or more first augmentations (e.g., augmentation 51m of FIG. 5V).

Operation 1273, in turn, may further include an operation 1274 for displaying the modified versions or versions of the one or more first augmentations that have been modified to increase visibility of the one or more first augmentations in response to the one or more ocular characteristics of the user by displaying the modified versions or versions of the one or more first augmentations that have been modified to increase visibility of the one or more first augmentations in response to one or more pupil characteristic, eye movement, dwell time, dwell focus, and/or dwell path of one or more eyes of the user that were detected following the showing of the one or more first augmentations. For instance, the ocular characteristic based modified first augmentation presenting module 841 of the AR device 70* of FIG. 7A or 7B displaying the modified versions or versions of the one or more first augmentations that have been modified to increase visibility of the one or more first augmentations in response to the one or more ocular characteristics of the user by displaying the modified versions or versions of the one or more first augmentations (e.g., displaying augmentation 51n of FIG. 5W, which is the modified version of augmentation 51m of FIG. 5V) that have been modified to increase visibility of the one or more first augmentations in response to one or more pupil characteristic, eye movement, dwell time, dwell focus, and/or dwell path of one or more eyes of the user 62 that were detected following the showing of the one or more first augmentations (e.g., augmentation 51m of FIG. 5V).

In some implementations, the AR device 70* of FIG. 7A or 7B may be designed to present, prior to displaying the one or more second augmentations, one or more indicators that directs the user 62 to execute one or more acts (e.g., to move to a particular location or to look at a certain location or direction) in order to see the one or more second augmentations. For example, and turning now to FIG. 12D, the may include an operation 1275 for displaying the one or more second augmentations through the second augmented view including displaying, prior to the displaying of the one or more second augmentations through the second augmented view, one or more third augmentations that directs the user to execute one or more acts in order to view the one or more second augmentations that are based, at least in part, on the registering of the one or more first augmentations. For instance, the augmentation presenting module 106* including the user directing augmentation presenting module 842 (see FIG. 8C) of the AR device 70* of FIG. 7A or 7B displaying the one or more second augmentations through the second augmented view including displaying, prior to the displaying of the one or more second augmentations through the second augmented view, one or more third augmentations (e.g., the arrow augmentation 51p of FIG. 5X) that directs the user 62 to execute one or more acts (e.g., move in the direction of the arrow augmentation 51p) in order to view the one or more second augmentations that are based, at least in part, on the registering of the one or more first augmentations.

Figure 12D:
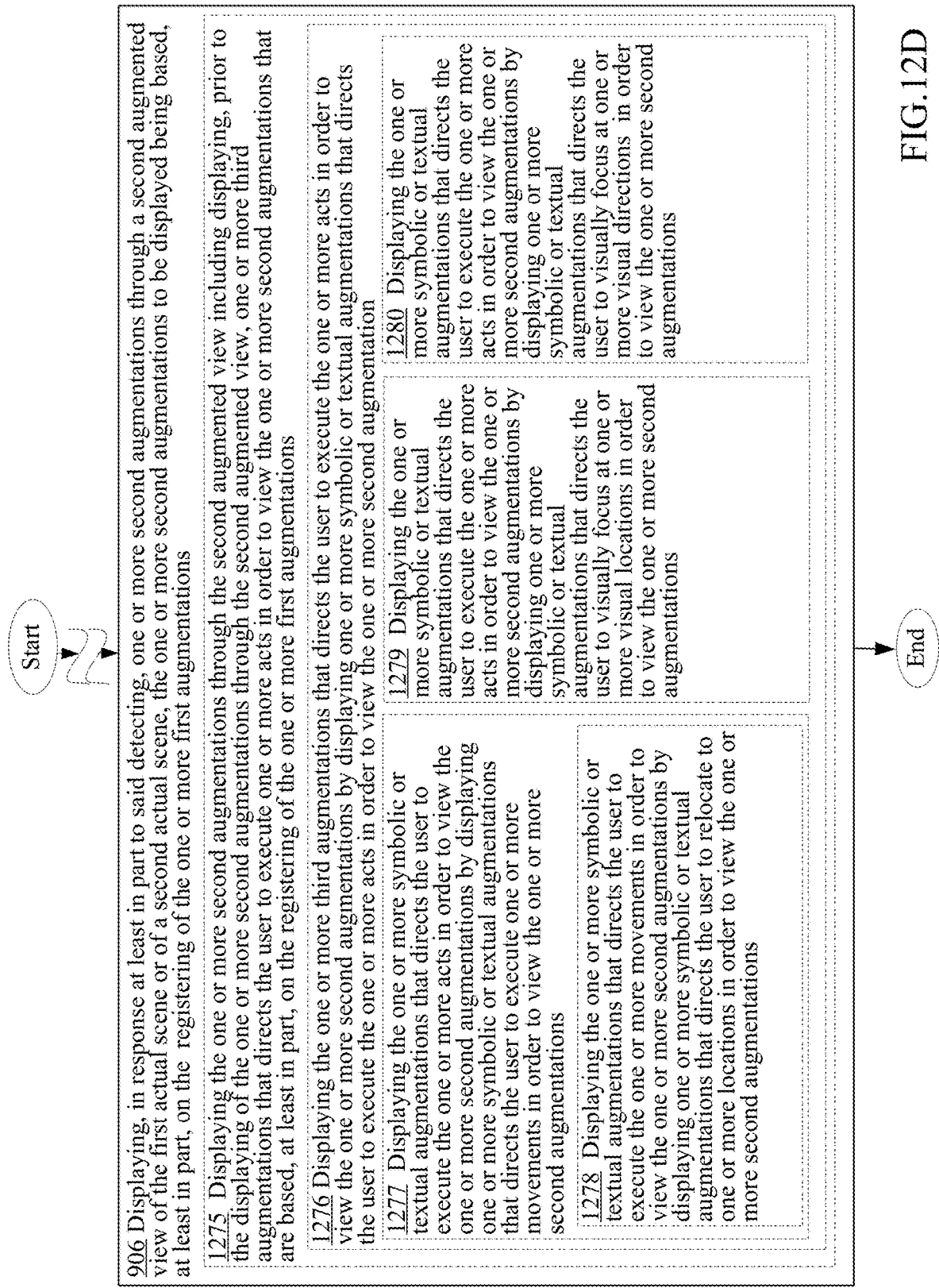
FIG. 12D is a high-level logic flowchart of a process depicting alternate implementations of the augmentation displaying operation 906 of FIG. 9.

As further illustrated in FIG. 12D, in some implementations, operation 1275 may include one or more additional operations including in some cases an operation 1276 for displaying the one or more third augmentations that directs the user to execute the one or more acts in order to view the one or more second augmentations by displaying one or more symbolic or textual augmentations that directs the user to execute the one or more acts in order to view the one or more second augmentations. For instance, the user directing augmentation presenting module 842 of the AR device 70* of FIG. 7A or 7B displaying the one or more third augmentations that directs the user to execute the one or more acts in order to view the one or more second augmentations by displaying one or more symbolic augmentation (e.g., augmentation 51p of FIG. 5X) or textual augmentation (e.g., augmentation 51r of FIG. 5Z) that directs the user 62 to execute the one or more acts (e.g., "look to the left") in order to view the one or more second augmentations.

In some cases, operation 1276 may further include an operation 1277 for displaying the one or more symbolic or textual augmentations that directs the user to execute the one or more acts in order to view the one or more second augmentations by displaying one or more symbolic or textual augmentations that directs the user to execute one or more movements in order to view the one or more second augmentations. For instance, the user directing augmentation presenting module 842 of the AR device 70* of FIG. 7A or 7B displaying the one or more symbolic or textual augmentations that directs the user to execute the one or more acts in order to view the one or more second augmentations by displaying one or more symbolic or textual augmentations (e.g., augmentation 51p of FIG. 5X, augmentation 51q of FIG. 5Y that is a bull's-eye that directs the user 62 to look at that location, and/or augmentation 51r if FIG. 5Z) that directs the user 62 to execute one or more movements (e.g., ocular movements or body movements) in order to view the one or more second augmentations.

In some cases, operation 1277 may include an operation 1278 for displaying the one or more symbolic or textual augmentations that directs the user to execute the one or more movements in order to view the one or more second augmentations by displaying one or more symbolic or textual augmentations that directs the user to relocate to one or more locations in order to view the one or more second augmentations. For instance, the user directing augmentation presenting module 842 of the AR device 70* of FIG. 7A or 7B displaying the one or more symbolic or textual augmentations that directs the user to execute the one or more movements in order to view the one or more second augmentations by displaying one or more symbolic or textual augmentations (e.g., augmentation 51p of FIG. 5X) that directs the user 62 to relocate to one or more locations in order to view the one or more second augmentations.

In some implementations operation 1276 for displaying the one or more third augmentations that directs the user to execute the one or more acts in order to view the one or more second augmentations by displaying one or more symbolic or textual augmentations that directs the user to execute the one or more acts in order to view the one or more second augmentations may alternatively or additionally include an operation 1279 for displaying the one or more symbolic or textual augmentations that directs the user to execute the one or more acts in order to view the one or more second augmentations by displaying one or more symbolic or textual augmentations that directs the user to visually focus at one or more visual locations in order to view the one or more second augmentations. For instance, the user directing augmentation presenting module 842 of the AR device 70\* of FIG. 7A or 7B displaying the one or more symbolic or textual augmentations that directs the user to execute the one or more acts in order to view the one or more second augmentations by displaying one or more symbolic or textual augmentations (e.g., augmentation 51$q$ of FIG. 5Y or augmentation 51$r$ of FIG. 5Z) that directs the user 62 to visually focus at one or more visual locations in order to view the one or more second augmentations.

In the same or alternative implementations, operation 1276 may additionally or alternatively include an operation 1280 for displaying the one or more symbolic or textual augmentations that directs the user to execute the one or more acts in order to view the one or more second augmentations by displaying one or more symbolic or textual augmentations that directs the user to visually focus at one or more visual directions in order to view the one or more second augmentations. For instance, the user directing augmentation presenting module 842 of the AR device 70\* of FIG. 7A or 7B displaying the one or more symbolic or textual augmentations that directs the user to execute the one or more acts in order to view the one or more second augmentations by displaying one or more symbolic or textual augmentations (e.g., augmentation 51$r$ of FIG. 5Z) that directs the user to visually focus at one or more visual directions (e.g., south, north, west, etc.) in order to view the one or more second augmentations.

Figure 12E:
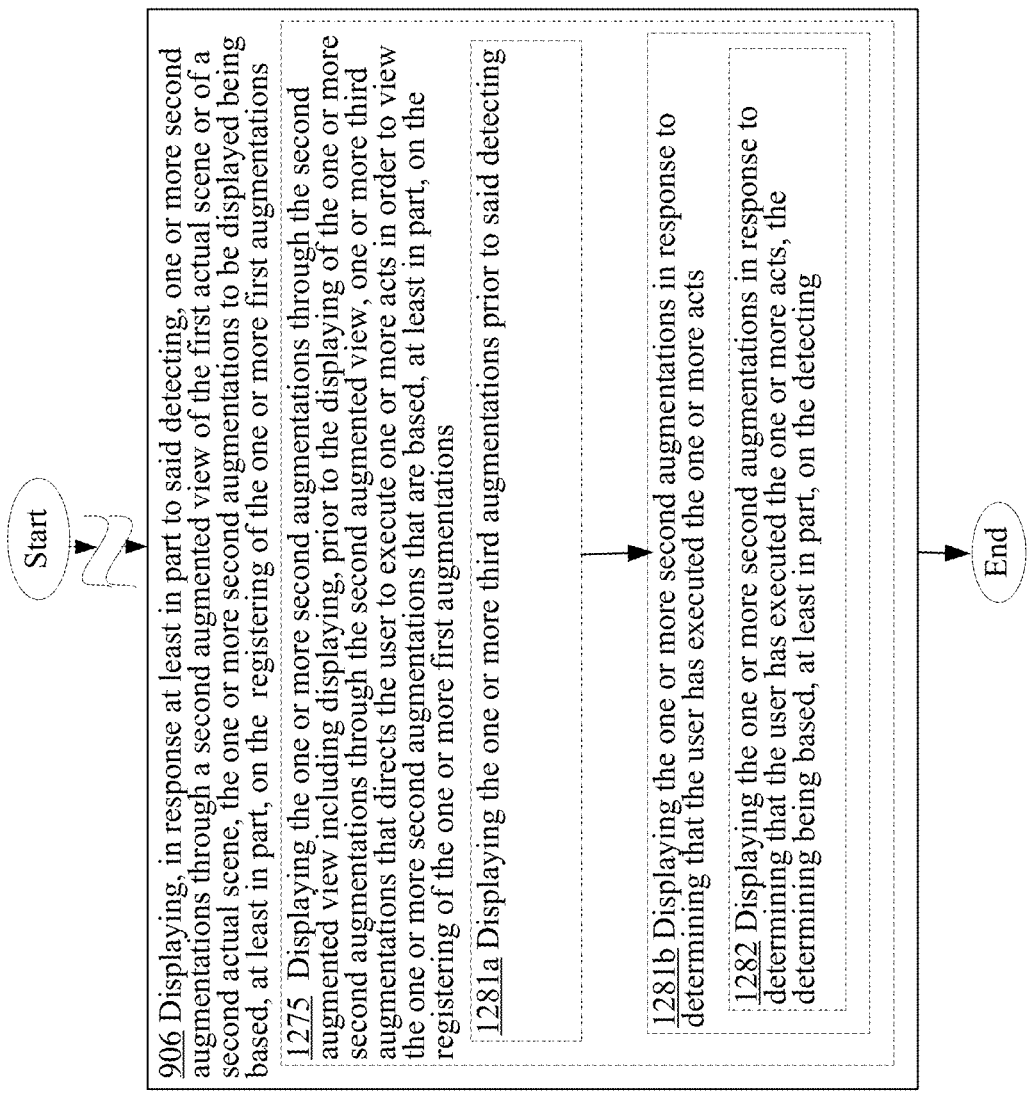
FIG. 12E is a high-level logic flowchart of a process depicting alternate implementations of the augmentation displaying operation 906 of FIG. 9.

Turning now to FIG. 12E, in some implementations, the operation 1275 for displaying the one or more second augmentations through the second augmented view including displaying, prior to the displaying of the one or more second augmentations through the second augmented view, one or more third augmentations that directs the user to execute one or more acts in order to view the one or more second augmentations that are based, at least in part, on the registering of the one or more first augmentations may actually involve an operation 1281$a$ for displaying the one or more third augmentations prior to said detecting and an operation 1281$b$ for displaying the one or more second augmentations in response to determining that the user has executed the one or more acts. For instance, the user directing augmentation presenting module 842 of the AR device 70\* displaying (e.g., visually presenting) the one or more third augmentations prior to said detecting (e.g., prior to detecting or ascertaining of the one or more user behaviors) and the augmentation presenting module 106\* of the AR device 70\* displaying the one or more second augmentations in response to determining that the user 62 has executed the one or more acts (e.g., the user moving to the directed location or looking at the directed location).

As further illustrated in FIG. 12E, in some cases, operation 1281$b$ operation 1281 may further include an operation 1282 for displaying the one or more second augmentations in response to determining that the user has executed the one or more acts, the determining being based, at least in part, on the detecting. For instance, the augmentation presenting module 106\* of the AR device 70\* of FIG. 7A or 7B displaying the one or more second augmentations in response to determining that the user 62 has executed the one or more acts, the determining being based, at least in part, on the detecting or ascertaining of the one or more user behaviors.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011100001111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinct ion left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:
1. A system, comprising:
   circuitry for registering one or more first augmentations shown to a user through a first augmented view of a first actual scene;
   circuitry for detecting one or more user behaviors of the user that, when detected, infer at least some user interest in seeing the one or more first augmentations;
   circuitry for correlating the detected one or more user behaviors with one or more aspects associated with the one or more first augmentations;
   circuitry for transmitting one or more results of the correlating;
   circuitry for receiving, in response to the transmitting, one or more second augmentations for displaying in a second augmented view of at least one of the first actual scene or a second actual scene;

circuitry for displaying the one or more second augmentations through the second augmented view of the at least one of the first actual scene or the second actual scene, the one or more second augmentations including at least one aspect directing the user to relocate to one or more physical locations associated with the first actual scene in order to review the one or more first augmentations; and circuitry for displaying one or more third augmentations to aid the user in reviewing an aspect of the first augmented view of the first actual scene in which the at least some user interest was inferred, the displaying occurring upon detection of the user having relocated, responsive to the one or more second augmentations, to the one or more physical locations associated with the first actual scene in order to review the one or more first augmentations.

2. The system of claim 1, wherein circuitry for registering one or more first augmentations shown to a user through a first augmented view of a first actual scene comprises:

circuitry for registering one or more aspects of the one or more first augmentations.

3. The system of claim 1, wherein circuitry for registering one or more first augmentations shown to a user through a first augmented view of a first actual scene comprises:

circuitry for registering one or more dynamic augmentations that change in response to one or more physical movements of the user detected by one or more locational sensors.

4. The system of claim 3, wherein circuitry for registering one or more dynamic augmentations that change in response to one or more physical movements of the user detected by one or more locational sensors comprises:

circuitry for registering one or more dynamic augmentations that change in response to one or more physical movements of the user detected by one or more locational sensors which determine the one or more physical movements of the user via one or more cellular tower signals.

5. The system of claim 1, wherein circuitry for registering one or more first augmentations shown to a user through a first augmented view of a first actual scene comprises:

circuitry for registering one or more dynamic augmentations that change in response to one or more atmospheric conditions including at least one dynamic augmentation that provides at least one indication of current air temperature including at least an image of a mercury level of a thermometer moving at least one of up or down in accordance with one or more temperature sensor readings.

6. The system of claim 1, wherein circuitry for detecting one or more user behaviors of the user that, when detected, infer at least some user interest in seeing the one or more first augmentations comprises:

circuitry for sensing one or more physiological characteristics of the user proximate to the one or more first augmentations being shown to the user.

7. The system of claim 6, wherein circuitry for sensing one or more physiological characteristics of the user proximate to the one or more first augmentations being shown to the user comprises:

circuitry for sensing, via one or more wristband-embedded sensors configured for physiological characteristic detection, the one or more physiological characteristics of the user at least one of during or following the one or more first augmentations being shown to the user via a head-mounted display worn by the user in wireless communication with a wristband worn by the user that includes the one or more wristband-embedded sensors.

8. The system of claim 6, wherein circuitry for sensing one or more physiological characteristics of the user proximate to the one or more first augmentations being shown to the user comprises:

circuitry for sensing at least one of one or more ocular characteristics, one or more galvanic skin responses, one or more blood pressure measurements, or one or more pulse rate measurements of the user proximate to the one or more first augmentations being shown to the user.

9. The system of claim 1, wherein circuitry for displaying the one or more second augmentations through the second augmented view of the at least one of the first actual scene or the second actual scene, the one or more second augmentations including at least one aspect directing the user to relocate to one or more physical locations associated with the first actual scene in order to review the one or more first augmentations comprises:

circuitry for displaying the one or more second augmentations, including at least displaying at least one of one or more symbolic augmentations or one or more textual augmentations associated with directing the user to physically move in a cardinal direction in order to relocate to the one or more physical locations associated with the first actual scene in order to observe for a second time an aspect of the first augmented view of the first actual scene in which the at least some user interest was inferred.

10. The system of claim 1, wherein circuitry for displaying one or more third augmentations to aid the user in reviewing an aspect of the first augmented view of the first actual scene in which the at least some user interest was inferred, the displaying occurring upon detection of the user having relocated, responsive to the one or more second augmentations, to the one or more physical locations associated with the first actual scene in order to review the one or more first augmentations comprises:

circuitry for receiving an indication of the user having relocated to the one or more physical locations associated with the first actual scene; and circuitry for displaying the one or more third augmentations.

11. The system of claim 1, wherein circuitry for displaying one or more third augmentations to aid the user in reviewing an aspect of the first augmented view of the first actual scene in which the at least some user interest was inferred, the displaying occurring upon detection of the user having relocated, responsive to the one or more second augmentations, to the one or more physical locations associated with the first actual scene in order to review the one or more first augmentations comprises:

circuitry for displaying a bull's eye that directs the user to look at the aspect of the first augmented view of the first actual scene in which the at least some user interest was inferred, the bull's eye incorporated in the one or more third augmentations.

12. The system of claim 1, wherein circuitry for displaying one or more third augmentations to aid the user in reviewing an aspect of the first augmented view of the first actual scene in which the at least some user interest was inferred, the displaying occurring upon detection of the user having relocated, responsive to the one or more second augmentations, to the one or more physical locations associated with the first actual scene in order to review the one or more first augmentations comprises:
   circuitry for displaying at least one of one or more symbolic augmentations or one or more textual augmentations associated with directing the user to visually focus for a second time at the aspect of the first augmented view of the first actual scene in which the at least some user interest was inferred, including at least increasing a size of the aspect of the first augmented view of the first actual scene in which the at least some user interest was inferred to aid the user in observing for a second time the aspect of the first augmented view of the first actual scene in which the at least some user interest was inferred.

13. The system of claim 1, wherein circuitry for displaying one or more third augmentations to aid the user in reviewing an aspect of the first augmented view of the first actual scene in which the at least some user interest was inferred, the displaying occurring upon detection of the user having relocated, responsive to the one or more second augmentations, to the one or more physical locations associated with the first actual scene in order to review the one or more first augmentations comprises:
   circuitry for displaying at least one of one or more symbolic augmentations or one or more textual augmentations associated with directing the user to visually focus in one or more visual directions in order to observe for a second time the aspect of the first augmented view of the first actual scene in which the at least some user interest was inferred.

14. The system of claim 1, wherein circuitry for displaying the one or more second augmentations through the second augmented view of the at least one of the first actual scene or the second actual scene, the one or more second augmentations including at least one aspect directing the user to relocate to one or more physical locations associated with the first actual scene in order to review the one or more first augmentations comprises:
   circuitry for displaying a modified version of the one or more first augmentations as the one or more second augmentations.

15. The system of claim 14, wherein circuitry for displaying a modified version of the one or more first augmentations as the one or more second augmentations comprises:
   circuitry for displaying a modified version of the one or more first augmentations including at least one modified visual format relative to the one or more first augmentations.

16. The system of claim 1, wherein circuitry for displaying the one or more second augmentations through the second augmented view of the at least one of the first actual scene or the second actual scene, the one or more second augmentations including at least one aspect directing the user to relocate to one or more physical locations associated with the first actual scene in order to review the one or more first augmentations comprises:
   circuitry for displaying one or more second augmentations, including one or more augmentations which dynamically change based, at least in part, on the circuitry for detecting the one or more user behaviors of the user, through a second augmented view of at least one of the first actual scene or a second actual scene.

17. The system of claim 16, wherein circuitry for displaying one or more second augmentations, including one or more augmentations which dynamically change based, at least in part, on the circuitry for detecting the one or more user behaviors of the user, through a second augmented view of at least one of the first actual scene or a second actual scene comprises:
   circuitry for displaying one or more second augmentations, including one or more augmentations which dynamically change based on at least one user heart rate detected by the circuitry for detecting the one or more user behaviors of the user, through a second augmented view of at least one of the first actual scene or a second actual scene.

18. The system of claim 1, wherein circuitry for displaying the one or more second augmentations through the second augmented view of the at least one of the first actual scene or the second actual scene, the one or more second augmentations including at least one aspect directing the user to relocate to one or more physical locations associated with the first actual scene in order to review the one or more first augmentations comprises:
   circuitry for determining a purpose of the user based, at least in part, on the circuitry for detecting the one or more user behaviors of the user; and
   circuitry for displaying one or more second augmentations through a second augmented view of at least one of the first actual scene or a second actual scene based, at least in part, on the circuitry for determining the purpose of the user.

19. The system of claim 18, wherein circuitry for determining a purpose of the user based, at least in part, on the circuitry for detecting the one or more user behaviors of the user comprises:
   circuitry for determining that a user is riding a bicycle on a bike trail for exercise purposes rather than for leisure purposes based, at least in part, on the circuitry for detecting the one or more user behaviors of the user, the bike trail having been used by the user in the past for leisure purposes.

20. The system of claim 19, wherein circuitry for determining that a user is riding a bicycle on a bike trail for exercise purposes rather than for leisure purposes based, at least in part, on the circuitry for detecting the one or more user behaviors of the user, the bike trail having been used by the user in the past for leisure purposes comprises:
   circuitry for determining that a user is riding a bicycle for exercise purposes rather than for leisure purposes based, at least in part, on at least one elevated heart rate of the user detected by the circuitry for detecting the one or more user behaviors of the user compared to at least one heart rate detected while the user was using the bike trail in the past for leisure purposes.

21. The system of claim 1, wherein circuitry for detecting one or more user behaviors of the user that, when detected, infer at least some user interest in seeing the one or more first augmentations comprises:
   circuitry for detecting one or more user behaviors of the user, the circuitry including at least one blood pressure sensor integrated with at least one augmented reality device on which the one or more first augmentations are shown to the user.

22. The system of claim 21, wherein circuitry for detecting one or more user behaviors of the user, the circuitry including at least one blood pressure sensor integrated with at least one augmented reality device on which the one or more first augmentations are shown to the user comprises:
   circuitry for detecting one or more user physiological characteristics as the one or more user behaviors of the user that, when detected, infer one or more of at least one user mental state or at least one user emotional state in response to seeing the one or more first augmentations, including at least detecting, via the at least one blood pressure sensor integrated with at least one augmented reality device on which the one or more first augmentations are shown to the user, at least one change in blood pressure indicative of the one or more of at least one user mental state or at least one user emotional state in response to seeing the one or more first augmentations.

23. The system of claim 22, wherein circuitry for detecting one or more user physiological characteristics as the one or more user behaviors of the user that, when detected, infer one or more of at least one user mental state or at least one user emotional state in response to seeing the one or more first augmentations, including at least detecting, via the at least one blood pressure sensor integrated with at least one augmented reality device on which the one or more first augmentations are shown to the user, at least one change in blood pressure indicative of the one or more of at least one user mental state or at least one user emotional state in response to seeing the one or more first augmentations comprises:
    circuitry for detecting, via the at least one blood pressure sensor integrated with at least one augmented reality device on which the one or more first augmentations are shown to the user, at least one change in blood pressure indicative of at least one user mood in response to seeing the one or more first augmentations.

24. The system of claim 1, wherein circuitry for correlating the detected one or more user behaviors with one or more aspects associated with the one or more first augmentations comprises:
    circuitry for correlating one or more user physiological characteristics detected as the one or more user behaviors of the user with the one or more aspects associated with the one or more first augmentations.

25. The system of claim 24, wherein circuitry for correlating one or more user physiological characteristics detected as the one or more user behaviors of the user with the one or more aspects associated with the one or more first augmentations comprises:
    circuitry for correlating one or more user physiological characteristics sensed at least one of during or following the one or more first augmentations being shown to the user with the one or more aspects associated with the one or more first augmentations.

26. The system of claim 24, wherein circuitry for correlating one or more user physiological characteristics detected as the one or more user behaviors of the user with the one or more aspects associated with the one or more first augmentations comprises:
    circuitry for correlating at least one head tilt of the user sensed at least one of during or following the one or more first augmentations being shown to the user with the one or more aspects associated with the one or more first augmentations.

27. The system of claim 26, wherein circuitry for correlating at least one head tilt of the user sensed at least one of during or following the one or more first augmentations being shown to the user with the one or more aspects associated with the one or more first augmentations comprises:
    circuitry for correlating at least one head tilt of the user sensed via at least one tilt sensor integrated with the at least one augmented reality device on which the one or more first augmentations are shown to the user at least one of during or following the one or more first augmentations being shown to the user with the one or more aspects associated with the one or more first augmentations.

28. The system of claim 27, wherein circuitry for correlating at least one head tilt of the user sensed via at least one tilt sensor integrated with the at least one augmented reality device on which the one or more first augmentations are shown to the user at least one of during or following the one or more first augmentations being shown to the user with the one or more aspects associated with the one or more first augmentations comprises:
    circuitry for inferring which of the one or more aspects associated with the one or more first augmentations caused the at least one head tilt of the user based, at least in part, on at least one orientation of a head of the user relative to the one or more aspects associated with the one or more first augmentations at least one of during or following the one or more first augmentations being shown to the user.

29. The system of claim 1, wherein circuitry for correlating the detected one or more user behaviors with one or more aspects associated with the one or more first augmentations comprises:
    circuitry for correlating the detected one or more user behaviors with one or more non-augmentation scene elements that have been obfuscated in the first augmented view by the one or more first augmentations.

30. The system of claim 1, wherein circuitry for transmitting one or more results of the correlating comprises:
    circuitry for transmitting the one or more results of the correlating to one or more network servers associated with one or more independent parties.

31. The system of claim 1, wherein circuitry for transmitting one or more results of the correlating comprises:
    circuitry for transmitting the one or more results of the correlating by transmitting one or more defined relationships between the detected one or more user behaviors and the one or more aspects associated with the one or more first augmentations.

32. The system of claim 1, wherein circuitry for receiving, in response to the transmitting, one or more second augmentations for displaying in a second augmented view of at least one of the first actual scene or a second actual scene comprises:
    circuitry for receiving one or more second augmentations having one or more formats that were selected based, at least in part, on the one or more results of the correlating that were transmitted.

33. The system of claim 32, wherein circuitry for receiving one or more second augmentations having one or more formats that were selected based, at least in part, on the one or more results of the correlating that were transmitted comprises:
    circuitry for receiving one or more second augmentations that are designed to be placed at one or more particular locations in the second augmented view, the placement or placements of the one or more second augmentations in the second augmented view being based, at least in part, on the one or more results of the correlating that were transmitted.

34. The system of claim 32, wherein circuitry for receiving one or more second augmentations having one or more formats that were selected based, at least in part, on the one or more results of the correlating that were transmitted comprises:
    circuitry for receiving one or more second augmentations that are designed to have one or more particular dimensions or shapes, the one or more particular dimensions or shapes of the one or more second augmentations based, at least in part, on the one or more results of the correlating that were transmitted.

35. The system of claim 1, wherein circuitry for receiving, in response to the transmitting, one or more second augmentations for displaying in a second augmented view of at least one of the first actual scene or a second actual scene comprises:
circuitry for receiving one or more visibility rules for displaying the one or more second augmentations that are based, at least in part, on the one or more results of the correlating that were transmitted.

36. A system, comprising:
at least one processing device; and
one or more instructions that, when executed by the at least one processing device, configure the at least one processing device to perform one or more operations including at least:
registering one or more first augmentations shown to a user through a first augmented view of a first actual scene;
detecting one or more user behaviors of the user that, when detected, infer at least some user interest in seeing the one or more first augmentations;
correlating the detected one or more user behaviors with one or more aspects associated with the one or more first augmentations;
transmitting one or more results of the correlating;
receiving, in response to the transmitting, one or more second augmentations for displaying in a second augmented view of at least one of the first actual scene or a second actual scene;
displaying the one or more second augmentations through the second augmented view of the at least one of the first actual scene or the second actual scene, the one or more second augmentations including at least one aspect directing the user to relocate to one or more physical locations associated with the first actual scene in order to review the one or more first augmentations; and
displaying one or more third augmentations to aid the user in reviewing an aspect of the first augmented view of the first actual scene in which the at least some user interest was inferred, the displaying occurring upon detection of the user having relocated, responsive to the one or more second augmentations, to the one or more physical locations associated with the first actual scene in order to review the one or more first augmentations.

37. A method, comprising:
registering one or more first augmentations shown to a user through a first augmented view of a first actual scene;
detecting one or more user behaviors of the user that, when detected, infer at least some user interest in seeing the one or more first augmentations;
correlating the detected one or more user behaviors with one or more aspects associated with the one or more first augmentations;
transmitting one or more results of the correlating;
receiving, in response to the transmitting, one or more second augmentations for displaying in a second augmented view of at least one of the first actual scene or a second actual scene;
displaying the one or more second augmentations through the second augmented view of the at least one of the first actual scene or the second actual scene, the one or more second augmentations including at least one aspect directing the user to relocate to one or more physical locations associated with the first actual scene in order to review the one or more first augmentations; and
displaying one or more third augmentations to aid the user in reviewing an aspect of the first augmented view of the first actual scene in which the at least some user interest was inferred, the displaying occurring upon detection of the user having relocated, responsive to the one or more second augmentations, to the one or more physical locations associated with the first actual scene in order to review the one or more first augmentations,
wherein at least one of the registering, detecting, correlating, transmitting, receiving, or displaying is at least partially implemented using at least one processing device.

* * * * *